(12) United States Patent
Okuda et al.

(10) Patent No.: US 8,140,059 B2
(45) Date of Patent: Mar. 20, 2012

(54) PORTABLE INFORMATION TERMINAL DEVICE

(75) Inventors: Kei Okuda, Osaka (JP); Takayuki Mohri, Osaka (JP); Akihiko Uchiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 291 days.

(21) Appl. No.: 12/518,249

(22) PCT Filed: Nov. 29, 2007

(86) PCT No.: PCT/JP2007/073025
§ 371 (c)(1),
(2), (4) Date: Jun. 8, 2009

(87) PCT Pub. No.: WO2008/072478
PCT Pub. Date: Jun. 19, 2008

(65) Prior Publication Data
US 2010/0016018 A1  Jan. 21, 2010

(30) Foreign Application Priority Data

Dec. 13, 2006 (JP) ................. 2006-335589
Dec. 22, 2006 (JP) ................. 2006-346314
Aug. 29, 2007 (JP) ................. 2007-223262
Aug. 29, 2007 (JP) ................. 2007-223263
Aug. 29, 2007 (JP) ................. 2007-223264

(51) Int. Cl.
*H04M 1/00* (2006.01)
*H04M 3/42* (2006.01)
*H04N 5/64* (2006.01)
*H04N 7/20* (2006.01)
*H04N 7/173* (2011.01)

(52) U.S. Cl. ............ 455/414.4; 455/566; 348/838; 725/68; 725/98; 725/99

(58) Field of Classification Search .......... 455/566, 455/566.1, 414.1; 348/383; 725/68, 98, 725/99
See application file for complete search history.

(56) References Cited

U.S. PATENT DOCUMENTS

2002/0174147 A1* 11/2002 Wang et al. ............ 707/513
(Continued)

FOREIGN PATENT DOCUMENTS

| JP | 2004-15400 A | 1/2004 |
| JP | 2005-223649 A | 8/2005 |
| JP | 2005-242714 A | 9/2005 |

(Continued)

*Primary Examiner* — Jinsong Hu
*Assistant Examiner* — Opiribo Georgewill
(74) *Attorney, Agent, or Firm* — Birch, Stewart, Kolasch & Birch, LLP

(57) ABSTRACT

It is an object to provide a digital TV broadcast system and a cellular phone in which content of a data broadcast can be checked with a small display area, and work for checking desired content in detail is easy. Extracted character strings extracted from content data are provided in a picto display area 21 in a horizontally long display state as a marquee display. In the case where a display screen is switched to a vertically long display state during the display of the extracted character strings, a cursor 26 is placed on a character string corresponding to an extracted character string displayed in the horizontally long display state upon the switching, among character strings displayed in a data broadcast display area 25. Based on this, a user can well check the content of the data broadcast by checking the extracted character strings provided as the marquee display, and also because the character string corresponding to the extracted character string displayed in the horizontally long display state is automatically selected by the switching to the vertically long display state, the work for checking desired content in detail is easy.

8 Claims, 37 Drawing Sheets

U.S. PATENT DOCUMENTS

| | | | |
|---|---|---|---|
| 2003/0153288 A1* | 8/2003 | Nakatsuyama | 455/130 |
| 2005/0212983 A1* | 9/2005 | Kawamoto | 348/838 |
| 2005/0229224 A1 | 10/2005 | Matsumoto et al. | |
| 2007/0127472 A1 | 6/2007 | Yonemoto et al. | |
| 2007/0265031 A1* | 11/2007 | Koizumi et al. | 455/556.1 |
| 2007/0285401 A1 | 12/2007 | Ohki et al. | |
| 2007/0298842 A1* | 12/2007 | Kamada et al. | 455/566 |

FOREIGN PATENT DOCUMENTS

| | | |
|---|---|---|
| JP | 2005-286966 A | 10/2005 |
| JP | 2006-180071 A | 7/2006 |
| WO | WO-03/056787 A1 | 7/2003 |
| WO | WO 2005029339 A1 * | 3/2005 |
| WO | WO 2005039157 A1 * | 4/2005 |
| WO | WO-2006/051669 A1 | 5/2006 |

* cited by examiner

[Fig. 1]
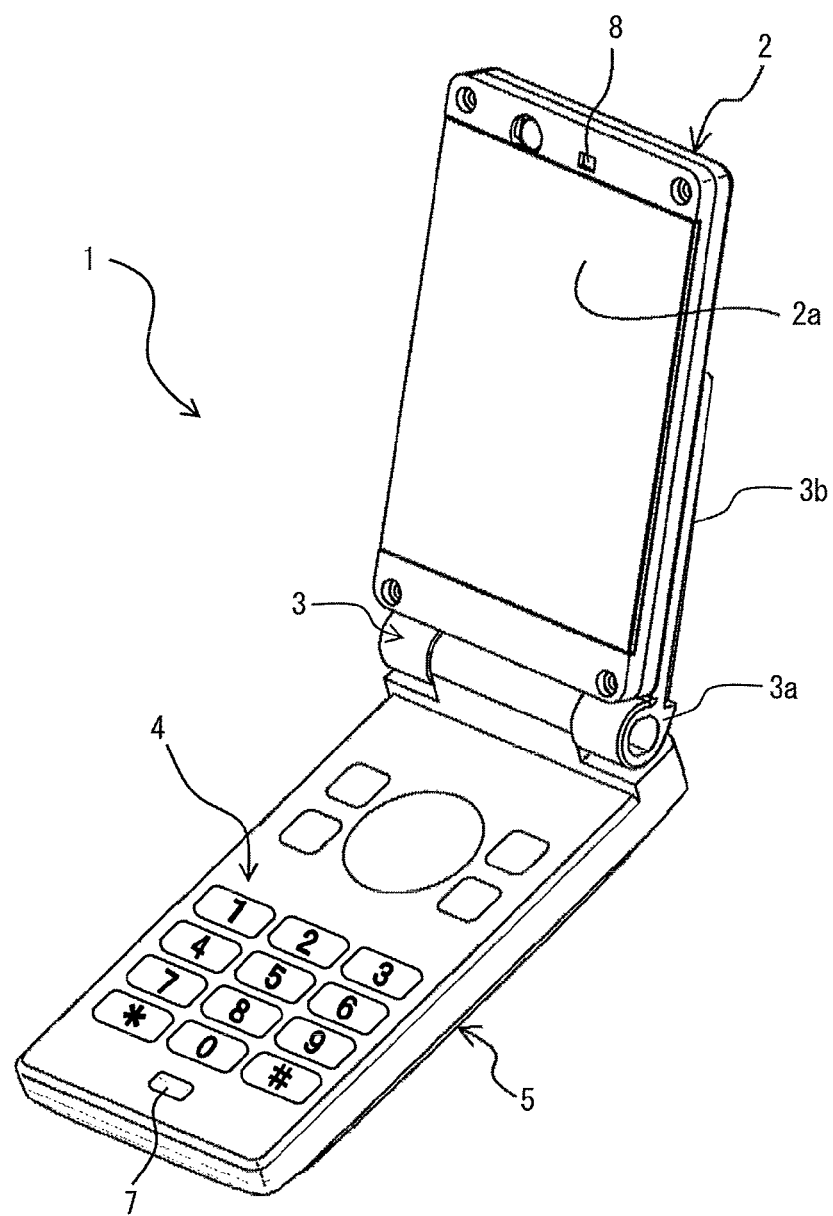

[Fig. 2]
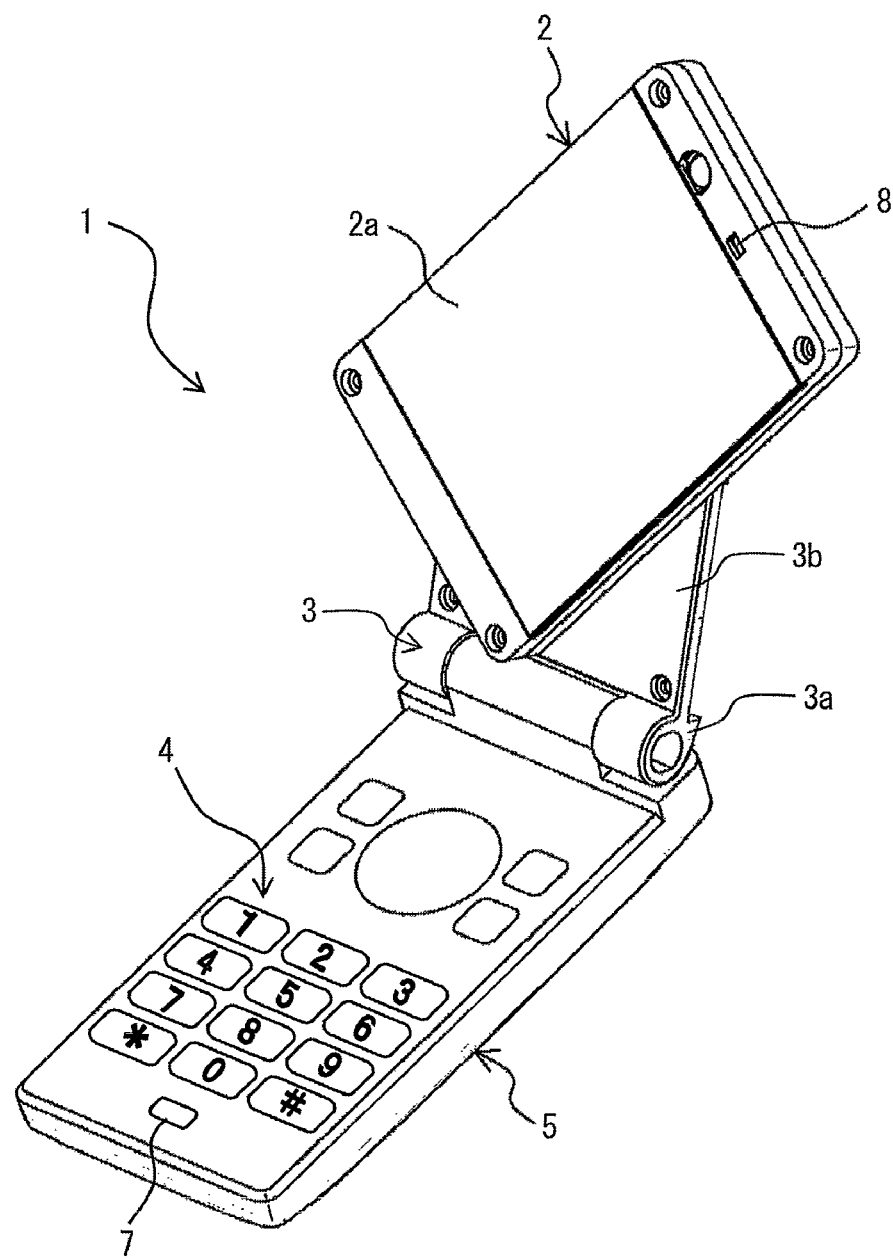

【Fig. 3】
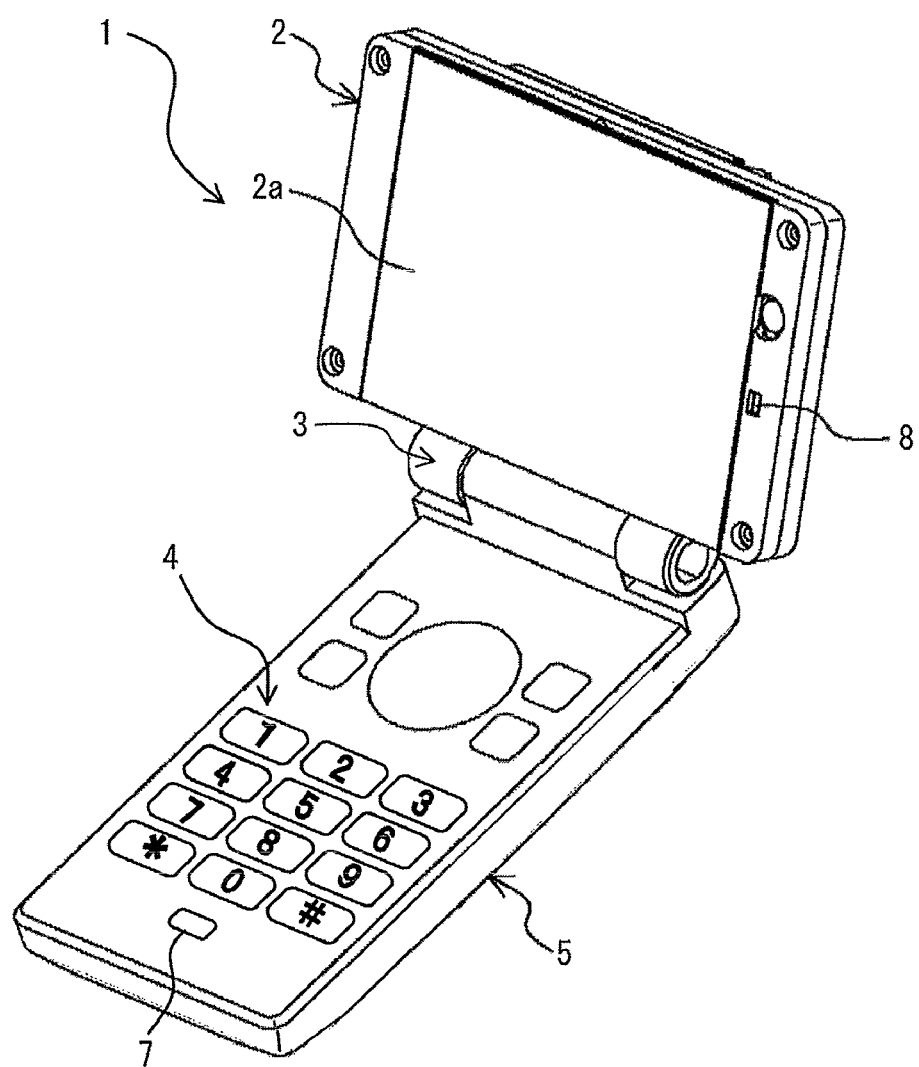

[Fig. 4]
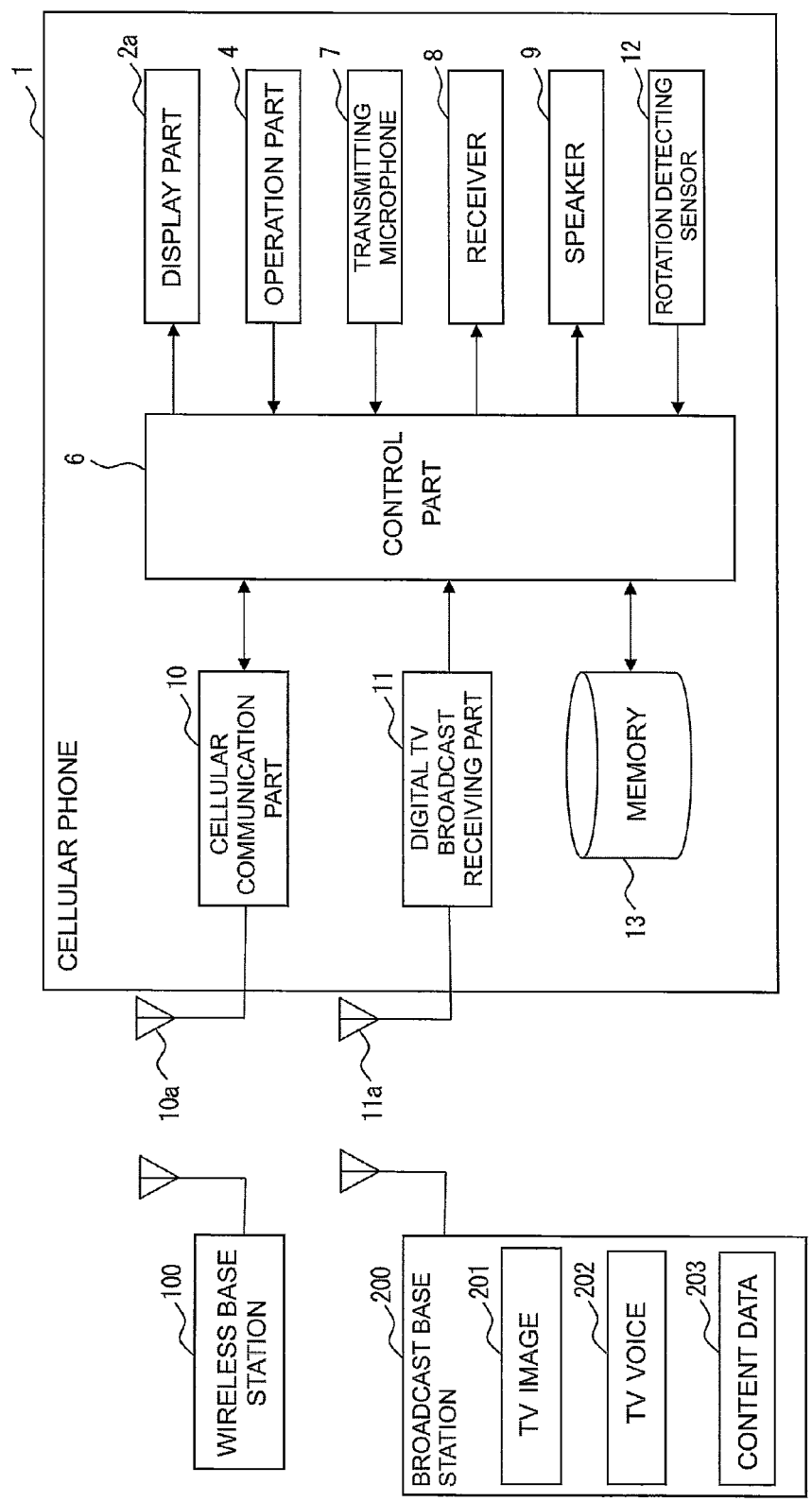

[Fig. 5]
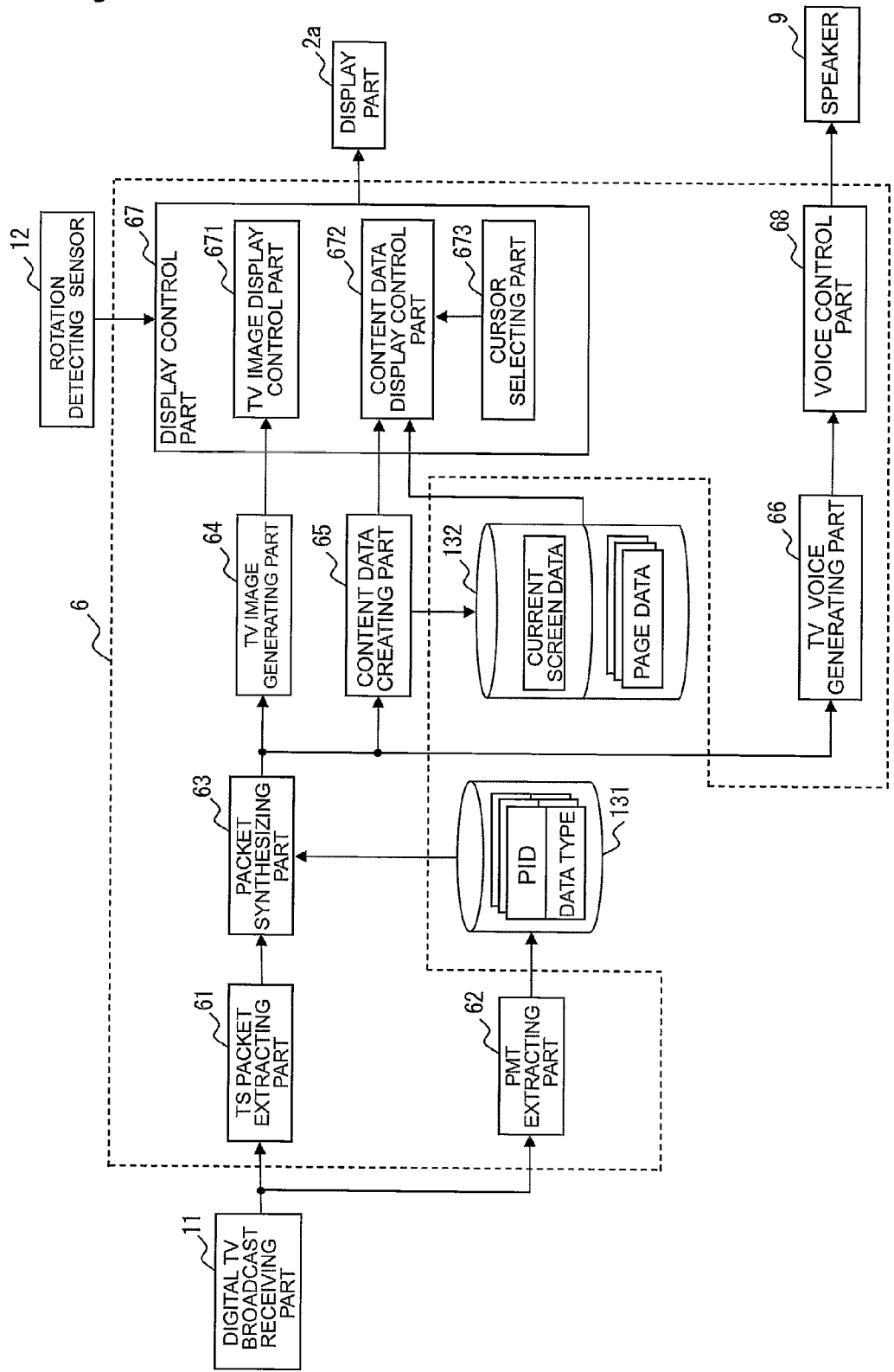

[Fig. 6]
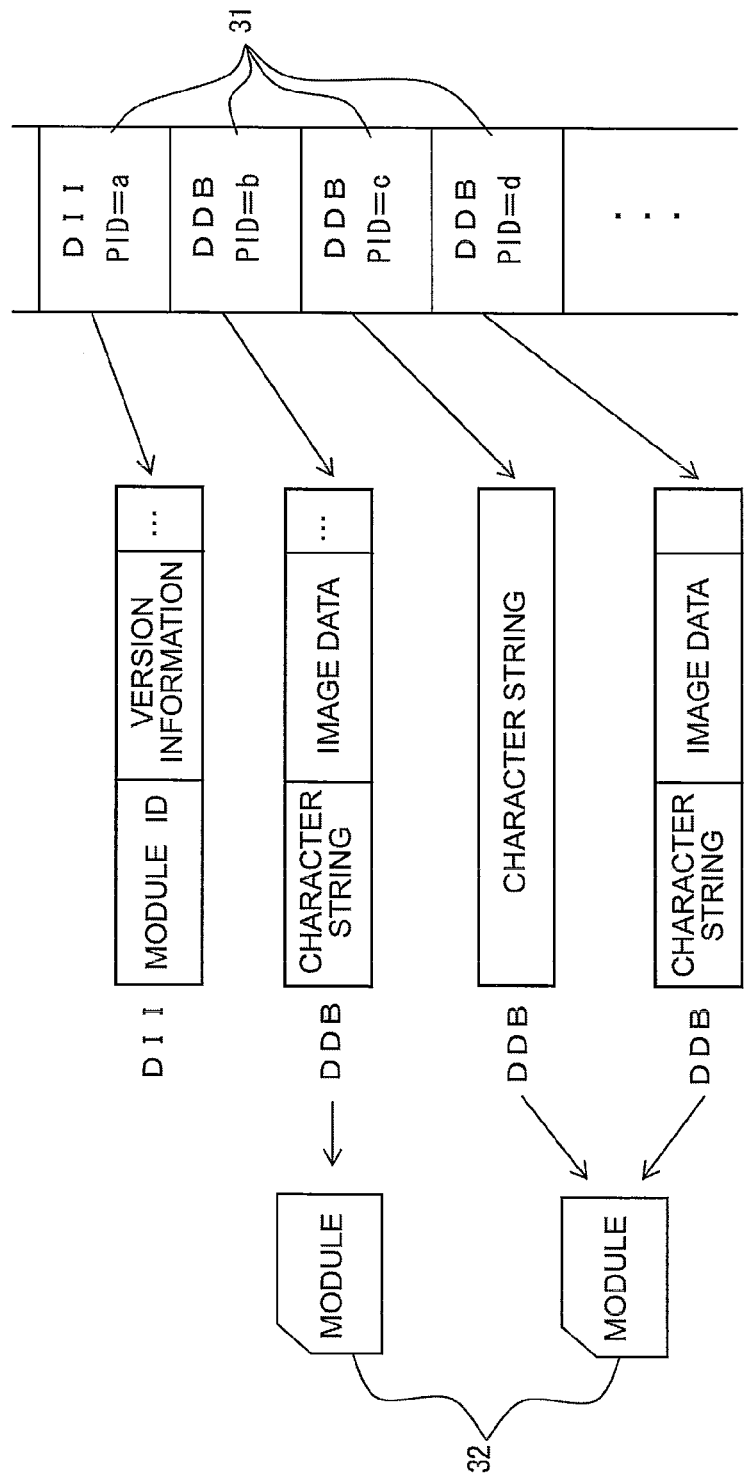

[Fig. 7]
(a) 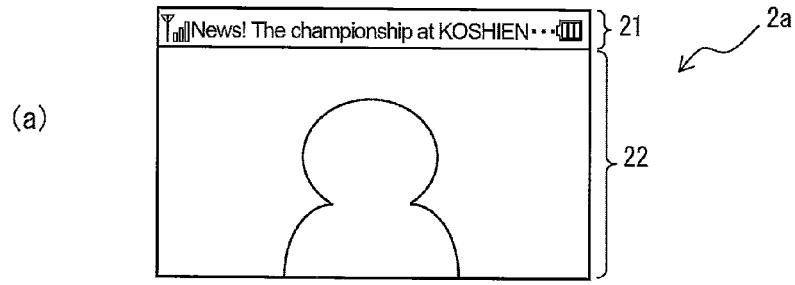
(b) 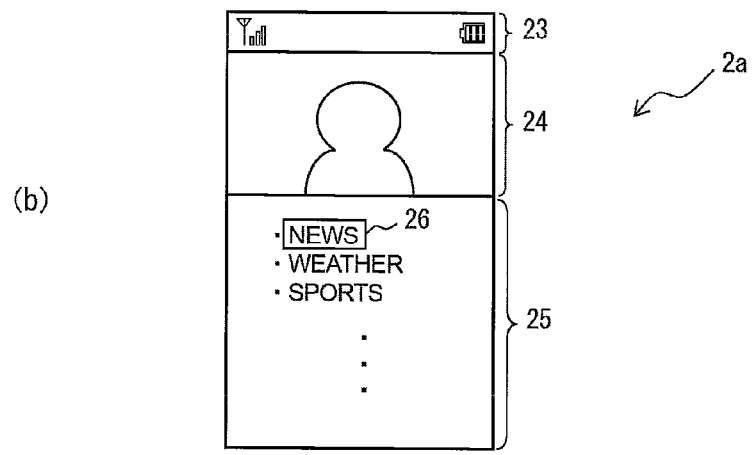
(c) 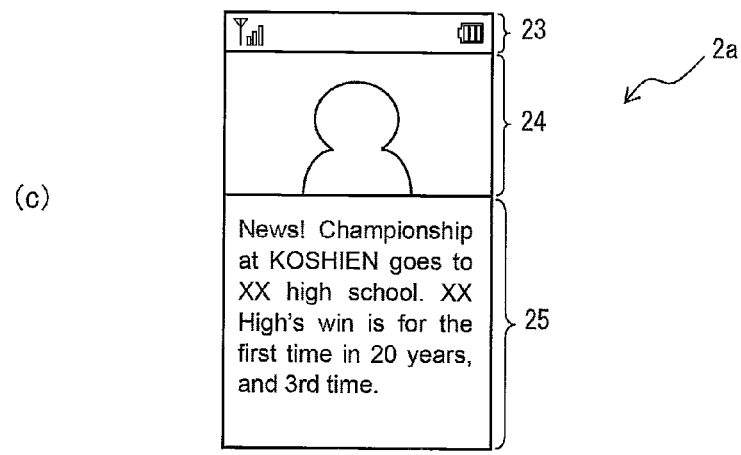

【Fig. 8】
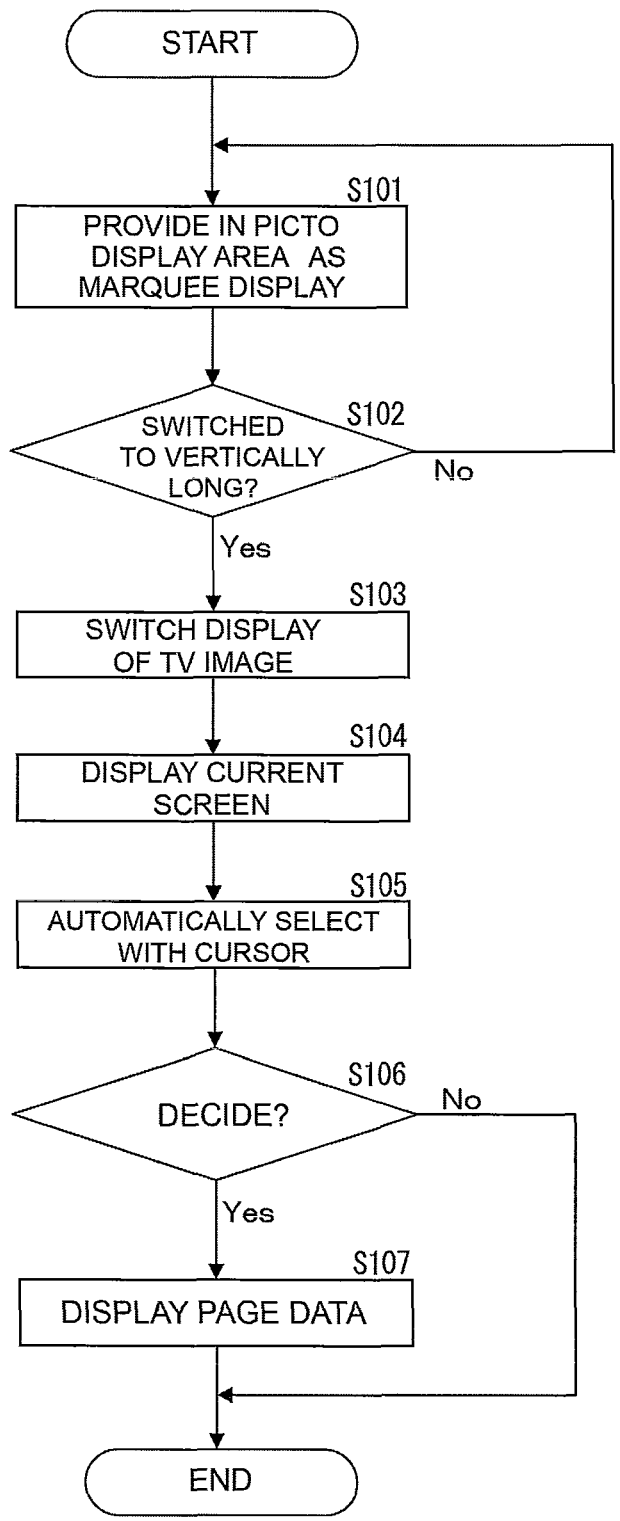

[Fig. 9]
(a) 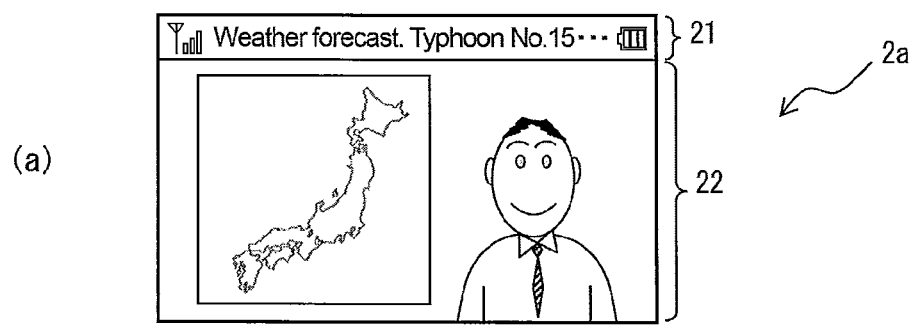
(b) 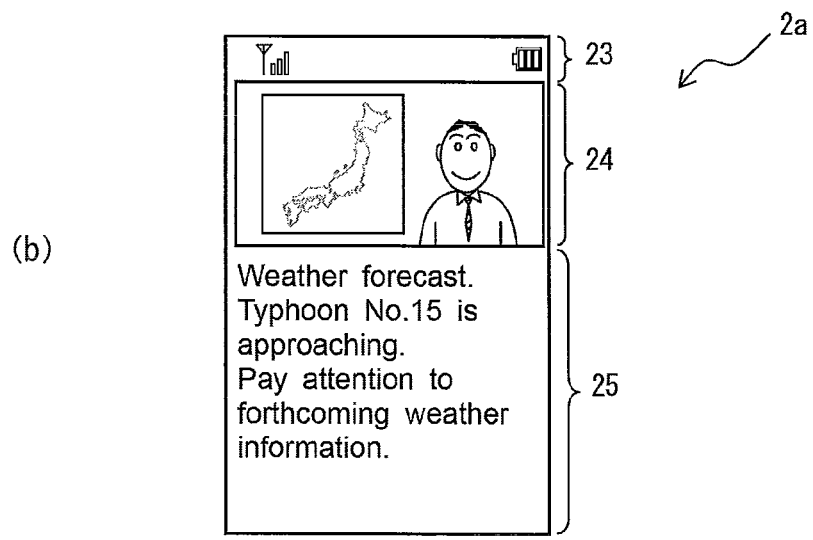

[Fig. 10]
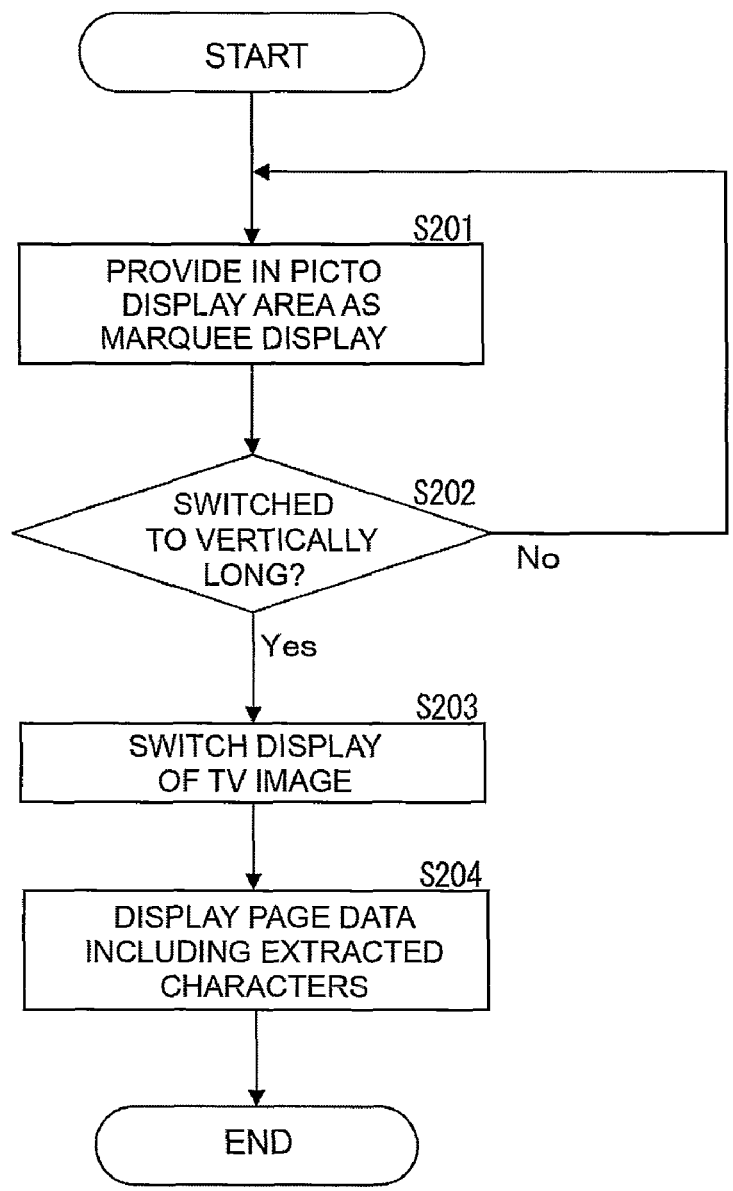

[Fig. 11]
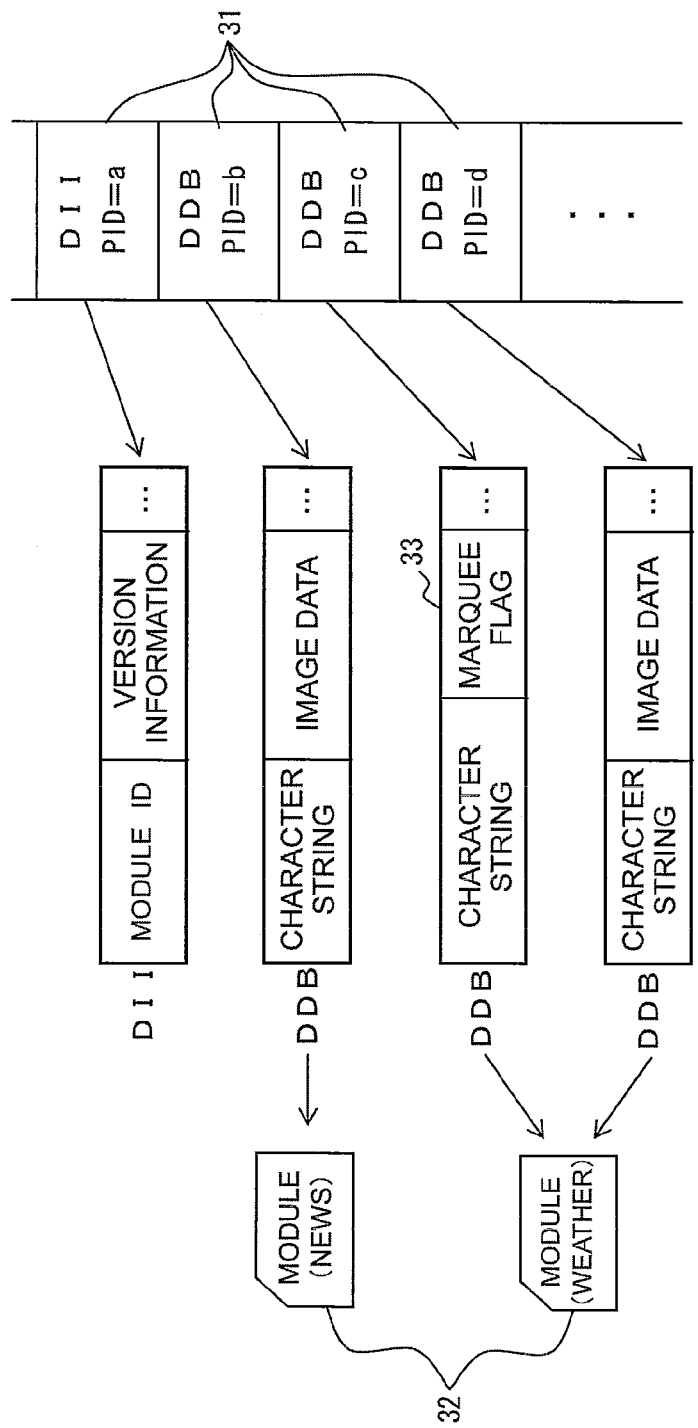

[Fig. 12]
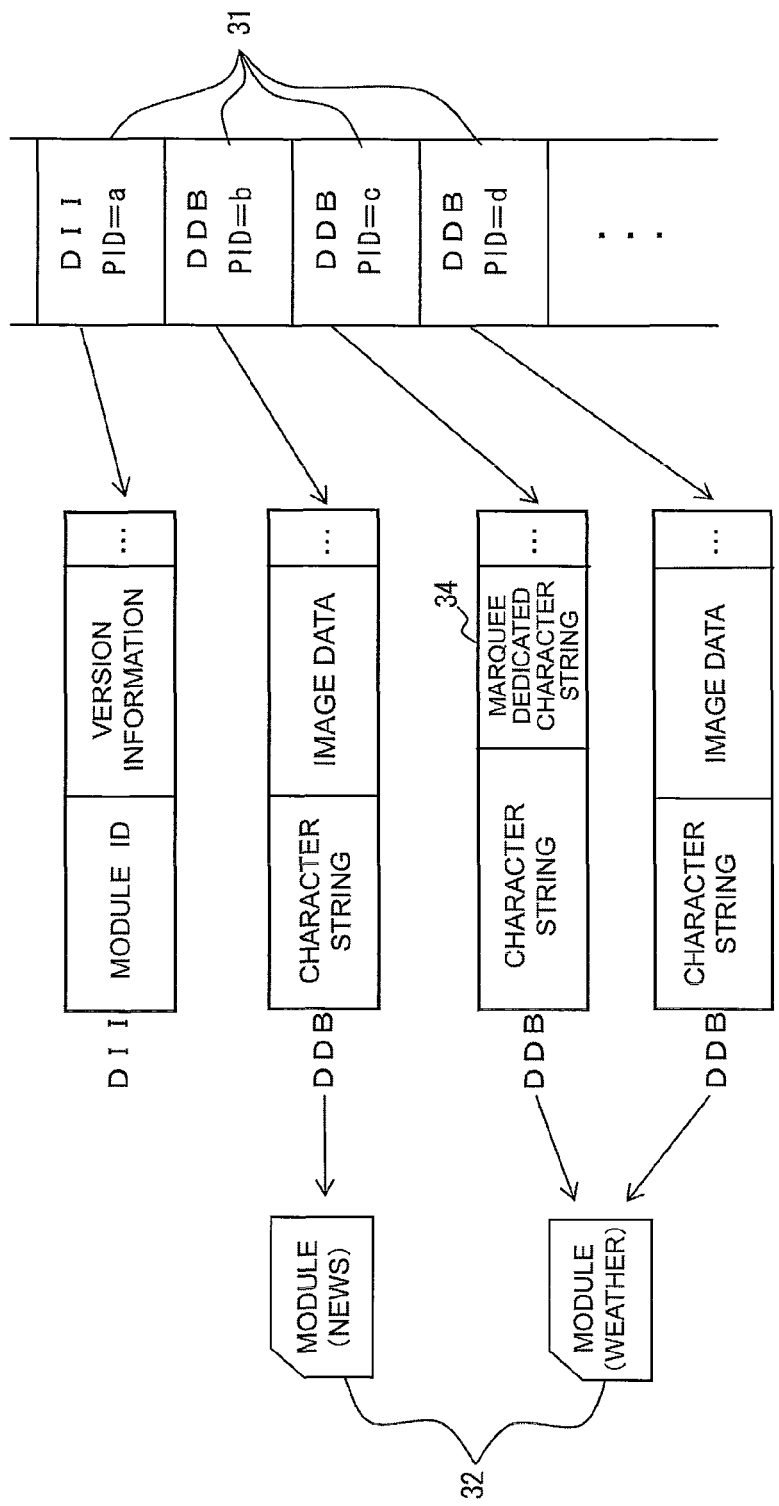

[Fig. 13]
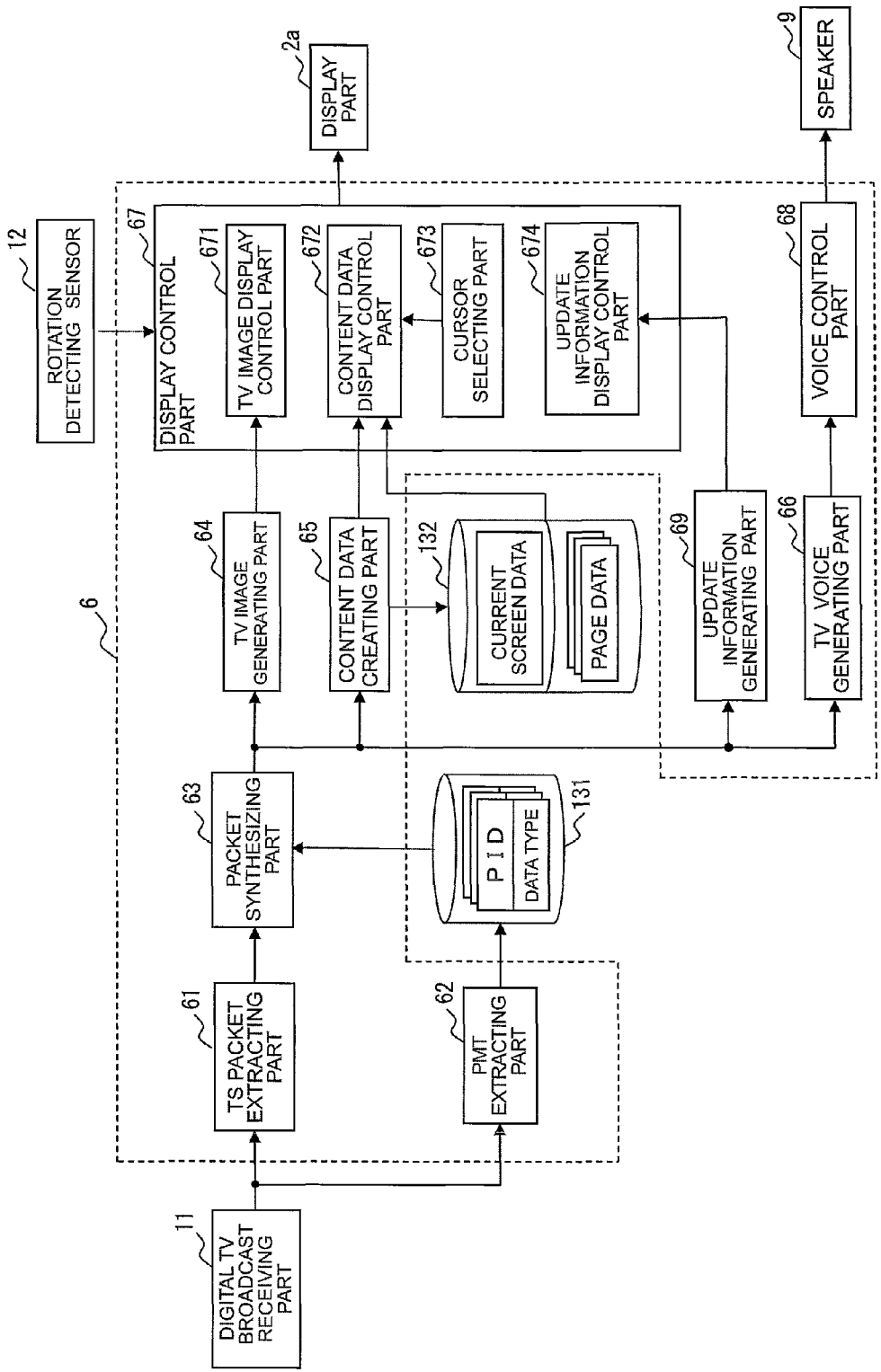

[Fig. 14]
(a) 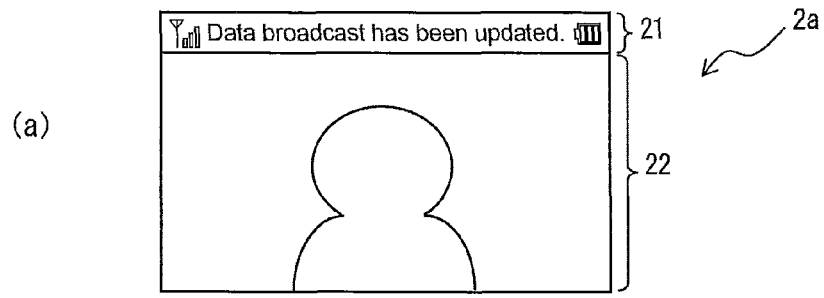
(b) 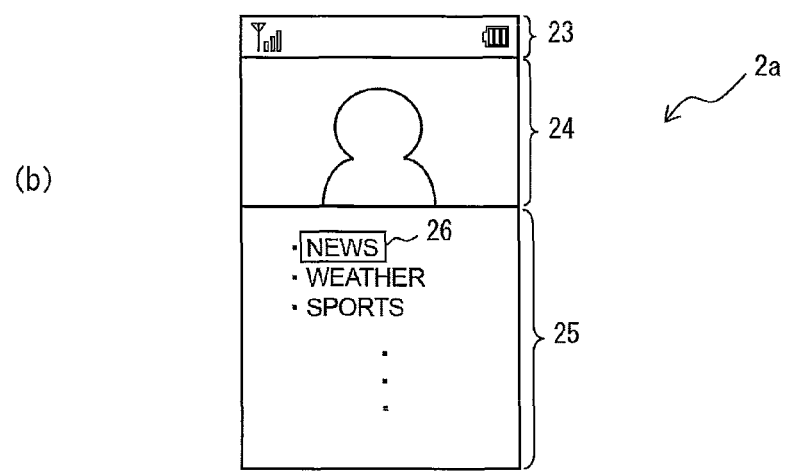
(c) 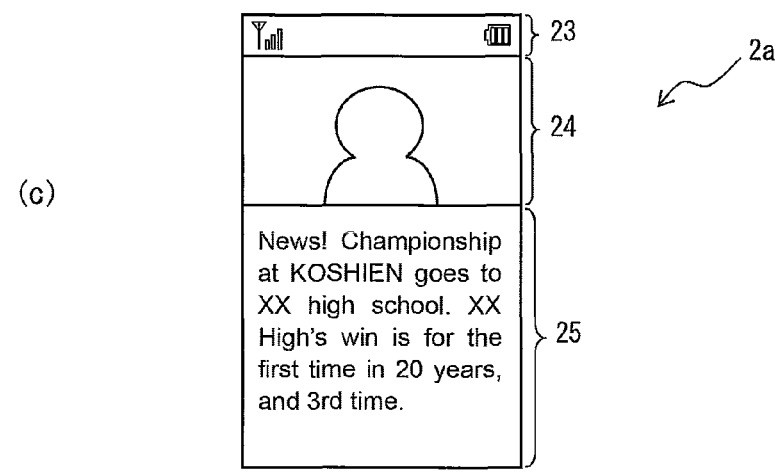

[Fig. 15]
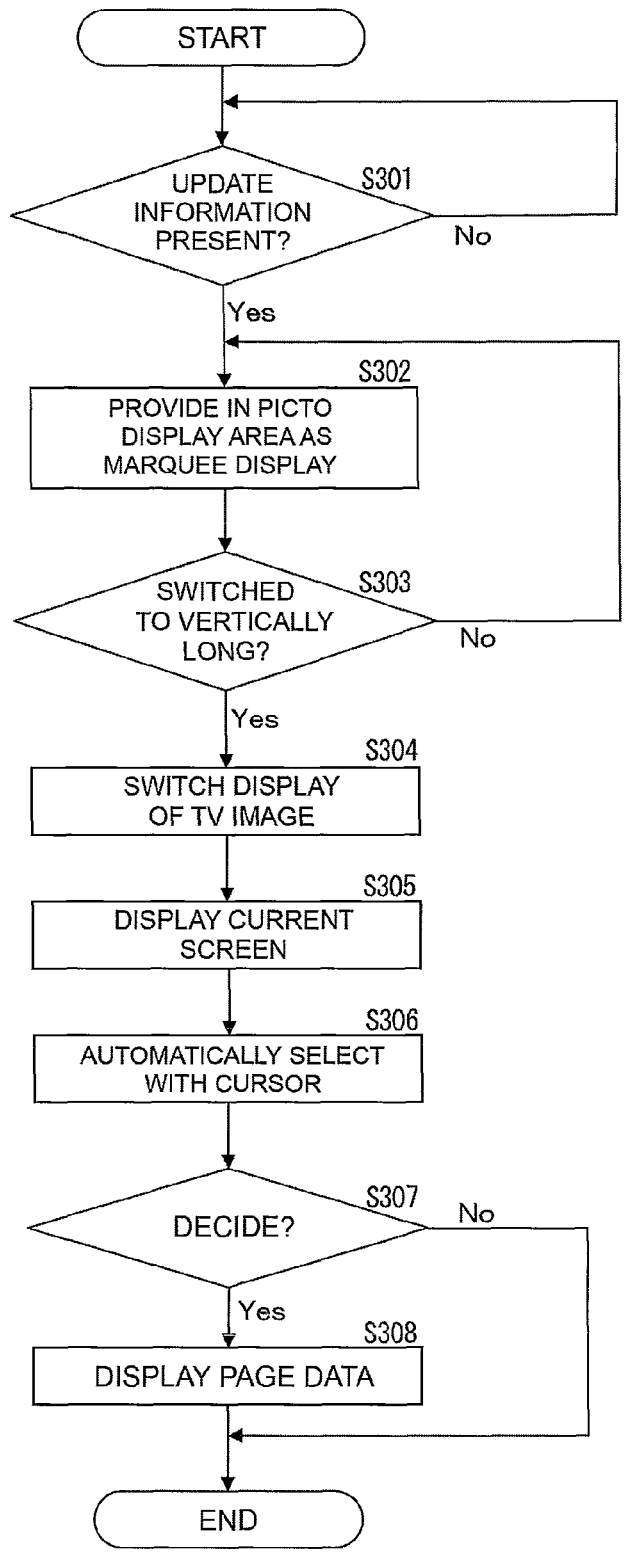

[Fig. 16]
(a) 
(b) 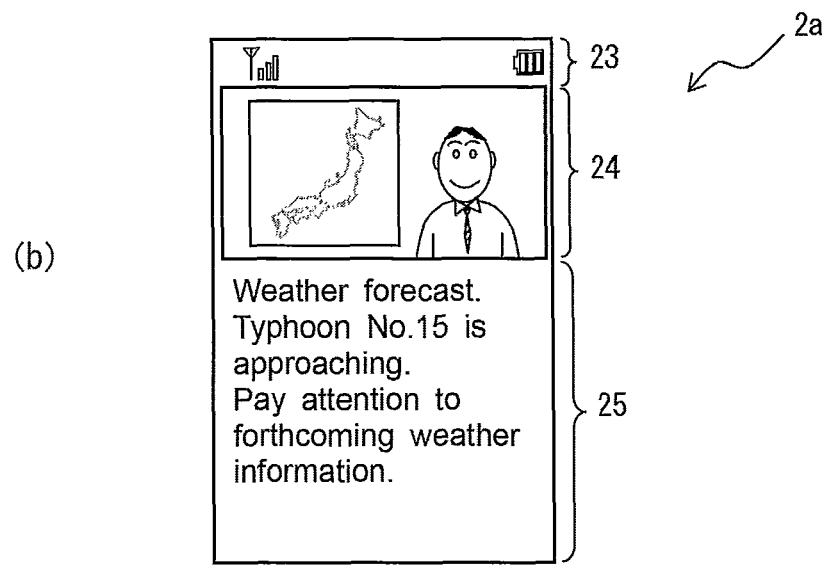

[Fig. 17]
(a) 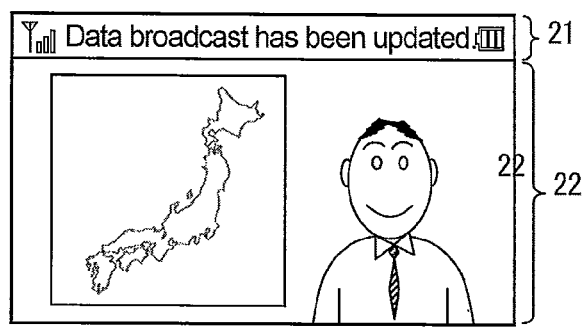
(b) 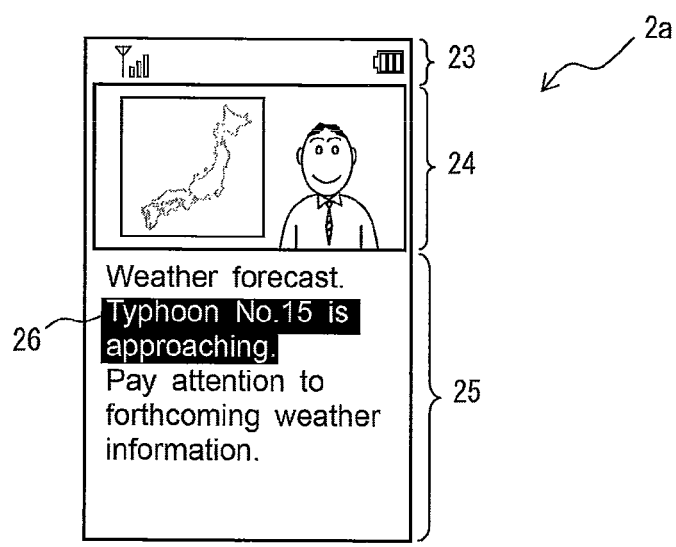

[Fig. 18]
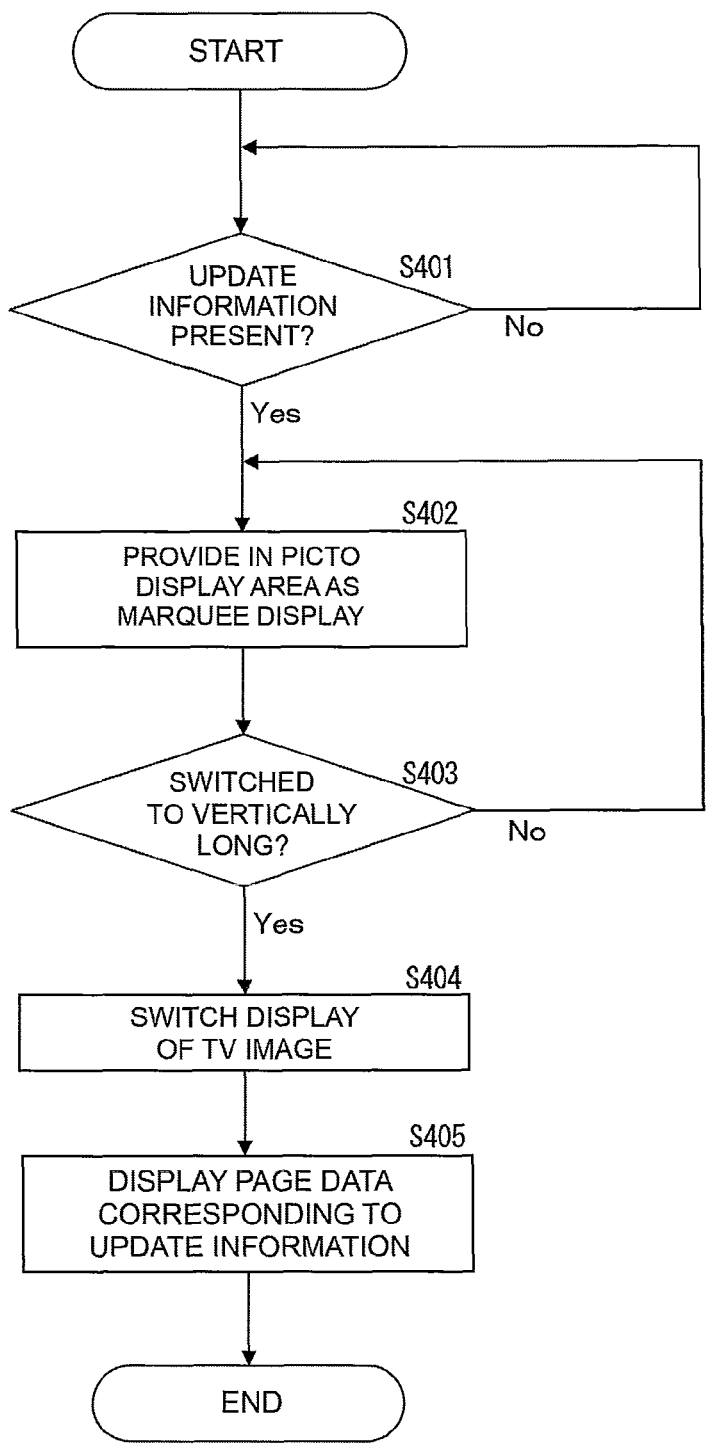

[Fig. 19]
(a) 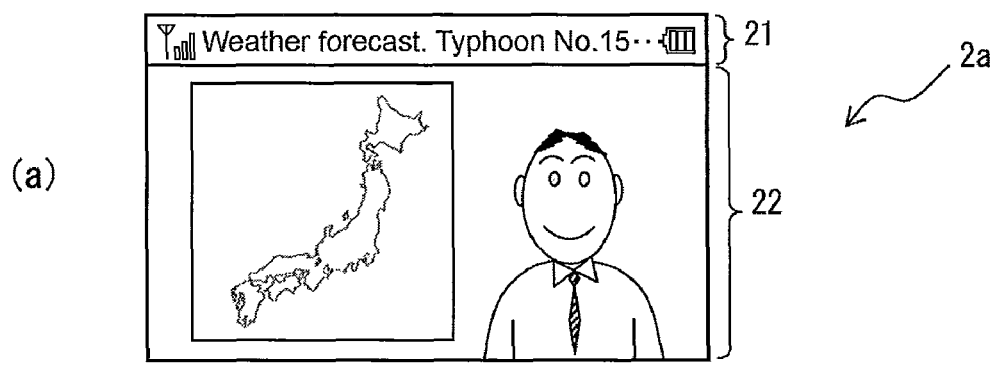
(b) 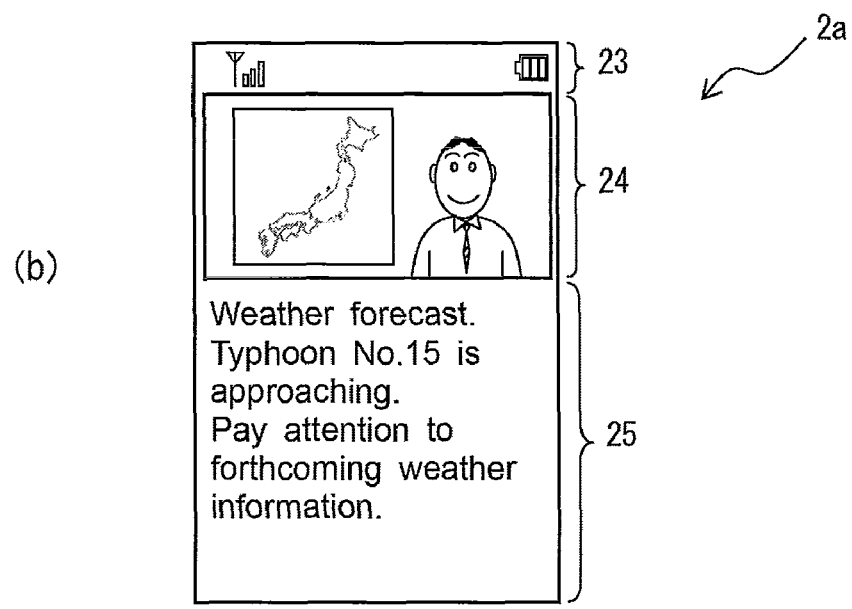

[Fig. 20]
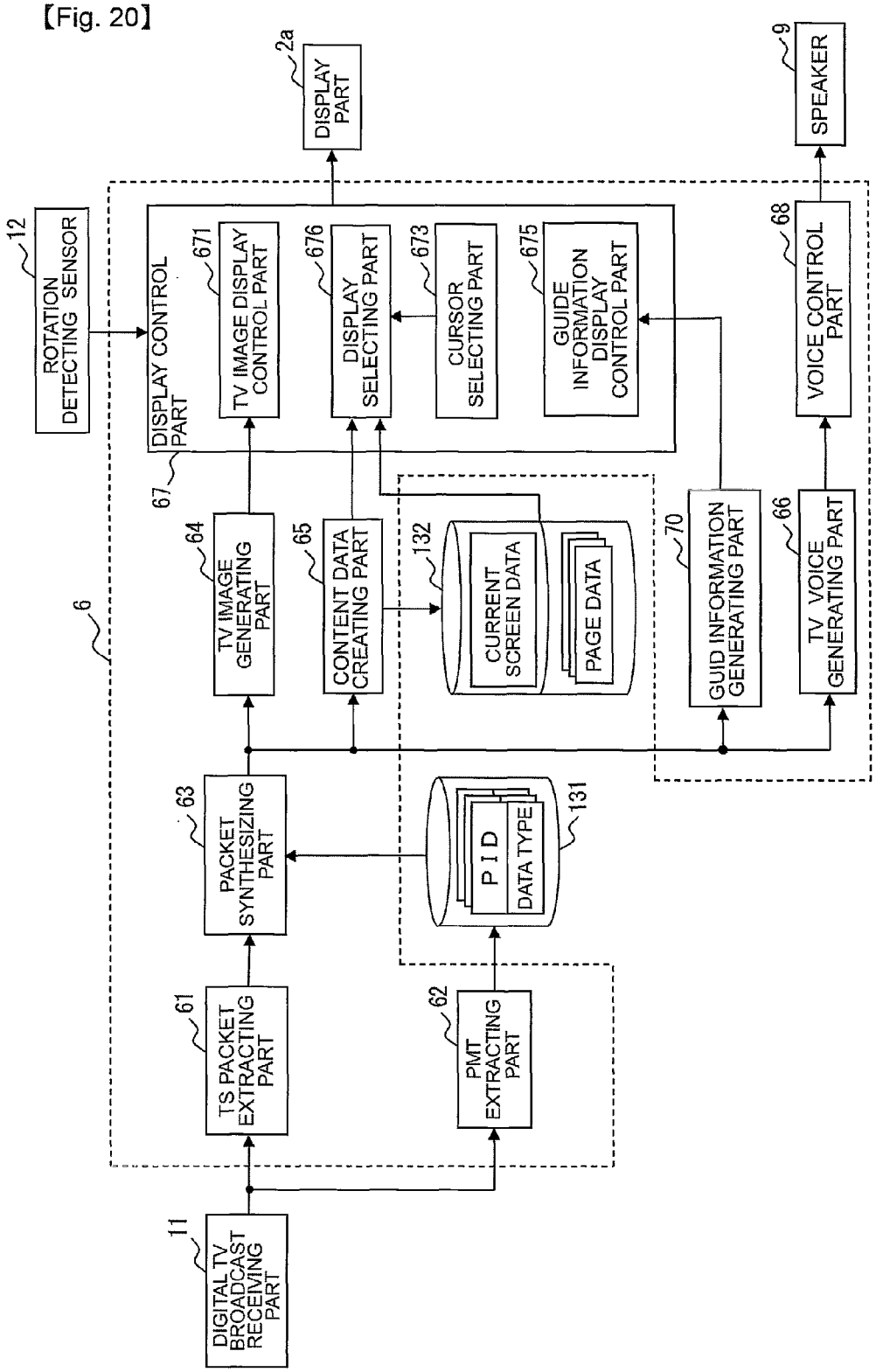

[Fig. 21]
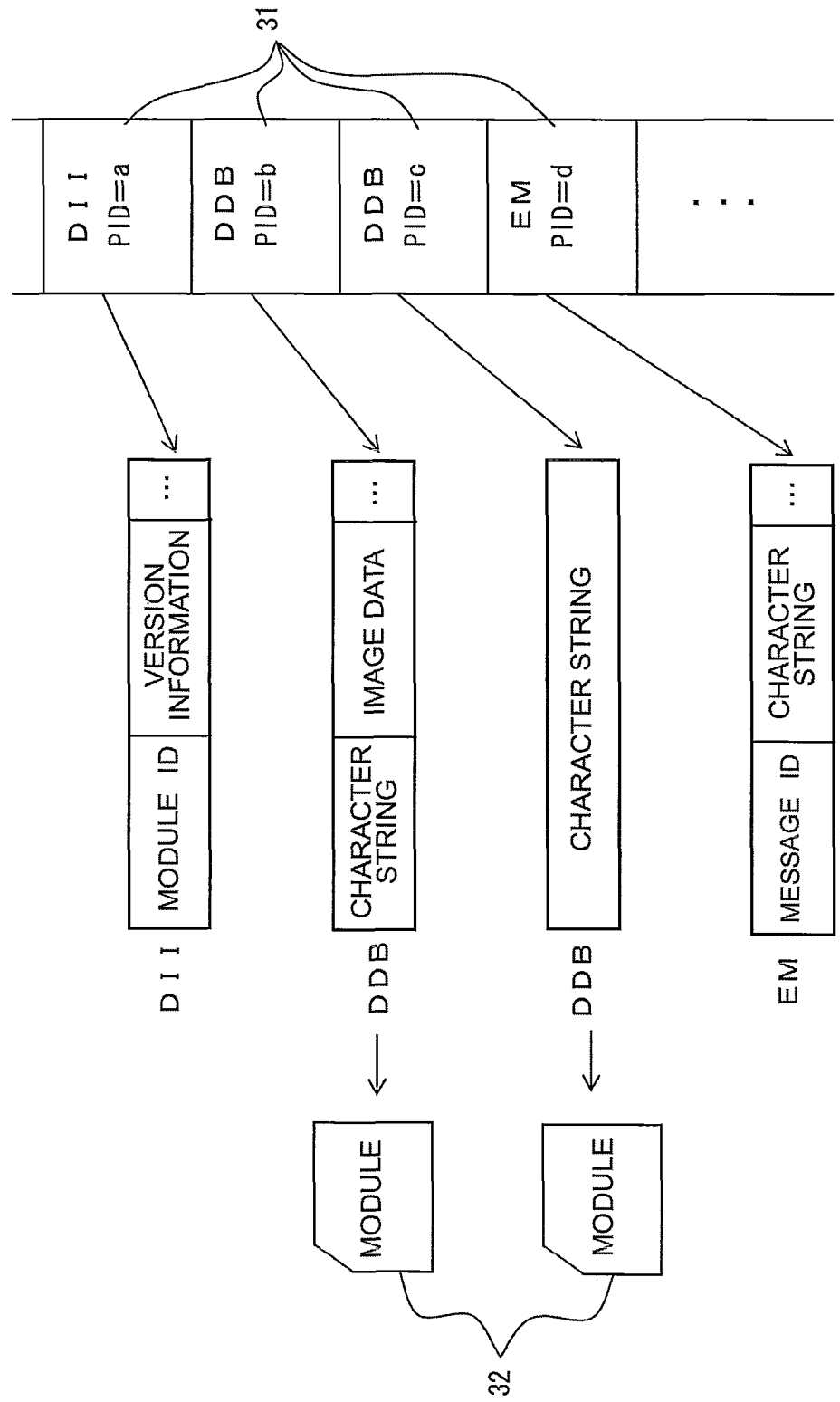

[Fig. 22]
(a) 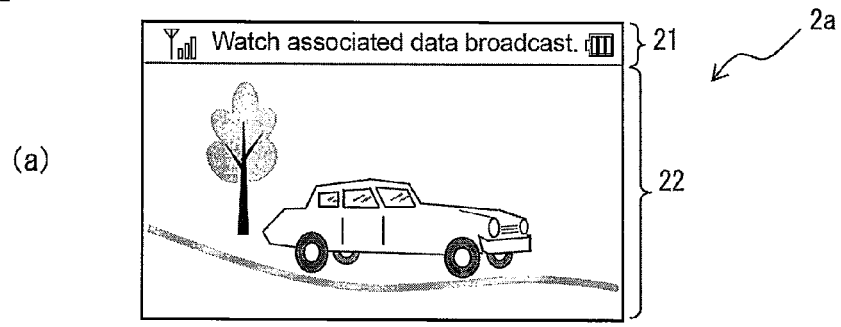
(b) 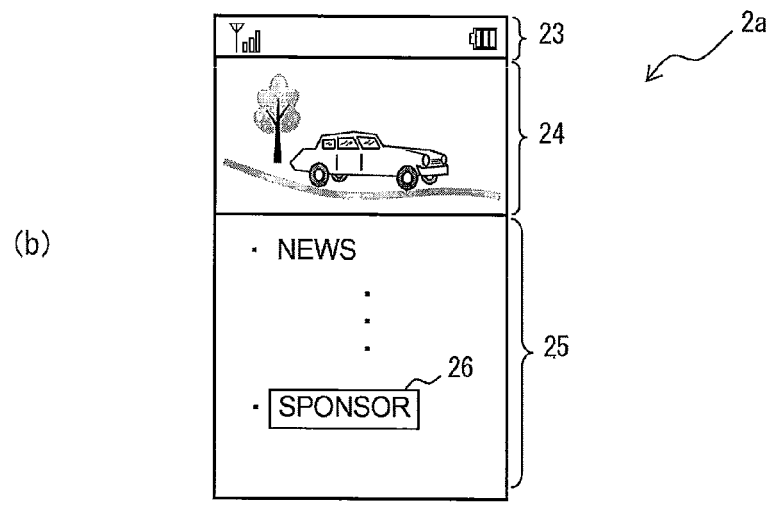
(c) 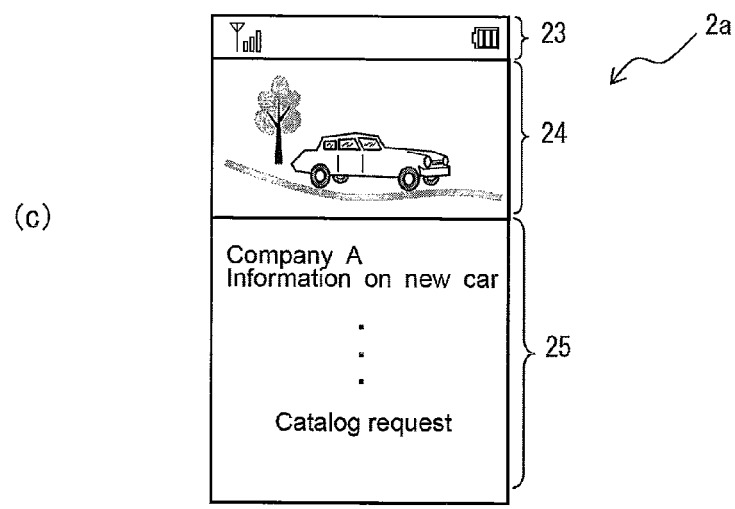

[Fig. 23]
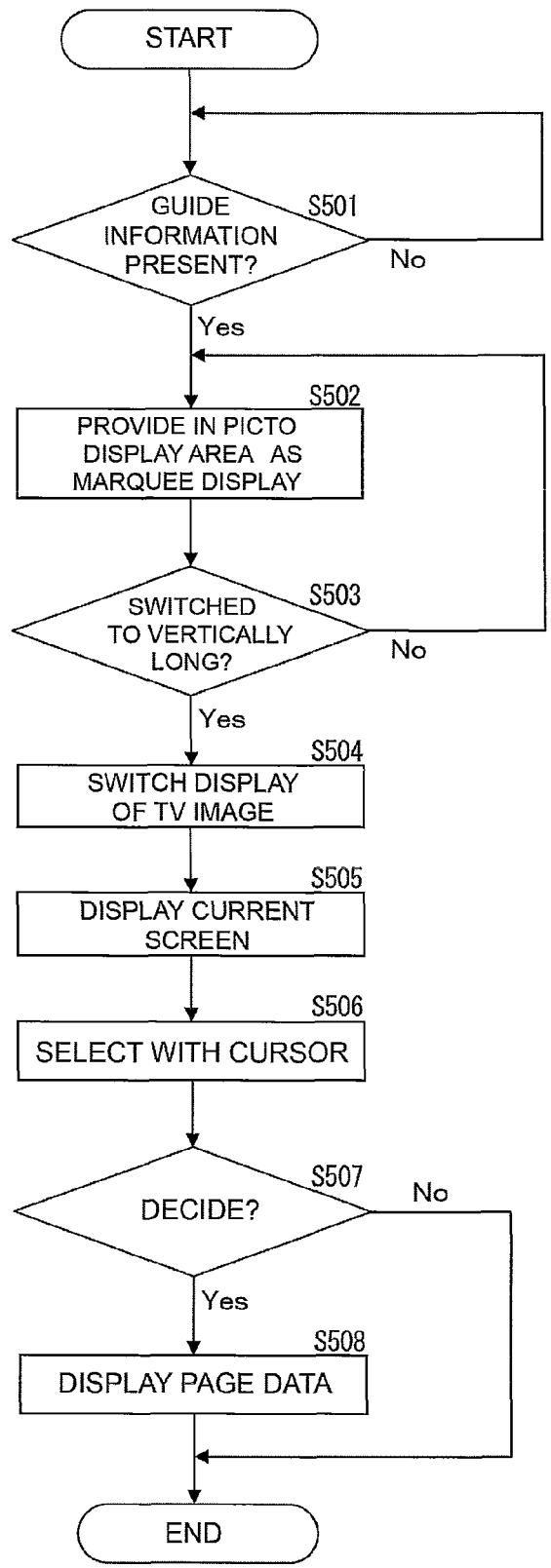

【Fig. 24】
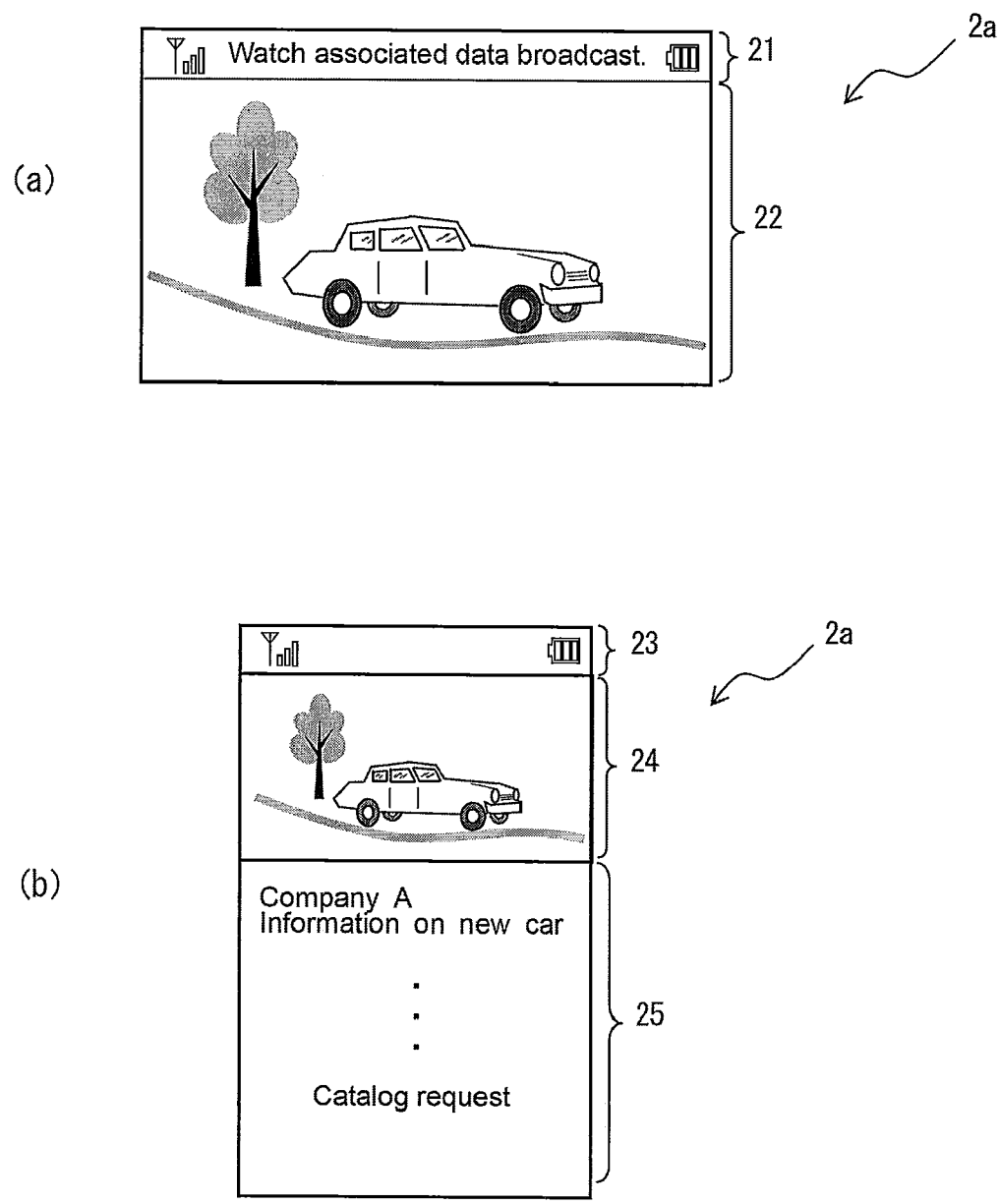

[Fig. 25]
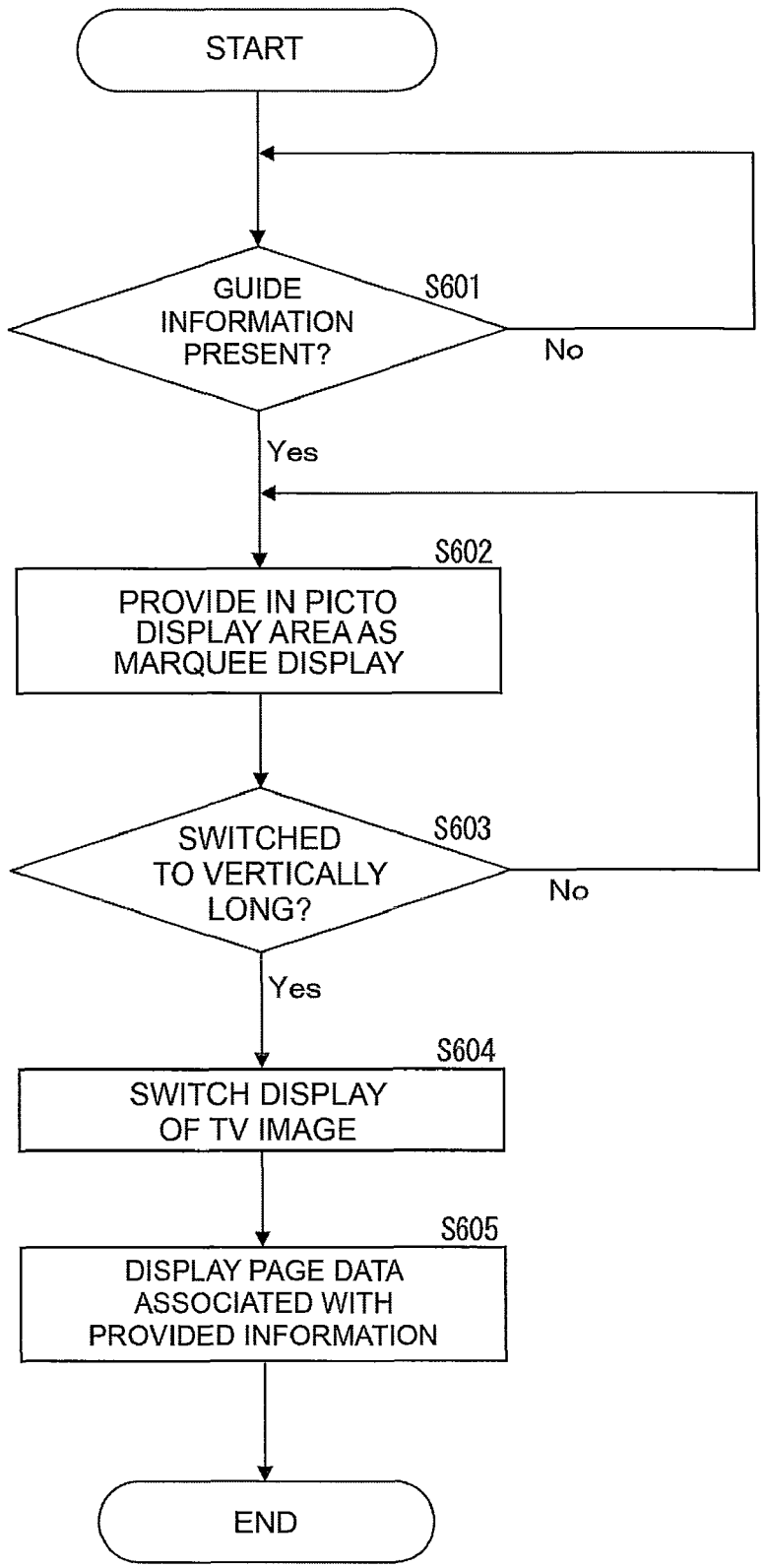

[Fig. 26]
(a) 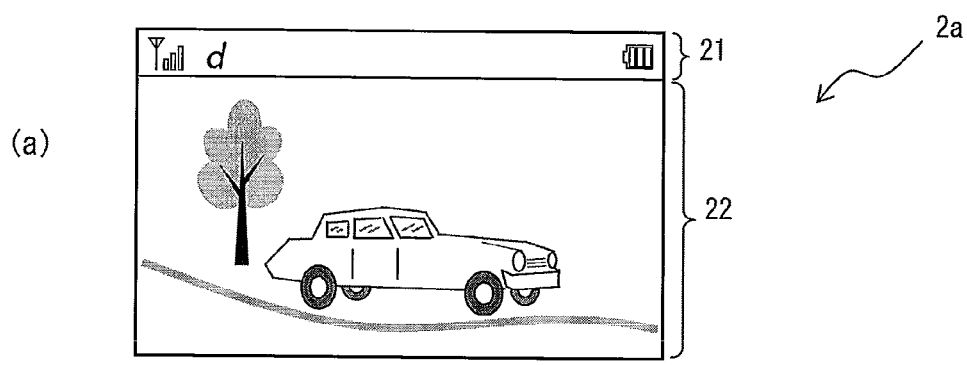
(b) 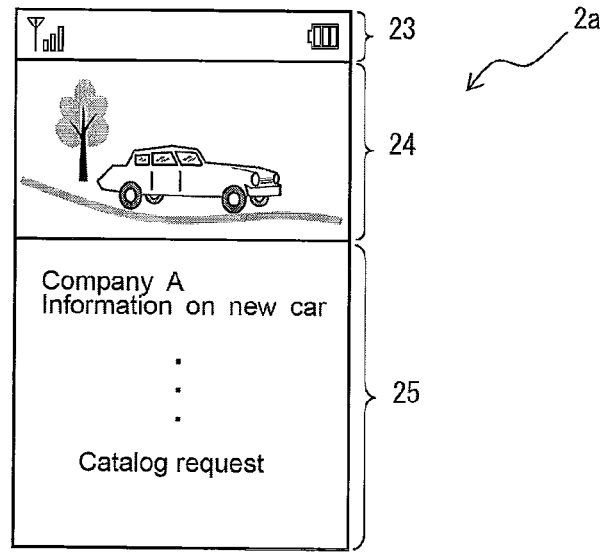

【Fig. 27】
(a) 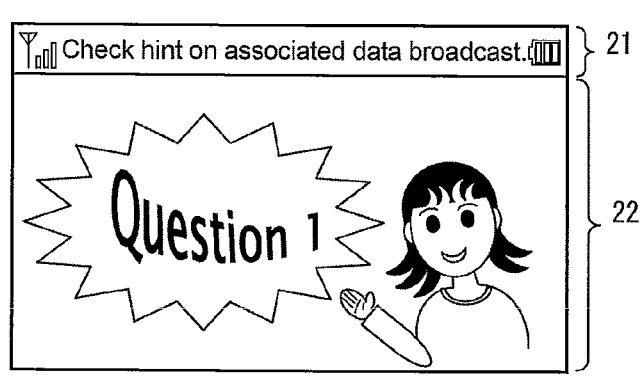
(b) 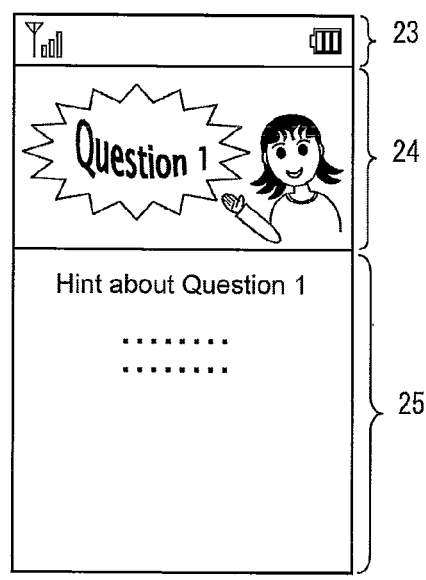

[Fig. 28]
(a) 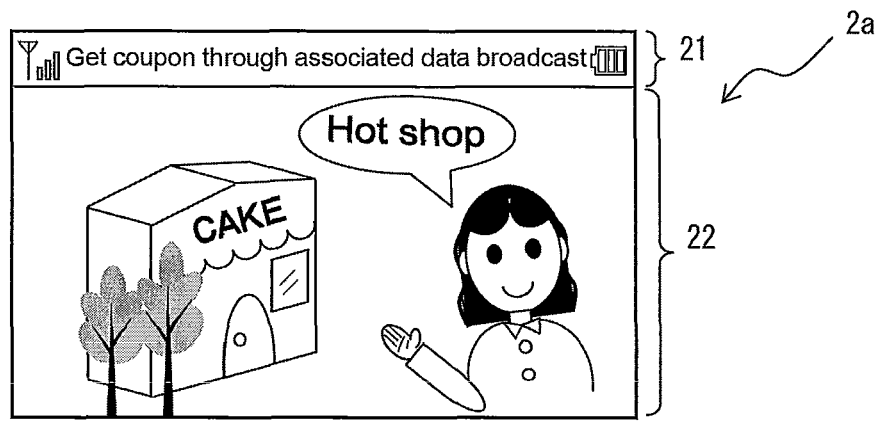
(b) 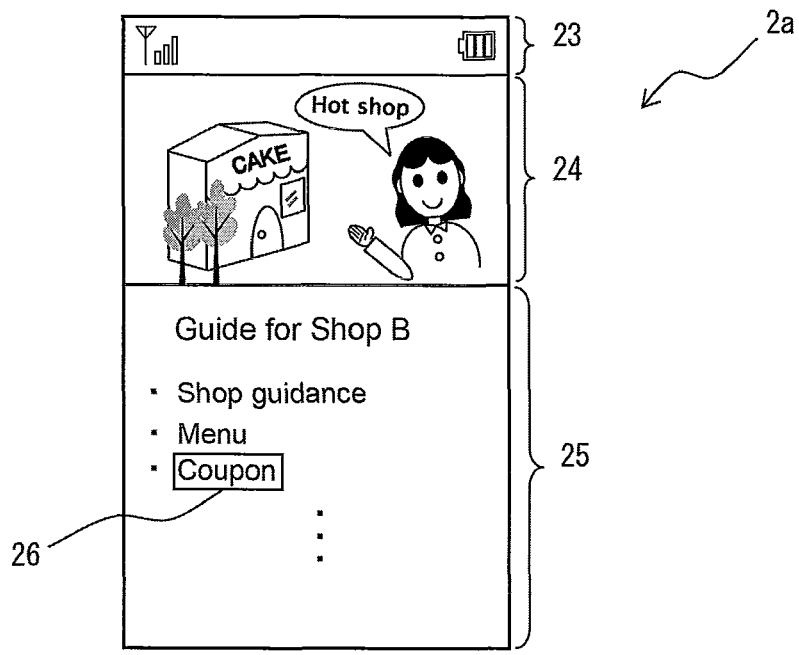

[Fig. 29]
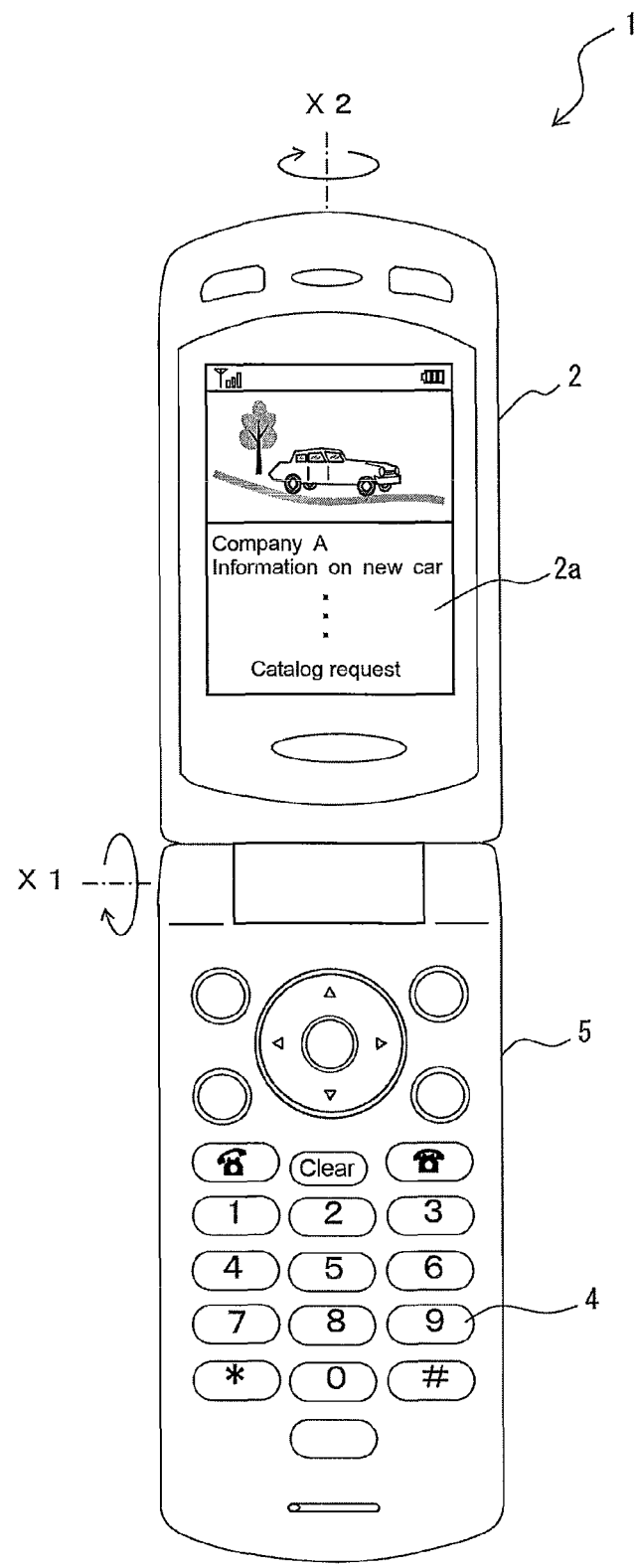

[Fig. 30]
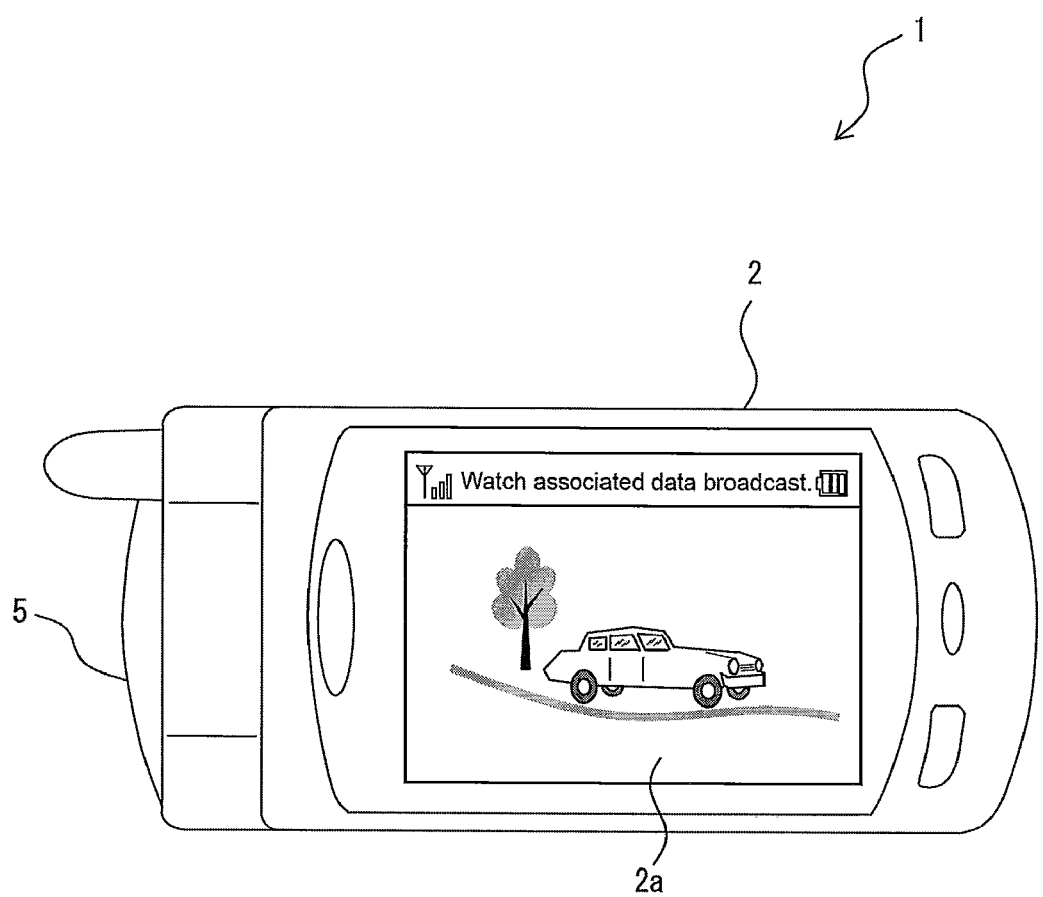

【Fig. 31】
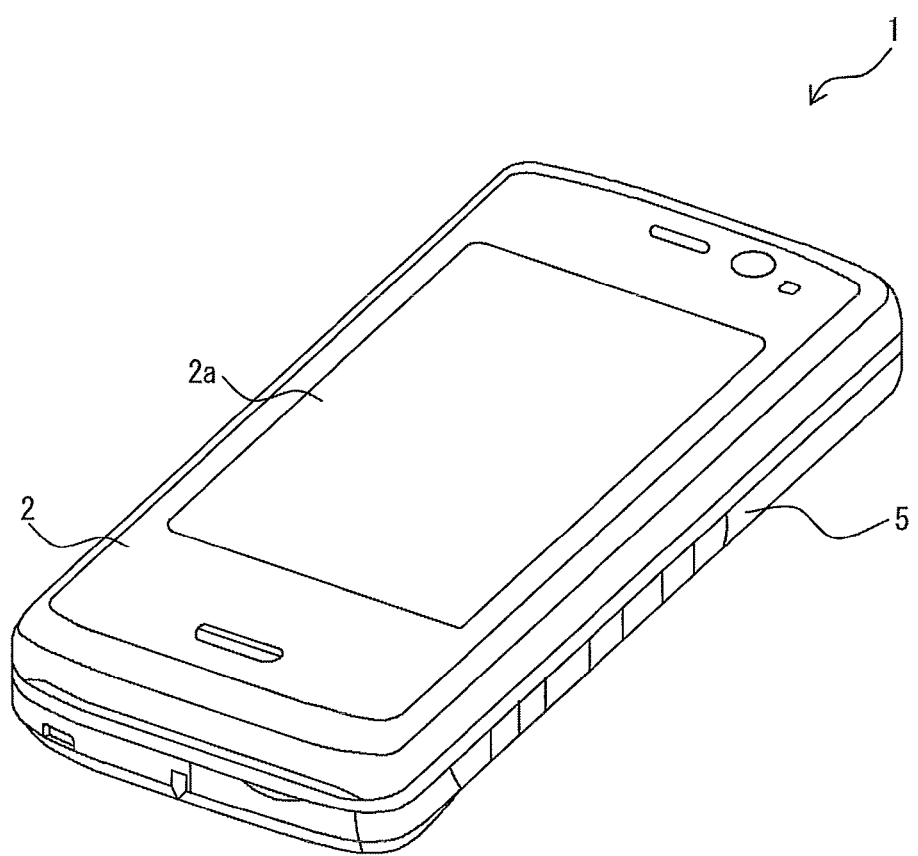

【Fig. 32】
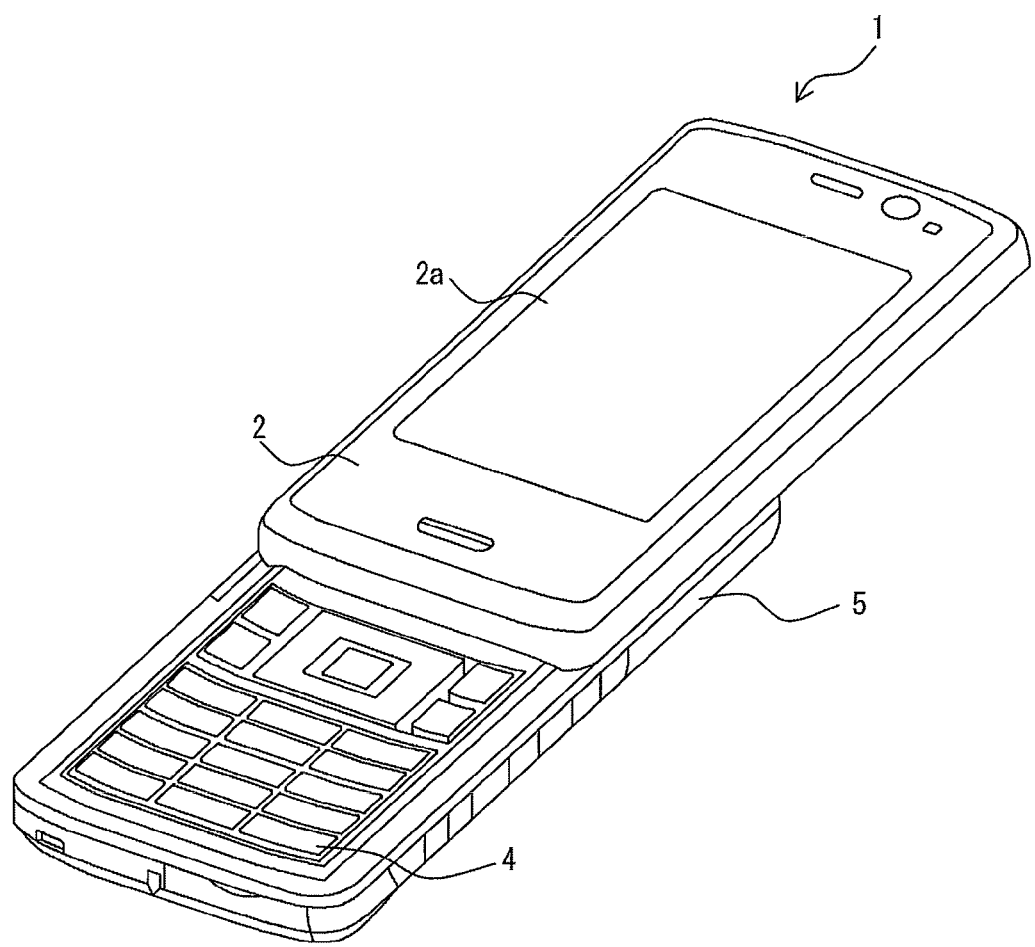

[Fig. 33]
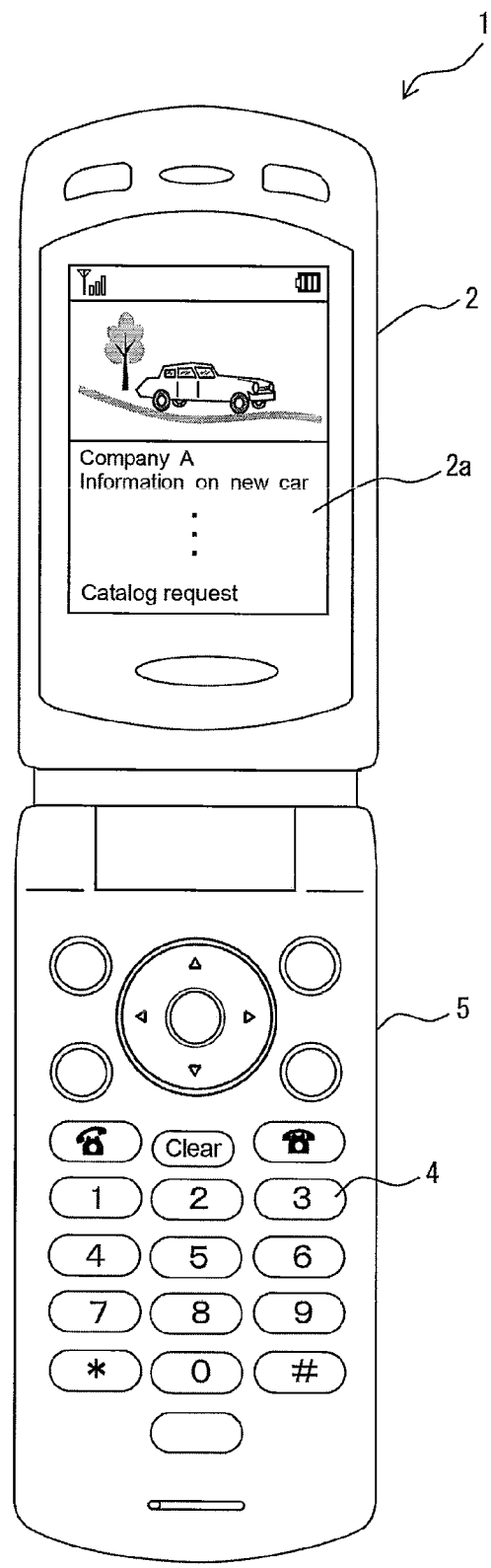

[Fig. 34]
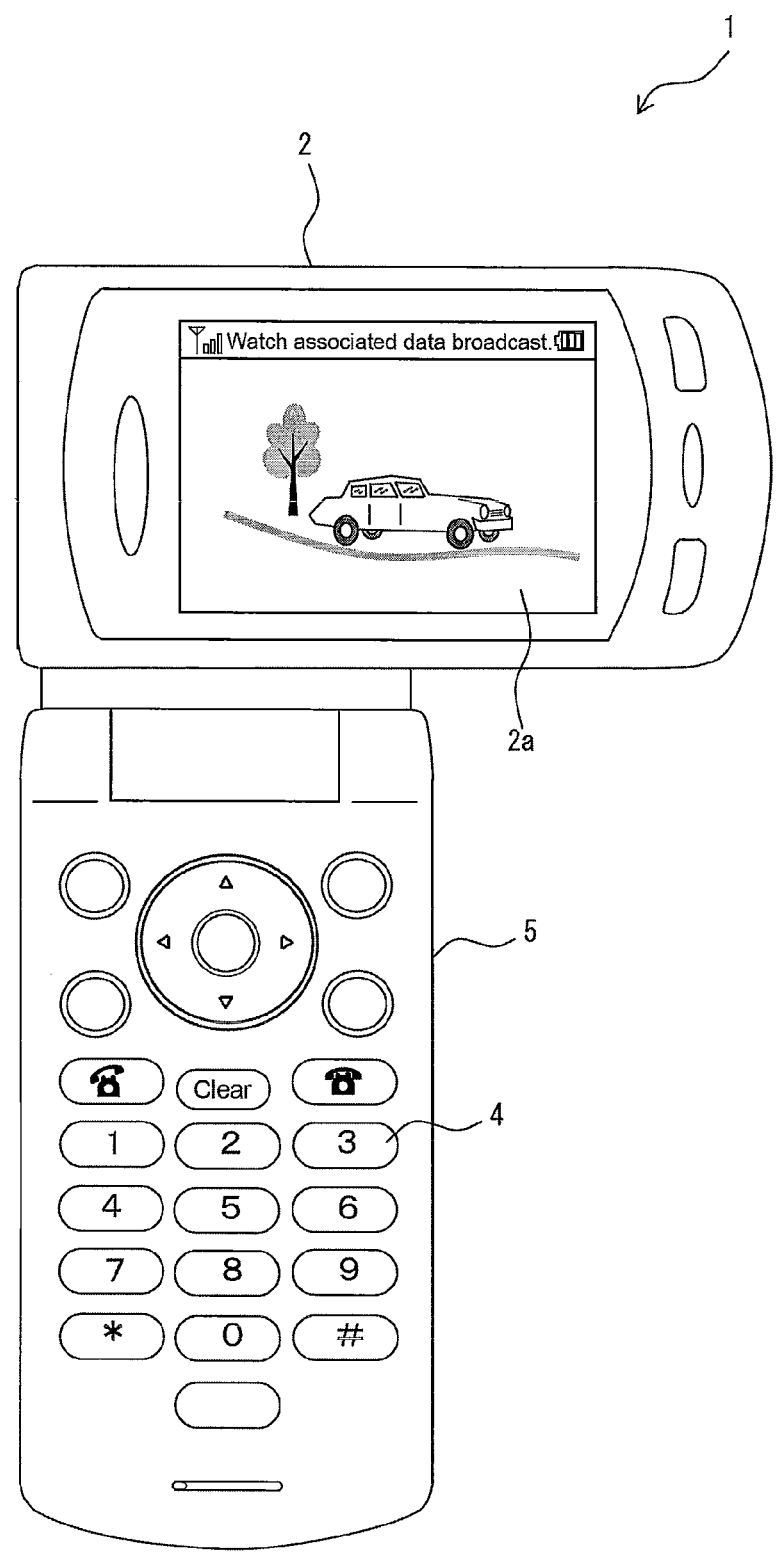

【Fig. 35】
(a)
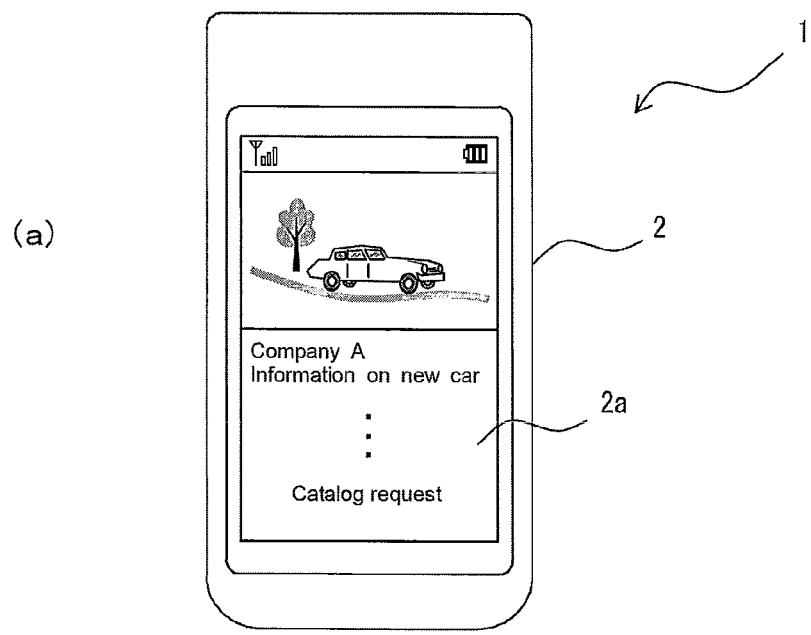
(b)
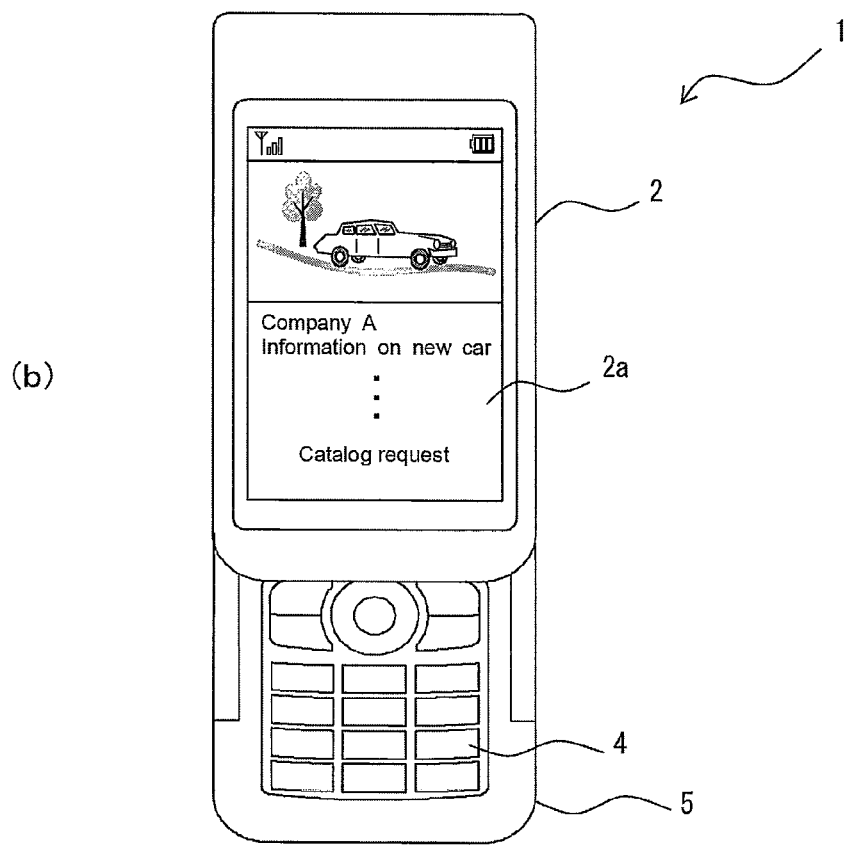

[Fig. 36]
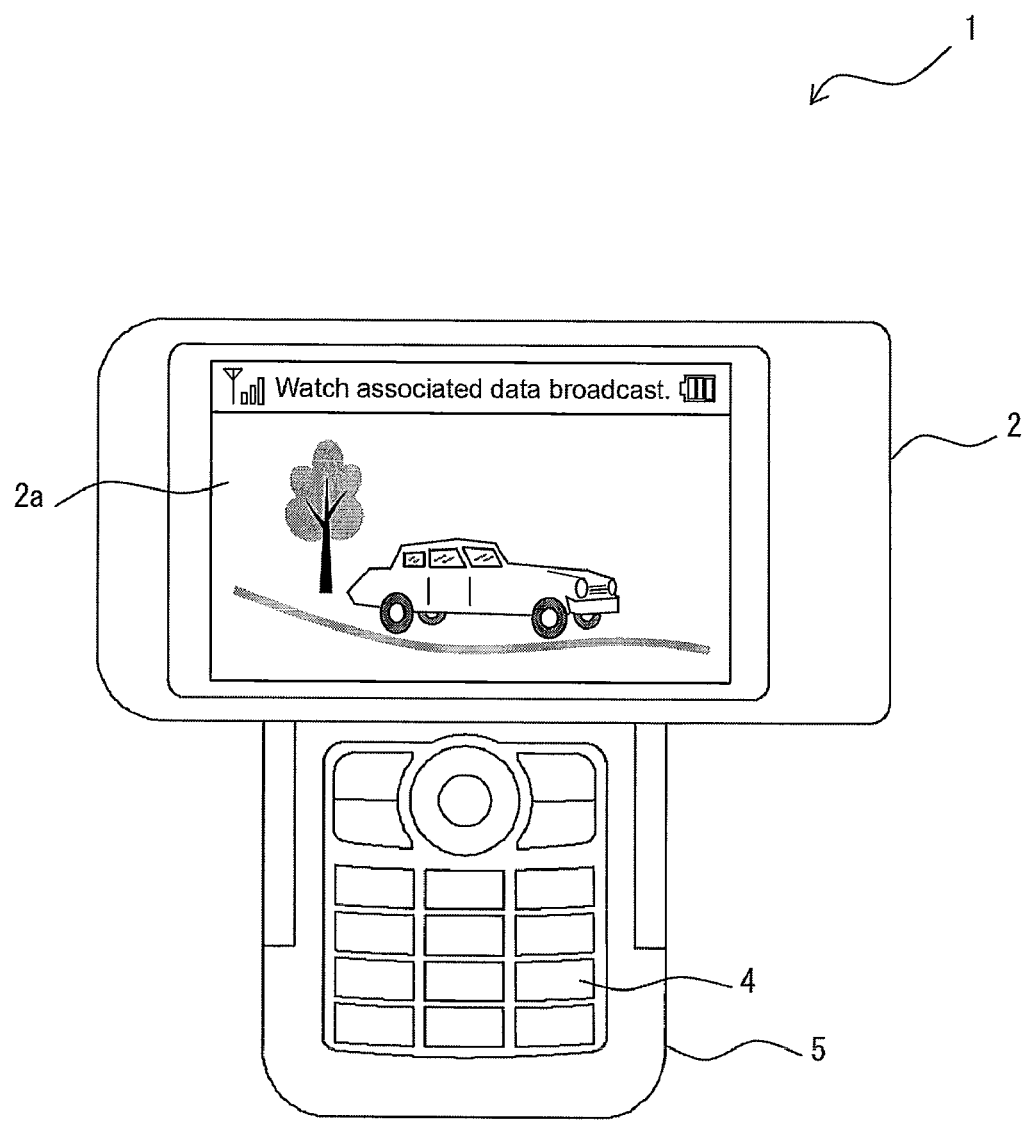

【Fig. 37】
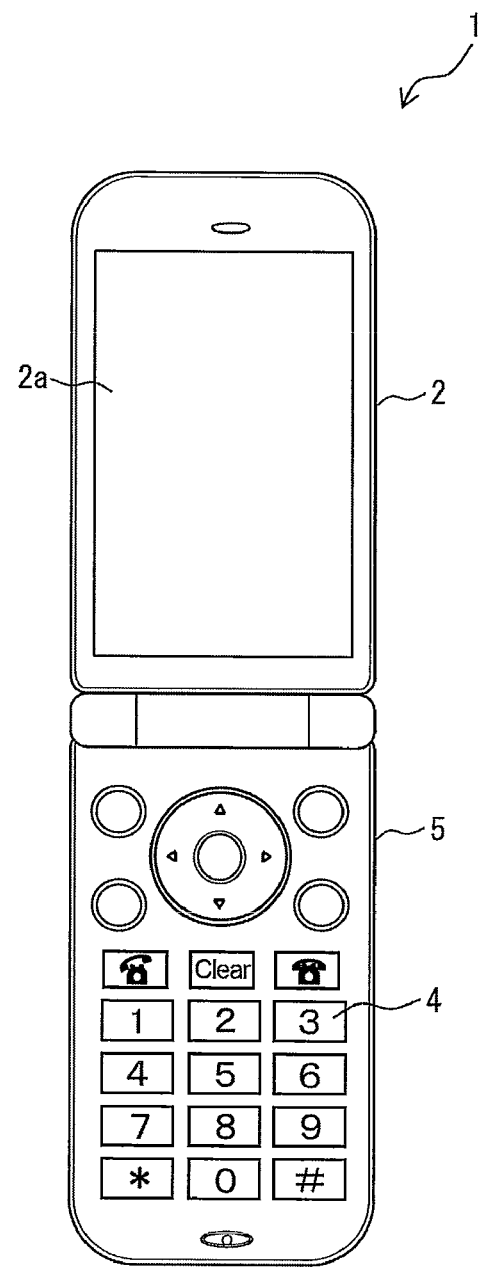

PORTABLE INFORMATION TERMINAL DEVICE

TECHNICAL FIELD

The present invention relates to a digital TV broadcast system and a cellular phone, and more particularly, to a cellular phone enabling a TV broadcast to be watched, and improvement of a digital TV broadcast system applied with the cellular phone.

BACKGROUND ART

Some of cellular phones are adapted to enable a digital TV broadcast to be watched by including an antenna for receiving a digital TV broadcast wave transmitted from a broadcast base station; displaying TV images on a display screen on the basis of the digital TV broadcast wave; and outputting TV voice corresponding to the TV images.

As an example of this sort of cellular phones, there is one in which a display screen is formed in a rectangular shape, and adapted to be able to be switched between a vertically long display state and a horizontally long display state. That is, in the above vertically long display state, a TV image is displayed with a longer direction of the display screen being made vertical, whereas in the above horizontally long display state, it is displayed with a shorter direction of the display screen being made vertical.

In general, a TV image based on a digital TV broadcast wave transmitted from a broadcast base station has a horizontally long aspect ratio, i.e., a horizontal length is long as compared with a vertical length, and therefore in the horizontally long display state, the TV image can be displayed larger, as compared with the vertically long display state. On the other hand, in the vertically long display state, the TV image is displayed with the horizontal length thereof corresponding to a length of a shorter side of a display screen, and therefore an empty area is created on the display screen, in addition to an area for displaying the TV image. For this reason, this sort of cellular phones includes one that is adapted to be able to effectively use a display area by displaying so-called content data based on a data broadcast in such an empty area on the display screen.

Note that the data broadcast refers to a system in which various types of content data such as news and weather forecast are transmitted separately from the TV image and the TV voice based on the digital TV broadcast wave (e.g., Patent documents 1 and 2). Some of the various types of content data transmitted on the basis of the data broadcast include information associated with a program based on the digital TV broadcast wave in receipt. Accordingly, by displaying the information associated with the program on the display screen as the data broadcast while displaying on the display screen TV images of the program based on the digital TV broadcast wave in receipt, a user can check the associated information with use of the data broadcast while watching a TV broadcast.

Patent document 1: Japanese Unexamined Patent Publication No. 2005-286966
Patent document 2: Japanese Unexamined Patent Publication No. 2005-223649

DISCLOSURE OF THE INVENTION

Problem to be Solved by the Invention

As described above, although it is worthwhile to use the data broadcast during watching of the TV broadcast, content of the data broadcast cannot be sufficiently displayed when the display screen is brought into the horizontally long display state, because there is no empty area other than the area for displaying the TV image on the display screen, or the empty area is very small. Also, a user watching the TV broadcast in the horizontally long display state may often think that the user would like to watch the TV image having a larger size than that in the vertically long display state, and therefore it is not preferable that the display area for the TV image is decreased by displaying the entire content of the data broadcast on the display screen in the horizontally long display state.

The present invention is made in consideration of the above situations, and has an object to provide a digital TV broadcast system and a cellular phone in which content of a data broadcast can be checked with a small display area, and work for checking desired content in detail is easy.

Means Adapted to Solve Problems

A cellular phone according to a first aspect of the present invention includes a display screen, wherein the display screen can be switched between a first display state and a second display state, and is configured to include: digital TV broadcast receiving means adapted to receive a digital TV broadcast wave including TV broadcast data and data broadcast data; TV image generating means adapted to generate a TV image on a basis of the received TV broadcast data; content data creating means adapted to create content data including a character string on a basis of the received data broadcast data; TV image display controlling means adapted to display the TV image on the display screen in the first display state and the second display state; content data display controlling means adapted to, in the first display state, display the content data on a part of the display screen, and in the second display state, extract a plurality of character strings included in the content data to sequentially display the character strings on a part of the display screen as extracted character strings; and character string selecting means adapted to, among the character strings included in the content data displayed on the display screen upon switching of the display screen from the second display state to the first display state during the display of the extracted character strings, select a character string corresponding to the extracted character string displayed in the second display state upon the switching.

According to such a configuration, the plurality of character strings included in the content data can be sequentially displayed on the part of the display screen in the second display state as the extracted character strings. Based on this, in the small display area on the display screen, the plurality of character strings including characters of which the number is larger than the number of characters that can be displayed in the display area at once can be displayed as the extracted character strings, and therefore a user can well check content of a data broadcast by checking the extracted character strings.

Also, in the case where the user having checked the extracted character strings displayed on the part of the display screen in the second display state would like to check the content of the data broadcast in more detail, the user can switch the display screen to the first display state. At this time, among the character strings included in the content data displayed on the display screen in the first display state on the basis of the switching of the display screen to the first display state, the character string corresponding to the extracted character string displayed in the second display state is automatically selected, so that the content of the data broadcast related to the character string can be easily read, and therefore work for checking desired content in detail is easy.

A cellular phone according to a second aspect of the present invention is, in addition to the above configuration, configured such that the content data creating means creates, on the basis of the received data broadcast data, the content data including a plurality of pieces of page data that can be displayed with switching to the part of the display screen in the first display state, each of the pieces of page data including a grouped character string; and the content data display controlling means extracts, in the second display state, the character strings respectively included in the plurality of pieces of page data to sequentially display the character strings on the part of the display screen as the extracted character strings, and upon switching of the display screen from the second display state to the first display state during the display of the extracted character strings, displays page data corresponding to the extracted character string displayed in the second display state upon the switching on the display screen among the plurality of pieces of page data.

According to such a configuration, on the basis of the switching of the display screen to the first display state, among the plurality of pieces of page data that can be displayed with switching to the display screen in the first display state, the page data corresponding to the extracted character string displayed in the second display state can be displayed on the display screen. At this time, among the character strings included in the pieces of page data displayed on the display screen in the first display state, the character string corresponding to the extracted character string displayed in the second display state can be automatically selected.

A cellular phone according to a third aspect of the present invention includes a display screen, wherein the display screen can be switched between a first display state and a second display state, and is configured to include: digital TV broadcast receiving means adapted to receive a digital TV broadcast wave including TV broadcast data and data broadcast data; TV image generating means adapted to generate a TV image on a basis of the received TV broadcast data; content data creating means adapted to create, on a basis of the received data broadcast data, content data including a plurality of pieces of page data that can be displayed with switching to a part of the display screen in the first display state, each of the pieces of page data including a grouped character string; TV image display controlling means adapted to display the TV image on the display screen in the first display state and the second display state; and content data display controlling means adapted to, in the second display state, extract the character strings respectively included in the plurality of pieces of page data to sequentially display the character strings on a part of the display screen as extracted character strings; and upon switching of the display screen from the second display state to the first display state during the display of the extracted character strings, display page data corresponding to the extracted character string displayed in the second display state upon the switching on the display screen among the plurality of pieces of page data.

According to such a configuration, on the part of the display screen in the second display state, the extracted character strings respectively extracted from the plurality of pieces of page data included in the content data can be sequentially displayed. Based on this, in a small display area on the display screen, the plurality of character strings including characters of which the number is larger than the number of characters that can be displayed in the display area at once can be displayed as the extracted character strings, and therefore a user can well check content of a data broadcast by checking the extracted character strings.

Also, in the case where the user having checked the extracted character strings displayed on the part of the display screen in the second display state would like to check the content of the data broadcast in more detail, the user can switch the display screen to the first display state. At this time, on the basis of the switching of the display screen to the first display state, among the plurality of pieces of page data that can be displayed with switching to the display screen in the first display state, the page data corresponding to the extracted character string displayed in the second display state is automatically displayed on the display screen, and therefore work for checking desired content in detail is easy.

A cellular phone according to a fourth aspect of the present invention is, in addition to the above configuration, configured such that the display screen is rectangular, and can be switched between a vertically long display state as the first display state and a horizontally long display state as the second display state; and the TV image display controlling means displays the TV image with a longer direction of the display screen being made vertical in the vertically long display state, and in the horizontally long display state, with a shorter direction of the display screen being made vertical.

According to such a configuration, the extracted character strings can be displayed on the part of the display screen in the horizontally long display state, and therefore the user can well check the content of the data broadcast by checking the extracted character strings, and also by switching the display screen from the horizontally long display state to the vertically long display state, easily perform the work for checking desired content in detail.

A cellular phone according to a fifth aspect of the present invention is, in addition to the above configuration, configured such that the content data includes a flag related to a character string included in the content data, the flag indicating whether or not to extract the character string as the extracted character string; and the content data display controlling means displays, in the horizontally long display state, the character string extracted on a basis of the flag on the display screen as the extracted character string.

According to such a configuration, among the character strings included in the content data, the character string corresponding to the flag indicating that the character string is extracted as the extracted character string can only be extracted, and displayed on the part of the display screen in the horizontally long display state. Accordingly, by appropriately setting the flag, the character string with which the user easily checks the content of the data broadcast can be displayed as the extracted character string.

A cellular phone according to a sixth aspect of the present invention is, in addition to the above configuration, configured such that the content data includes a dedicated character string to be displayed on the display screen as the extracted character string; and the content data display controlling means displays the dedicated character string on the display screen in the horizontally long display state, and in the vertically long display state, does not display the dedicated character string on the display screen.

According to such a configuration, among the character strings included in the content data, the dedicated character string to be displayed on the display screen as the extracted character string can only be extracted, and displayed on the part of the display screen in the horizontally long display state. Accordingly, by appropriately setting the dedicated character string, the character string with which the user easily checks the content of the data broadcast can be displayed as the extracted character string.

A digital TV broadcast system according to a seventh aspect of the present invention includes: a digital TV broadcast transmission device for transmitting a digital TV broadcast wave including TV broadcast data and data broadcast data; and a cellular phone receiving the digital TV broadcast wave, and is configured such that the cellular phone includes: a rectangular display screen that can be switched between a vertically long display state and a horizontally long display state; digital TV broadcast receiving means adapted to receive the digital TV broadcast wave; TV image generating means adapted to generate a TV image on a basis of the received TV broadcast data; content data creating means adapted to create content data including a character string on a basis of the received data broadcast data; TV image display controlling means adapted to display the TV image with a longer direction of the display screen being made vertical in the vertically long display state, and in the horizontally long display state, with a shorter direction of the display screen being made vertical; and content data display controlling means adapted to, in the vertically long display state, display the content data on a part of the display screen, and in the horizontally long display state, extract a plurality of character strings included in the content data to sequentially display the character strings on a part of the display screen as extracted character strings, the digital TV broadcast transmission device transmits a flag related to a character string included in the content data, the flag indicating whether or not to extract the character string as the extracted character string, and the content data display controlling means displays, in the horizontally long display state, the character string extracted on a basis of the flag on the display screen as the extracted character string.

A digital TV broadcast system according to an eighth aspect of the present invention includes: a digital TV broadcast transmission device for transmitting a digital TV broadcast wave including TV broadcast data and data broadcast data; and a cellular phone receiving the digital TV broadcast wave, and is configured such that the cellular phone includes: a rectangular display screen that can be switched between a vertically long display state and a horizontally long display state; digital TV broadcast receiving means adapted to receive the digital TV broadcast wave; TV image generating means adapted to generate a TV image on a basis of the received TV broadcast data; content data creating means adapted to create content data including a character string on a basis of the received data broadcast data; TV image display controlling means adapted to display the TV image with a longer direction of the display screen being made vertical in the vertically long display state, and in the horizontally long display state, with a shorter direction of the display screen being made vertical; and content data display controlling means adapted to, in the vertically long display state, display the content data on a part of the display screen, and in the horizontally long display state, extract a plurality of character strings included in the content data to sequentially display the character strings on a part of the display screen as extracted character strings, the digital TV broadcast transmission device transmits a dedicated character string to be displayed on the display screen as the extracted character string, and the content data display controlling means displays the dedicated character string on the display screen in the horizontally long display state, and in the vertically long display state, does not display the dedicated character string on the display screen.

Effect of the Invention

According to the present invention, on the part of the display screen in a second display state, a plurality of character strings including characters of which the number is larger than the number of characters that can be displayed in the display area at once can be displayed as extracted character strings, and therefore a user can well check content of a data broadcast by checking the extracted character strings.

Also, by switching the display screen from the second display state to a first display state, among character strings included in content data displayed on the display screen in the first display state, a character string corresponding to an extracted character string displayed in the second display state is automatically selected, or among a plurality of pieces of page data that can be displayed with switching to the display screen in the first display state, page data corresponding to the extracted character string displayed in the second display state is automatically displayed on the display screen, and therefore work for checking desired content in detail is easy.

BEST MODE FOR CARRYING OUT THE INVENTION

First Embodiment

FIG. 1 is a perspective view illustrating an example of a cellular phone 1 according to a first embodiment of the present invention, in which a state where casings are expanded is illustrated. The cellular phone 1 is a so-called flip phone, and adapted such that a display casing 2 and an operation casing 5 each formed in a rectangular parallelepiped shape are connected to each other via a hinge part 3, and can be folded with main faces of the display casing 2 and the operation casing 5 facing to each other.

The display casing 2 is arranged with a display part 2a and a receiver 8 on a main face that faces to the operation casing 5 in the folded state. The display part 2a includes a liquid crystal display having a rectangular display screen, and is arranged such that a longer direction thereof corresponds to that of the display casing 2. The receiver 8 is voice output means for outputting voice from an opposite side telephone set upon communication, and arranged at an end part on a side opposite to the hinge part 3 in the display casing 2.

The operation casing 5 is arranged with an operation part 4 and a transmitting microphone 7 on the main face that faces to the display casing 2 in the folded state. The operation part 4 is input means including a plurality of keys, and with use of the operation part 4, a selection operation or a decision operation can be performed. The transmitting microphone 7 is voice input means adapted to input user's voice upon communication, and arranged at an end part on a side opposite to the hinge part 3 in the operation casing 5.

The hinge part 3 foldably connects the display casing 2 and the operation casing 5 to each other such that the respective main faces face to each other. Also, the hinge part 3 is configured by integrally forming a connecting part 3a that is connected to the operation casing 5 so as to be rotationally movable, and a rectangular plate-like holding part 3b that is arranged so as to face to an outer face of the display casing 2 and intended for holding the display casing 2 rotatably in a horizontal plane. The display casing 2 is rotatably connected to a planar portion of the holding part 3b around a rotation axis (not shown) vertical to a display screen of the display part 2a with an outer face thereof facing to the plane of the holding part 3b of the hinge part 3. Based on this, the display casing 2 is adapted to be rotatably held in the plane horizontal to the display screen of the display part 2a at the holding part 3b, and rotatable with keeping an inclination angle to the operation casing 5.

FIG. 2 is a perspective view illustrating a state where the display casing 2 of the cellular phone 1 in FIG. 1 is rotated, in which the state where the display casing 2 is rotated clockwise from the state illustrated in FIG. 1 by approximately 45 degrees as viewed from the front is illustrated. FIG. 3 is a perspective view illustrating a state where the display casing 2 of the cellular phone 1 in FIG. 1 is rotated, in which the state where the display casing 2 is rotated clockwise from the state illustrated in FIG. 1 by 90 degrees as viewed from the front is illustrated.

A user rotates the display casing 2 within an angle range of 90 degrees in the plane horizontal to the display screen of the display part 2a with grasping the operation casing 5 to be thereby able to switch between the vertically long display state illustrated in FIG. 1 and the horizontally long display state illustrated in FIG. 3. On the display screen of the display part 2a in the vertically long display state illustrated in FIG. 1, an image is displayed with a longer direction of the display screen being made vertical. On the other hand, on the display screen of the display part 2a in the horizontally long display state illustrated in FIG. 3, an image is displayed with a shorter direction of the display screen being made vertical.

FIG. 4 is a block diagram illustrating an example of an electrical configuration of a digital TV broadcast system applied with the cellular phone 1. The cellular phone 1 includes: a control part 6 including a processor; and the display part 2a, the operation part 4, the transmitting microphone 7, a receiver 8, speaker 9, a cellular communication part 10, a digital TV broadcast receiving part 11, a rotation detecting sensor 12, and a memory 13 that are respectively controllable by the control part 6.

The cellular communication part 10 transmits/receives a radio wave to/from a wireless base station 100 through a communication antenna 10a to thereby transmit/receive communication voice. In a state where a communication state with the opposite side telephone set is established, a voice signal based on communication voice of the user is transmitted from the cellular communication part 10, and a voice signal based on communication voice from the opposite side telephone set is received by the cellular communication part 10, whereby the two types of communication voice are transmitted/received.

The digital TV broadcast receiving part 11 receives through a TV broadcast receiving antenna 11a a digital TV broadcast wave transmitted from a broadcast base station 200. The digital TV broadcast wave transmitted from the broadcast base station 200 is a one-segment broadcast wave for cellular phones, which is allocated to a certain band for a general digital high-vision broadcast wave, and includes, in addition to TV broadcast data including a TV image 201 and TV voice 202, data broadcast data including various types of content data 203 such as news, weather forecast, and event message (EM). Each of these pieces of data is divided into a plurality of packets to be thereby transmitted as so-called TS (Transport Stream) packets.

In the cellular phone 1, a plurality of TS packets are extracted from the digital TV broadcast wave received by the digital TV broadcast receiving part 11, and synthesized to thereby generate the TV image 201, the TV voice 202, the content data 203, and the like. Then, the TV image 201 generated from the TS packets is displayed on the display part 2a, and the TV voice 202 corresponding to the TV image 201 is amplified, and outputted from the speaker 9, whereby the user can watch a TV broadcast. Also, the content data 203 created from the TS packets is displayed on the display part 2a, and thereby the user can watch a data broadcast.

The rotation detecting sensor 12 includes a mechanical or electrical switch, and is direction detecting means adapted to detect an arrangement direction of the display screen with respect to the user by detecting a rotating operation for the display casing 2 by the user. The memory 13 includes a RAM (Random Access Memory) or ROM (Read Only Memory).

FIG. 5 is a functional block diagram illustrating a configuration example of the control part 6. The control part 6 includes a TS packet extracting part 61, a PMT extracting part 62, a packet synthesizing part 63, a TV image generating part 64, a content data creating part 65, a TV voice generating part 66, a display control part 67, and a voice control part 68, and the respective functional blocks are embodied by a computer program executed by the control part 6. The memory 13 is allocated with a PMT storage part 131, a content data storage part 132, and the like.

A digital TV broadcast wave periodically includes a PMT (Program Map Table) transmitted correspondingly to each program. The PMT provides a correspondence relationship between a data type of a TS packet and a PID (Packet Identifier) that is identification information related to each data type. During receipt of a digital TV broadcast wave for some program, the PMT extracting part 62 extracts a PMT corresponding to the program, which is periodically transmitted from the broadcast base station 200, and then stores it in the PMT storage part 131. In general, the PMT is transmitted in a period of 200 ms to 500 ms.

The TS packet extracting part 61 extracts a plurality of TS packets from a digital TV broadcast wave in receipt. The plurality of TS packets extracted in the TS packet extracting part 61 are synthesized for each data type on the basis of a PID in the packet synthesizing part 63. At this time, the packet synthesizing part 63 compares the PMT stored in the PMT storage part 131 with PIDs included in the respective TS packets to identify data types, and synthesizes the TS packets for each of the data types such as a DII (Download info Indication), DBB (Download Data Block), and Event Message included in a TV image, TV voice, and after-mentioned content data.

The TV image generating part 64 is TV image generating means adapted to generate a TV image on the basis of TV broadcast data included in the received digital TV broadcast wave, and generates a TV image from TS packets synthesized on the basis of a PID related to the TV image. Also, the TV voice generating part 66 is TV voice generating means adapted to generate TV voice on the basis of TV broadcast data included in a received digital TV broadcast wave, and generates TV voice from TS packets synthesized on the basis of a PID related to the TV voice. The TV voice generated by the TV voice generating part 66 is outputted from the speaker 9 by the voice control part 68.

The content data creating part 65 is content data creating means adapted to create content data on the basis of data broadcast data included in a received digital TV broadcast wave, and creates content data from TS packets synthesized on the basis of a PID related to the content data. Content data includes, in addition to a character string created with use of a BML (Broadcast Markup Language) that is a language for a data broadcast, image data, tag information, and the like. Note that a character string included in content data is not limited to that created with use of the BML, but may be any one created with use of the other language such as an HTML (Hyper Text Markup Language). Content data is transmitted for each of objects that constitutes the content data and are called modules, i.e., transmitted in a so-called data carousel system.

The content data created in the content data creating part 65 is stored in the content data storage part 132. Note that the created content data includes current screen data and various types of page data. The page data is configured by grouping a character string and image data representing content of news, weather forecast, or the like for each page. The current screen data is data on a current screen for selecting page data, and constitutes a screen at an upper level in a hierarchy of each piece of page data. That is, the content data in the present embodiment has a hierarchical structure, and is adapted such that by selecting page data on the current screen based on the current screen data, the page data selected from the plurality of pieces of page data can be read.

The display control part 67 is display controlling means adapted to control a display on the display part 2a, and includes a TV image display control part 671, a content data display control part 672, and a cursor selecting part 673. The TV image display control part 671 displays on the display part 2a the TV image generated by the TV image generating part 64. The TV image display control part 671 provides on the display part 2a a display having an aspect depending on any of the vertically and horizontally long display states on the basis of a detection signal from the rotation detecting sensor 12.

On the other hand, when the display part 2a is switched to the display screen in the vertically long display state on the basis of a detection signal from the rotation detecting sensor 12, the content data display control part 672 can display on the display part 2a the current screen data and plurality of pieces of page data constituting the content data created in the content data creating part 65.

As described above, the TV image display control part 671 and the content data display control part 672 respectively provide on the display part 2a the displays having the aspects that are different depending on any of the vertically and horizontally long display states, on the basis of the detection signals from the rotation detecting sensor 12. By moving a cursor to any of character strings that are displayed on the display part 2a on the basis of the content data, the cursor selecting part 673 selects the character string to display it on the display part 2a. As described, the cursor selecting part 673 can be character string selecting means for selecting the character string.

FIG. 6 is a diagram illustrating an aspect upon creation of content data on the basis of received TS packets 31. When the content data is transmitted in the data carousel system, each of the modules of the content data is divided into a plurality of pieces of block data as DDBs. Then, these DDBs and a DII including information associated with each of the modules are repeatedly transmitted as the TS packets 31.

The DII and plurality of DDBs transmitted as the TS packets 31 are respectively assigned with different PIDs, and by synthesizing TS packets 31 having a common PID, the DII and respective DDBs are created as separated pieces of data. In the present embodiment, the DII and three DDB are created as different pieces of data on the basis of the PIDs (a to d) respectively assigned thereto. Note that each of the DDBs is the block data constituting each of the modules of the content data, and includes a character string, image data, and the like. Also, the DII includes: a module ID that is identification information assigned to each of the modules; and version information that is update information on the module.

The plurality of DDBs created in the above manner are synthesized on the basis of the module ID included in the DII to thereby generate each of the modules 32. Note that each of the modules 32 may be generated from a plurality of DDBs or one DDB. The content data including the current screen data and the page data, which includes the generated plurality of modules 32, is stored in the content data storage part 132.

FIG. 7 is a diagram illustrating an example of a display aspect of the display part 2a during receipt of a TV broadcast and data broadcast, in which (a) illustrates a display aspect in the horizontally long display state, (b) illustrates a display aspect for a case where the state of (a) has been switched to the vertically long display state, and (c) illustrates a state where selected page data is displayed. As illustrated in FIG. 7 (a), on the display screen of the display part 2a in the horizontally long display state, a picto display area 21 and a TV image display area 22 are formed. Also, as illustrated in FIGS. 7 (b) and (c), on the display screen of the display part 2a in the vertically long display state, a picto display area 23, a TV image display area 24, and a data broadcast display area 25 are formed.

The TV image display area 22 in the horizontally long display state has a horizontal length corresponding to a length of a longer side of the display screen, and displays a TV image having a horizontally long aspect ratio i.e., a horizontal length is long as compared with a vertical length, with the shorter direction of the display screen being made vertical. The TV image in the present embodiment has an aspect ratio, i.e., a ratio of a horizontal length to a vertical length, of 16:9. The picto display area 21 has a horizontal length corresponding to the length of the longer side of the display screen, and is formed of a smaller area than the TV image display area 22. In the picto display area 21, a receiver sensitivity for a radio wave in the cellular communication part 10, a remaining level of a battery for feeding power to the cellular phone 1, and the like can be displayed.

In the present embodiment, some character strings included in the content data in receipt are adapted to be displayed in the picto display area 21 as illustrated in FIG. 7 (a). The picto display area 21 is adapted to be able to display a single line of characters, and provide a marquee display in the longer direction of the display screen. Note that the marquee display is a display aspect in which characters are displayed while moving in a certain direction with time, and the characters are sequentially displayed in the picto display area 21 from a character at the beginning of a sentence, and after having been moved in the certain direction within the picto display area 21, sequentially deleted out of the picto display area 21 from the character at the beginning of the sentence.

When the display casing 2 is rotated from the state illustrated in FIG. 7 (a) to switch from the horizontally long display state to the vertically long display state, the picto display area 23, the TV image display area 24, and the data broadcast display area 25 are formed on the display screen as illustrated in FIG. 7 (b). The TV image display area 24 has a horizontal length corresponding to the length of the shorter side of the display screen, and is formed with having the horizontal length and the vertical length corresponding to an aspect ratio of the TV image to be thereby formed as a smaller area than the TV image display area 22 in the horizontally long display state illustrated in FIG. 7 (a). In the vertically long display state, the TV image is displayed in the TV image display area 24 with the longer direction of the display screen being made vertical. The picto display area 23 has a horizontal length corresponding to the length of the shorter side of the display screen, and is formed of a smaller area than the TV image display area 24. In the picto display area 23, a receiver sensitivity for a radio wave in a cellular communication part 10, a remaining level of the battery for feeding power to the cellular phone 1, and the like can be displayed, similarly to the case of FIG. 7 (a).

The present embodiment is adapted such that character strings associated with news, weather forecast, sport, and the like can be transmitted as pieces of content data of the data broadcast, and in the data broadcast display area 25 illustrated in FIG. 7 (*b*), the current screen for selecting one from such various types of content data is displayed. The data broadcast display area 25 has a vertical length larger than that of the picto display area 23, and can display characters over a plurality of lines. On the current screen illustrated in FIG. 7 (*b*), character strings such as "News", "Weather forecast", and "Sport" included in the current screen data are displayed over a plurality of lines in the data broadcast display area 25.

A user moves a cursor 26 to any of the character strings displayed on the current screen illustrated in FIG. 7 (*b*) to perform a decision operation, and can thereby display page data corresponding to the character string in the data broadcast display area 25 as illustrated in FIG. 7 (*c*). In the example of FIG. 7 (*c*), the decision operation is performed with the cursor 26 being placed on the character string "News" on the current screen illustrated in FIG. 7 (*b*), and thereby as illustrated in FIG. 7 (*c*), a character string as the page data on "News" can be displayed in the data broadcast display area 25.

The character string displayed in the picto display area 21 in the horizontally long display state illustrated in FIG. 7 (*a*) is included in the character string displayed in the data broadcast display area 25 in the vertically long display state illustrated in FIG. 7 (*c*). In the present embodiment, predetermined numbers of characters from the beginnings of sentences out of characters included in character strings associated with the respective pieces of page data displayed in the data broadcast display area 25 in the vertically long display state are respectively extracted as extracted character strings, and these extracted character strings are sequentially provided as the marquee display in the picto display area 21 in the horizontally long display state. That is, the extracted character strings extracted from the character strings associated with the respective pieces of page data corresponding to "News", "Weather forecast", "Sport", and the like are adapted to be sequentially provided as the marquee display in the picto display area 21. Based on this, in the small picto display area 21 on the display screen, the plurality of character strings including characters of which the number is larger than the number of characters that can be displayed at once within the picto display area 21 can be displayed as the extracted character strings, and therefore by checking the extracted character strings, the user can well check the content of the data broadcast.

The present embodiment is adapted such that in the case where the display screen of the display part 2a is switched from the horizontally long display state to the vertically long display state when the extracted character strings are sequentially provided as the marquee display in the picto display area 21 as illustrated in FIG. 7 (*a*), the cursor 26 is placed on a character string corresponding to an extracted character string displayed in the horizontally long state upon the switching. The present embodiment is adapted such that by switching the display screen to the vertically long display state while the extracted character string extracted from the character string (FIG. 7 (*c*)) associated with the page data corresponding to "News" is displayed on the display screen in the horizontally long display state (FIG. 7 (*a*)), the cursor 26 is placed on the character string "News" among the character strings displayed on the display screen in the vertically long state (FIG. 7 (*b*)).

Based on such a configuration, in the case where the user having checked the extracted character string displayed in the picto display area 21 in the horizontally long display state during receipt of the TV broadcast and the data broadcast in the horizontally long state would like to check the content of the data broadcast in more detail, the user can switch the display screen to the vertically long display state. At this time, on the basis of the switching of the display screen to the vertically long display state, among character strings displayed on the display screen in the vertically long display state, the cursor 26 is automatically placed on the character string corresponding to the extracted character string displayed in the horizontally long display state. Accordingly, the user can easily read the content of the data broadcast, which is related to the character string on which the cursor 26 is placed, only by performing the decision operation with use of the operation part 4, and therefore work for checking desired content in detail is easy.

FIG. 8 is a flowchart illustrating an example of processing performed by the control part 6 during receipt of a TV broadcast and data broadcast in the horizontally long display state. During the receipt of the TV broadcast and the data broadcast in the horizontally long display state, the TV image is displayed in the TV image display area 22, and the extracted character strings extracted from the character strings associated with the respective pieces of page data are sequentially provided as the marquee display in the picto display area 21 (Step S101) as illustrated in FIG. 7 (*a*).

If the display screen of the display part 2a is switched to the vertically long display state when the extracted character strings are provided on the display screen in the horizontally long display state as the marquee display (Yes in Step S102), an arrangement direction of the TV image is rotated by 90 degrees (Step S103), and in the data broadcast display area 25 having appeared on the display screen by the switching, the current screen is displayed (Step S104). At this time, the cursor 26 is automatically placed on a character string corresponding to an extracted character string displayed in the horizontally long state upon the switching among character strings displayed on the current screen (Step S105).

Accordingly, the user performs with use of the operation part 4 the decision operation of the cursor that has been automatically placed in Step S105 (Yes in Step S106), and can thereby read page data corresponding to the character string on which the cursor 26 is placed on, and display it in the data broadcast display area 25 (Step S107). Also, the user performs the decision operation after having moved the cursor 26 to another character string by operating the operation part 4, and can thereby read page data corresponding to the character string on which the cursor 26 is placed.

Second Embodiment

In the first embodiment, the configuration is described, in which in the case where the display screen is switched to the vertically long display state during display of extracted character strings on the display screen in the horizontally long display state, the current screen is displayed on the display screen in the vertically long display state, and the cursor 26 is placed on a character string corresponding to an extracted character string displayed in the horizontally long display state upon the switching among character strings displayed on the current screen. On the other hand, a second embodiment is adapted such that in the case where a display screen is switched to the vertically long display state during display of extracted character strings on the display screen in the horizontally long display state, page data corresponding to an extracted character string displayed in the horizontally long display state upon the switching is displayed on the display screen in the vertically long display state.

FIG. 9 is a diagram illustrating an example of a display aspect of a display part 2a upon receipt of a TV broadcast and data broadcast in the cellular phone 1 according to the second embodiment of the present invention, in which (a) illustrates a display aspect in the horizontally long display state, and (b) illustrates a display aspect for a case where the state of (a) has been switched to the vertically long display state. As illustrated in FIG. 9 (a), on the display screen of the display part 2a in the horizontally long display state, the picto display area 21 and the TV image display area 22 are formed, similarly to the first embodiment, and in the TV image display area 22, a TV image is displayed with a shorter direction of the display screen being made vertical, and in the picto display area 21, extracted character strings extracted from character strings associated with respective pieces of page data are sequentially provided as the marquee display.

When the display casing 2 is rotated from the state illustrated in FIG. 9 (a) to switch from the horizontally long display state to the vertically long display state, the picto display area 23, the TV image display area 24, and the data broadcast display area 25 are formed on the display screen as illustrated in FIG. 9 (b). At this time, display aspects in the picto display area 23 and the TV image display area 24 are the same as those illustrated in FIG. 7 (b) in the first embodiment, and therefore description thereof is omitted here. On the other hand, in the data broadcast display area 25 appearing on the display screen upon the switching to the vertically long display state, page data corresponding to a lower level in a hierarchy of current screen data is displayed, differently from the case of the first embodiment.

More specifically, in the case where the display screen of the display part 2a is switched from the horizontally long display state to the vertically long display state when the extracted character strings are sequentially provided as the marquee display in the picto display area 21 as illustrated in FIG. 9 (a), page data corresponding to an extracted character string displayed in the horizontally long display state upon the switching is adapted to be displayed in the data broadcast display area 25 on the display screen as illustrated in FIG. 9 (b). In the present embodiment, by switching the display screen to the vertically long display state while an extracted character string extracted from a character string associated with page data corresponding to "Weather forecast" is displayed on the display screen in the horizontally long display state (FIG. 9 (a)), the character string associated with the page data corresponding to "Weather forecast" is displayed in the data broadcast display area 25 on the display screen in the vertically long display state (FIG. 9 (b)).

Based on such a configuration, in the case where a user having checked the extracted character strings displayed in the picto display area 21 in the horizontally long display state during the receipt of the TV broadcast and the data broadcast in the horizontally long display state would like to check content of the data broadcast in more detail, the user can switch the display screen to the vertically long display state. At this time, on the basis of the switching of the display screen to the vertically long display state, among a plurality of pieces of page data that can be displayed with switching to the display screen in the vertically long display state, the page data corresponding to the extracted character string displayed in the horizontally long display state is automatically displayed on the display screen, and therefore work for checking desired content in detail is easy.

Note that there may be provided a configuration in which among the character strings included in the pieces of page data displayed on the display screen by switching from the horizontally long display state to the vertically long display state, a character string corresponding to the extracted character string displayed in the horizontally long display state is automatically selected, and the cursor is placed on the selected character string, similarly to the case of the first embodiment.

FIG. 10 is a flowchart illustrating an example of processing performed by a control part 6 during receipt of a TV broadcast and data broadcast in the horizontally long display state in the second embodiment. During the receipt of the TV broadcast and data broadcast in the horizontally long display state, the TV image is displayed in the TV image display area 22, and the extracted character strings extracted from the character strings associated with the respective pieces of page data are sequentially provided as the marquee display in the picto display area 21 as illustrated in FIG. 9 (a) (Step S201).

If the display screen of the display part 2a is switched to the vertically long display state when the extracted character strings are provided as the marquee display on the display screen in the horizontally long display state (Yes in Step S202), an arrangement direction of the TV image is rotated by 90 degrees (Step S203), and page data corresponding to an extracted character string displayed in the horizontally long display state upon the switching is displayed in the data broadcast display area 25 that has appeared on the display screen by the switching (Step S204).

Third Embodiment

In the first and second embodiments, there are provided the configurations in which among characters included in the character strings associated with the respective pieces of page data, predetermined numbers of characters are extracted from the beginnings of the sentences as the extracted character strings, and these extracted character strings are sequentially provided as the marquee display in the picto display area 21 in the horizontally long display state. On the other hand, a third embodiment is different in that a character string to be extracted as an extracted character string is adapted to be provided by a marquee flag included in content data.

FIG. 11 is a diagram illustrating an aspect upon creation of the content data on the basis of received TS packets 31 in the cellular phone 1 according to the third embodiment of the present invention. A specific aspect upon the creation of the content data on the basis of the received TS packets 31 is the same as that for the case of the first embodiment illustrated in FIG. 6, and therefore description thereof is omitted here.

In the present embodiment, as illustrated in FIG. 11, one of DDBs constituting each of modules of the content data includes a marquee flag 33 related to an arbitrary character string included in the content data. The marquee flag 33 is a flag indicating whether or not to extract the arbitrary character string included in the corresponding content data as an extracted character string, and embedded in the content data as tag information on the arbitrary character string. In the present embodiment, a DDB corresponding to content data on "Weather" includes the marquee flag 33, whereas a DDB corresponding to content data on "News" does not include the marquee flag 33. For this reason, in the picto display area 21 in the horizontally long display state, a character string extracted from the content data on "Weather" is displayed, whereas a character string included in the content data on "News" is not displayed.

Based on such a configuration, during receipt of a TV broadcast and data broadcast in the horizontally long display state, the character string corresponding to the marquee flag 33 indicating that it is extracted as the extracted character string is only extracted among character strings included in the content data, and then provided in the picto display area 21 in the horizontally long display state as the marquee display. Accordingly, by appropriately setting the marquee flag 33, a user can display as an extracted character string a character string with which the user easily checks content of the data broadcast.

Fourth Embodiment

In the third embodiment, the configuration is described, in which a character string to be extracted in the picto display area 21 in the horizontally long display state as an extracted character string is provided by the marquee flag 33 included in content data. On the other hand, a fourth embodiment is different in that a dedicated character string to be extracted as an extracted character string is included in content data.

FIG. 12 is a diagram illustrating an aspect upon creation of the content data on the basis of received TS packets 31 in the cellular phone 1 according to the fourth embodiment of the present invention. A specific aspect upon the creation of the content data on the basis of the received TS packets 31 is the same as that for the case of the first embodiment illustrated in FIG. 6, and therefore description thereof is omitted here.

In the present embodiment, as illustrated in FIG. 12, one of DDBs constituting each of modules of the content data includes a marquee dedicated character string 34 that is a dedicated character string to be displayed in the picto display area 21 in the horizontally long display state as an extracted character string. In the present embodiment, a DDB corresponding to content data on "Weather" includes the marquee dedicated character string 34, whereas a DDB corresponding to content data on "News" does not include the marquee dedicated character string 34. For this reason, in the picto display area 21 in the horizontally long display state, the marquee dedicated character string 34 extracted from the content data on "Weather" is displayed, whereas a character string included in the content data on "News" is not displayed. Note that the marquee dedicated character string 34 is a dedicated character string to be provided in the picto display area 21 in the horizontally long display state as the marquee display, and therefore not displayed on the display screen in the vertically long display state.

Based on such a configuration, during receipt of a TV broadcast and data broadcast in the horizontally long display state, the marquee dedicated character string 34 to be displayed on the display screen as the extracted character string is only extracted among character strings included in the content data, and then provided in the picto display area 21 in the horizontally long display state as the marquee display. Accordingly, by appropriately setting the marquee dedicated character string 34, a user can display as an extracted character string a character string with which the user easily checks content of the data broadcast.

In the above embodiments, the configurations are described, in which the extracted character strings are provided as the marquee display in the picto display area 21 on the display screen in the horizontally long display state; however, without limitation to such configurations, there may be provided a configuration in which in an area other than the picto display area 21, for example, in a part of the TV image display area 22, the extracted character strings are provided as the marquee display. Also, without limitation to the configuration in which the extracted character strings extracted from the respective pieces of content data are sequentially provided as the marquee display, there may be provided a configuration in which the extracted character strings are sequentially switched and displayed in certain time intervals.

Meanwhile, content data of a data broadcast may include information associated with a TV broadcast being watched. This corresponds to, for example, the case where content of content data delivered by a broadcast station is changed or a broadcast station requires a user to watch a data broadcast associated with a TV image being watched. Such information associated with a TV broadcast is transmitted from a broadcast station in real time. Also, preferably, such information is configured to be able to be easily checked by a user, and guide the user to a data broadcast from which such information is obtained.

For these reasons, an extracted character string to be displayed in the horizontally long display state can also be set as a character string associated with update information or guide information, as in a cellular phone in any of firstfifth to thirteenth embodiments described below.

Fifth Embodiment

The present embodiment is adapted to display a character string associated with update information indicating that content data has been updated, in a picto display area 21 as an extracted character string. In this case, control as illustrated in a functional block diagram of a control part in FIG. 13 is performed. In the functional block diagram of FIG. 13 illustrating a configuration example of the control part 6 according to a fifth embodiment of the present invention, an update information display control part 674 of the display control part 67, and an update information generating part 69 are further provided, in addition to the respective components in the above-described block diagram of FIG. 5. Note that the components denoted by the same symbols, other than the components 674 and 69, are configured in the same manner, and therefore description thereof is omitted.

The update information generating part 69 is update information generating means adapted to generate update information on the basis of data broadcast data included in a received digital TV broadcast wave, and generates the update information from TS packets synthesized on the basis of a PID related to the data broadcast data. The update information is generated in the case where content of content data has been updated, and includes a character string indicating the update of the content data, or the updated content. Note that "update" includes at least one of change of data in, addition of data to, and deletion of data from the content data.

The display control part 67 is display controlling means adapted to control a display on the display part 2a, and includes the update information display control part 674, in addition to the TV image display control part 671, the content data display control part 672, and the cursor selecting part 673. The update information display control part 674 displays on the display part 2a the update information generated in the update information generating part 69.

In the present embodiment, in the case where content data is created on the basis of received TS packets 31, the content data is created in the same manner as the above-described manner illustrated in FIG. 6. The present embodiment has the same aspect as that in FIG. 6, and therefore description thereof is omitted.

Also, a plurality of generated DDBs are synthesized on the basis of a module ID included in a DDI, and thereby each of modules 32 is generated. Each of the modules 32 may be generated from a plurality of DDBs or one DDB. The content data including the plurality of generated modules 32, which include current screen data and page data, is stored in a content data storage part 132.

FIG. 14 is a diagram illustrating an example of a display aspect of the display part 2a during receipt of a TV broadcast and data broadcast, in which (a) illustrates a display aspect in the horizontally long display state, (b) illustrates a display aspect for the case where the state of (a) has been switched to the vertically long display state, and (c) illustrates a state where selected page data is displayed. As illustrated in FIG. 14 (a), on a display screen of the display part 2a in the horizontally long display state, the picto display area 21 and the TV image display area 22 are formed. Also, as illustrated in FIGS. 14 (b) and (c), on the display screen of the display part 2a in the vertically long display state, the picto display area 23, the TV image display area 24, and the data broadcast display area 25 are formed.

The TV image display area 22 in the horizontally long display state has a horizontal length corresponding to a length of a longer side of the display screen, and displays a TV image having a horizontally long aspect ratio, i.e., a horizontal length is long as compared with a vertical length, with a shorter direction of the display screen being made vertical. The TV image in the present embodiment has an aspect ratio, i.e., a ratio of the horizontal length to the vertical length, of 16:9. The picto display area 21 has a horizontal length corresponding to the length of the longer side of the display screen, and formed of a smaller area than the TV image display area 22. In the picto display area 21, a receiver sensitivity for a radio wave in the cellular communication part 10, a remaining level of a battery for feeding power to the cellular phone 1, and the like can be displayed.

The present embodiment is adapted such that in the case where it is determined on the basis of version information that any content data has been updated, predetermined update information is generated as a character string indicating the update of the content data, and the update information is displayed in the picto display area 21 as illustrated in FIG. 14 (a). The picto display area 21 can display a single line of characters, and is adapted to provide them as the marquee display in the longer direction of the display screen. Note that the marquee display is an display aspect in which characters are displayed while moving in a certain direction with time, and the characters are sequentially displayed in the picto display area 21 from a character at the beginning of a sentence, and after having been moved in the certain direction within the picto display area 21, sequentially deleted out of the picto display area 21 from the character at the beginning of the sentence.

When a display casing 2 is rotated from the state illustrated in FIG. 14 (a) to switch from the horizontally long display state to the vertically long display state, the picto display area 23, the TV image display area 24, and the data broadcast display area 25 are formed on the display screen as illustrated in FIG. 14 (b). The TV image display area 24 has a horizontal length corresponding to a length of a shorter side of the display screen, and is formed with having the horizontal length and the vertical length corresponding to the aspect ratio of the TV image to be thereby formed as a smaller area than the TV image display area 22 in the horizontally long display state illustrated in FIG. 14 (a). In the vertically long display state, the TV image is displayed on the TV image display area 24 with the longer direction of the display screen being made vertical. The picto display area 23 has a horizontal length corresponding to the length of the shorter side of the display screen, and is formed of a smaller area than the TV image display area 24. In the picto display area 23, the receiver sensitivity for a radio wave in the cellular communication part 10, the remaining level of the battery for feeding power to the cellular phone 1, and the like can be displayed as the case of FIG. 14(a).

The present embodiment is adapted such that character strings associated with news, weather forecast, and sport can be transmitted as pieces of content data of the data broadcast, and in the data broadcast display area 25 illustrated in FIG. 14 (b), a current screen for selecting one from such various types of content data is displayed. The data broadcast display area 25 has a vertical length larger than that of the picto display area 23, and can display characters over a plurality of lines. On the current screen illustrated in FIG. 14 (b), character strings such as "News", "Weather forecast", and "Sport" included in the current screen data are displayed in the data broadcast display area 25 over a plurality of lines.

A user moves the cursor 26 to any of the character strings displayed on the current screen of FIG. 14 (b) to perform a decision operation, and can thereby display page data corresponding to the character string in the data broadcast display area 25 as illustrated in FIG. 14 (c). The decision operation is performed with the cursor 26 being placed on the character string "News" on the current screen of FIG. 14 (b), and thereby, as illustrated in FIG. 14 (c), a character string as page data associated with "News" can be displayed in the data broadcast display area 25.

The present embodiment is adapted such that in the case where the display screen of the display part 2a is switched from the horizontally long display state to the vertically long display state when the update information is provided in the picto display area 21 as the marquee display as illustrated in FIG. 14 (a), the cursor 26 is placed on a character string corresponding to the update information displayed in the horizontally long display state upon the switching, i.e., a character string corresponding to the updated content data among the character strings displayed on the display screen as illustrated in FIG. 14 (b). The present embodiment is adapted such that by switching the display screen to the vertically long state while, after a character string associated with the page data corresponding to "News" (FIG. 14 (c)) have been updated, the update information indicating the update of the content data is displayed on the display screen in the horizontally long state (FIG. 14 (a)), the cursor 26 is placed on the character string "News" among the character strings displayed on the display screen in the vertically long display state (FIG. 14 (b)).

Based on such a configuration, update information on the content data is displayed in the picto display area 21 on the display screen in the horizontally long display state, and therefore the user can check the update of the content data with a small display area while watching a TV image on the display screen in the horizontally long display state. Also, in the case where the user having checked the update information displayed in the picto display area 21 on the display screen in the horizontally long display state would like to check updated content of a data broadcast in detail, the user can immediately check the updated content by switching the display screen to the vertically long display state. At this time, the cursor 26 is automatically placed on a character string corresponding to the update information displayed in the horizontally long display state among character strings included in the content data displayed on the display screen in the vertically long display state on the basis of the switching operation to the vertically long display state, so that an updated portion is easily recognizable, and therefore the user can easily check the updated content.

FIG. 15 is a flowchart illustrating an example of processing performed by the control part 6 during receipt of a TV broadcast and data broadcast in the horizontally long display state. During the receipt of the TV broadcast in the horizontally long display state, a TV image is displayed in the TV image display area 22, and in the case where update information is generated on the basis of received data broadcast data (Yes in Step S301), the update information is provided in the picto display area 21 as the marquee display as illustrated in FIG. 14 (a) (Step S302).

If the display screen of the display part 2a is switched to the vertically long display state when the update information is provided as the marquee display on the display screen in the horizontally long display state (Yes in Step S303), an arrangement direction of the TV image is rotated by 90 degrees (Step S304), and the current screen is displayed in the data broadcast display area 25 having appeared by the switching (Step S305). At this time, the cursor 26 is automatically placed on a character string corresponding to the update information displayed in the horizontally long display state upon the switching, i.e., a character string corresponding to updated content data, among character strings displayed on the current screen (Step S306), Accordingly, by using the operation part 4 to perform the decision operation of the cursor that has been automatically placed in Step S306 (Yes in Step S307), the user can read updated page data corresponding to the character string on which the cursor 26 is placed, and display it in the data broadcast display area 25 (Step S308). Also, by operating the operation part 4 to thereby move the cursor 26 to a character string different from the character string on which the cursor 26 have been automatically placed in Step S306, and then performing the decision operation, the user can also read page data corresponding to the character string on which the cursor 26 is placed.

Note that in the flowchart illustrated in FIG. 15, in the case where the switching to the vertically long display state is not performed upon determination whether or not the switching to the vertically long display state have been performed in Step S303 (No in Step S303), it is further determined whether or not the marquee display state has continued for a predetermined time period, and in the case where it has continued for the predetermined time period, the marquee display may be controlled not to be displayed on the display screen in the horizontally long display state.

Sixth Embodiment

In the fifth embodiment, the configuration is described, in which in the case where the display screen is switched to the vertically long display state during display of update information on the display screen in the horizontally long display state, the current screen is displayed on the display screen in the vertically long display state, and the cursor 26 is placed on a character string corresponding to the update information displayed in the horizontally long display state upon the switching among character strings displayed on the current screen. On the other hand, a sixth embodiment is adapted such that in the case where a display screen is switched to the vertically long display state during display of update information on the display screen in the horizontally long display state, page data corresponding to the update information displayed in the horizontally long display state upon the switching is displayed on the display screen in the vertically long display state.

FIG. 16 is a diagram illustrating an example of a display aspect of a display part 2a during receipt of a TV broadcast and data broadcast in the cellular phone 1 according to the sixth embodiment of the present invention, in which (a) illustrates a display aspect in the horizontally long display state, and (b) illustrates a display aspect for a case where the state of (a) has been switched to the vertically long display state. On the display screen of the display part 2a in the horizontally long display state, the picto display area 21 and the TV image display area 22 are formed, similarly to the fifth embodiment, and a TV image is displayed in the TV image display area 22 with a shorter direction of the display screen being made vertical. Also, in the case where update information is generated on the basis of received data broadcast data, the update information is provided in the picto display area 21 as the marquee display as illustrated in FIG. 16 (a).

When the display casing 2 is rotated from the state illustrated in FIG. 16 (a) to switch from the horizontally long display state to the vertically long display state, the picto display area 23, the TV image display area 24, and the data broadcast display area 25 are formed on the display screen as illustrated in FIG. 16 (b). At this time, display aspects in the picto display area 23 and the TV image display area 24 are the same as those illustrated in FIG. 14 (b) in the fifth embodiment, and therefore description thereof is omitted here. On the other hand, in the data broadcast display area 25 appearing on the display screen upon the switching to the vertically long display state, page data corresponding to a lower level in a hierarchy of current screen data is displayed, differently from the case of the fifth embodiment.

More specifically, the sixth embodiment is adapted such that in the case where the display screen of the display part 2a is switched from the horizontally long display state to the vertically long display state when update information is provided as the marquee display in the picto display area 21 as illustrated in FIG. 16 (a), page data corresponding to the update information displayed in the horizontally long display state upon the switching, i.e., page data corresponding to updated content data is displayed in the data broadcast display area 25 on the display screen. In the present embodiment, by switching the display screen to the vertically long display state while, when a character string associated with page data corresponding to "Weather" has been updated, the update information indicating the update of the content data is displayed on the display screen in the horizontally long display state (FIG. 16 (a)), the character string associated with the page data corresponding to "Weather" is displayed in the data broadcast display area 25 on the display screen in the vertically long display state (FIG. 16 (b)).

Based on such a configuration, update information on content data is displayed in the picto display area 21 on the display screen in the horizontally long display state, and therefore a user can check the update of the content data with the small display area while watching a TV image on the display screen in the horizontally long display state. Also, in the case where the user having checked the update information displayed in the picto display area 21 on the display screen in the horizontally long display state would like to check updated content of a data broadcast in detail, the user can easily display the updated content of the data broadcast on the display screen by switching the display screen to the vertically long display state. At this time, by switching the display screen in the horizontally long display state on which the above update information is display to that in the vertically long display state, page data corresponding to the update information displayed in the horizontally long display state is automatically displayed on the display screen among a plurality of pieces of page data that can be displayed with switching to the display screen in the vertically long display state, and therefore the user can easily check the updated content.

Note that, in the case where page data is displayed on the display screen by switching from the horizontally long display state to the vertically long display state as in the sixth embodiment, there may be provided a configuration in which as illustrated in FIG. 17, among character strings included in the page data displayed on the display screen by switching from the horizontally long display state of FIG. 17 (a) to the vertically long display state of FIG. 17 (b), a character string corresponding to update information displayed in the horizontally long display state, i.e., a character string including updated characters is automatically selected, and similarly to the fifth embodiment, the cursor 26 is placed on the selected character string.

FIG. 18 is a flowchart illustrating an example of processing performed by a control part 6 during receipt of a TV broadcast and data broadcast in the horizontally long display state in the sixth embodiment. During the receipt of the TV broadcast in the horizontally long display state, a TV image is displayed in the TV image display area 22, and in the case where update information is generated on the basis of received data broadcast data (Yes in Step S401), the update information is provided in the picto display area 21 as the marquee display as illustrated in FIG. 16 (a) (Step S402).

If the display screen of the display part 2a is switched to the vertically long display state when the update information is provided on the display screen in the horizontally long display state as the marquee display (Yes in Step S403), an arrangement direction of the TV image is rotated by 90 degrees (Step S404), and page data corresponding to the update information displayed in the horizontally long display state upon the switching is displayed in the data broadcast display area 25 having appeared on the display screen by the switching (Step S405).

Seventh Embodiment

In the fifth and sixth embodiments, the configurations are described, in which as a character string indicating update of content data, predetermined update information is provided in the picto display area 21 in the horizontally long display state as the marquee display. On the other hand, a seventh embodiment is different in that a character string including updated characters is extracted from content data as update information, and the extracted update information is provided in the picto display area 21 in the horizontally long display state as the marquee display.

An aspect upon creation of content data in the seventh embodiment of the present invention is the same as the above-described aspect of FIG. 11, and the content data is created on the basis of received TS packets 31 in the cellular phone 1. Also, a specific aspect upon the creation of the content data on the basis of the received TS packets 31 is the same as that for the case of the first embodiment illustrated in the above FIG. 6. Accordingly, we here omit description of the specific aspect upon the creation of the content data.

In the present embodiment, as illustrated in FIG. 11, one of DDBs constituting each of modules of the content data includes the marquee flag 33 corresponding to an arbitrary character string included in the content data. The marquee flag 33 for this case is a flag indicating whether or not to extract the arbitrary character string included in the corresponding content data as update information, and embedded in the content data as tag information on the arbitrary character string. Accordingly, by relating the marquee flag 33 to a character string including updated characters, the character string can be provided as update information in the picto display area 21 in the horizontally long display state as the marquee display.

FIG. 19 is a diagram illustrating an example of a display aspect of the display part 2a during receipt of a TV broadcast and data broadcast in the cellular phone 1 according to the seventh embodiment of the present invention, in which (a) illustrates a display aspect in the horizontally long display state, and (b) illustrates a display aspect for a case where the state of (a) has been switched to the vertically long display state. On a display screen of the display part 2a in the horizontally long display state, the picto display area 21 and the TV image display area 22 are formed, similarly to the fifth embodiment, and in the TV image display area 22, a TV image is displayed with a shorter direction of the display screen being made vertical. Also, in the case where update information is generated on the basis of the received data broadcast data, the update information is provided in the picto display area 21 as the marquee display as illustrated in FIG. 19 (a).

In the present embodiment, a DDB corresponding to content data on "Weather" includes the marquee flag 33, which is related to a character string included in the content data on "Weather". For this reason, as update information, a character string extracted from the content data on "Weather" is provided as the marquee display in the picto display area 21 in the horizontally long display state as illustrated in FIG. 19 (a).

When the display casing 2 is rotated from the state of FIG. 19 (a) to switch from the horizontally long display state to the vertically long display state, the picto display area 23, the TV image display area 24, and the data broadcast display area 25 are formed on the display screen as illustrated in FIG. 19 (b). At this time, display aspects with respect to the picto display area 23, the TV image display area 24, and the data broadcast display area 25 are the same as those illustrated in FIG. 16 (b) in the sixth embodiment, and therefore description thereof is omitted here.

Based on such a configuration, among character strings included in content data, a character string corresponding to the marquee flag 33 indicating that the character string is displayed as update information can only be displayed in the picto display area 21 in the horizontally long display state. Accordingly, by appropriately setting the marquee flag 33, a character string with which a user easily checks update of content data, or updated content can be displayed as update information.

In particular, a character string including updated characters can be extracted from content data as update information to display the extracted character string in the picto display area 21 in the horizontally long display state, and therefore by checking the character string corresponding to an updated portion while watching a TV image on the display screen in the horizontally long display state, the user can check not only update of the content data but updated content with the horizontally long display state being kept. At this time, in the case where the updated content cannot be fully understood only with the displayed character string, the updated content can be checked in more detail by switching the display screen from the horizontally long display state to the vertically long display state to check.

Note that a configuration in which a character string including updated characters is extracted from the content data as update information is not limited to the configuration as in the present embodiment in which the marquee flag 33 is related to an arbitrary character string, but may be a configuration in which, for example, content data is divided into a plurality of character strings; a character string including updated characters is extracted as update information among the character strings; and the update information is displayed in the picto display area 21 in the horizontally long display state.

Eighth Embodiment

In the seventh embodiment, the configuration is described, in which a character string to be displayed in the picto display area 21 in the horizontally long display state as update information is provided by the marquee flag 33 included in content data. On the other hand, an eighth embodiment is different in that a dedicated character string to be displayed as update information is included in content data.

An aspect upon creation of content data in the eighth embodiment of the present invention is the same as the above aspect of FIG. 12, and the content data is created on the basis of received TS packets 31 in the cellular phone 1. Also, a specific aspect upon the creation of the content data on the basis of the received TS packets 31 is the same as that for the case of the first embodiment illustrated in the above FIG. 6. Accordingly, we here omit description of the specific aspect upon the creation of the content data.

In the present embodiment, as illustrated in FIG. 12, one of DDBs constituting each of modules of content data includes the marquee dedicated character string 34 that is a dedicated character string to be displayed in a picto display area 21 in the horizontally long display state as update information. In the present embodiment, the marquee dedicated character string 34 is included in a DDB corresponding to content data on "Weather", whereas the marquee dedicated character string 34 is not included in a DDB corresponding to content data on "News". For this reason, in the picto display area 21 in the horizontally long display state, the marquee dedicated character string 34 extracted from the content data on "Weather" is displayed, whereas a character string included in the content data on "News" is not displayed. Note that the marquee dedicated character string 34 is a dedicated character string to be provided in the picto display area 21 in the horizontally long display state as the marquee display, and not displayed on a display screen in the vertically long display state.

Based on such a configuration, among character strings included in content data, the marquee dedicated character string 34 to be displayed on the display screen as update information can only be displayed in the picto display area 21 in the horizontally long display state. Accordingly, by appropriately setting the marquee dedicated character string 34, a character string with which a user easily check update of content data, or updated content can be displayed as update information.

The above-described fifth to eighth embodiments are adapted such that update information displayed in the picto display area 21 in the horizontally long display state is displayed with use of a plurality of character strings; however, the presence of update information may be indicated by a mark, or both of the mark indication and the character string display may be provided.

Ninth Embodiment

In the above-described fifth to eighth embodiments, the configurations are described, in which in the case where content data has been updated, corresponding update information is displayed on the display screen in the horizontally long display state, and further in the case where the display screen in the horizontally long display state on which the update information is displayed is switched to the vertically long display state, the updated content data is displayed on the display screen in the vertically long display state. On the other hand, a ninth embodiment is adapted such that in the case where, when a user watches a TV image, a broadcast station would like to provide a data broadcast corresponding to content of a TV broadcast being watched by the user, an indication that there is the data broadcast the broadcast station would like to provide (hereinafter referred to as guide information) is displayed on a display screen in the horizontally long display state. Further, the ninth embodiment is configured such that in the case where the display screen is switched to the vertically long display state during the display of the guide information on the display screen in the horizontally long display state, a current screen is displayed on the display screen in the vertically long display state, and the cursor 26 is placed on a character string corresponding to the guide information displayed in the horizontally long display state upon the switching among character strings displayed on the current screen.

In the ninth embodiment, it is also assumed that a configuration of the cellular phone 1 to be used, and an image display state are the same as those in the cellular phone 1 of the first embodiment illustrated in FIGS. 1 to 3, and an electrical configuration of a digital TV broadcast system applied with the cellular phone 1 is the same as that of the first embodiment illustrated in FIG. 4. We here omit description of the configuration of the cellular phone 1 and electrical configuration of the digital TV broadcast system.

Also, a configuration of the control part 6 is, as illustrated in FIG. 20, the same as that in the fifth embodiment except that the update information generating part 69 and the update information display control part 674 in the fifth embodiment are changed to a guide information generating part 70 and a guide information display control part 675, respectively, and a display selecting part 676 is added in the display control part 67. Except for the guide information generating part 70, the guide information display control part 675, and the display selecting part 676, components having the same configuration as those in the first embodiment of FIG. 5 and the fifth embodiment of FIG. 13 are denoted by the same symbols, and therefore description thereof is omitted.

The guide information generating part 70 is guide information generating means adapted to generate, on the basis of an event message in data broadcast data included in a received digital TV broadcast wave, the guide information indicating that there is the data broadcast the broadcast station would like to provide to the user, and generates the guide information from TS packets synthesized on the basis of a PID related to the data broadcast data.

In the present embodiment, the event message is transmitted from the broadcast station in real time only when necessary. Note that the event message may be adapted to be periodically transmitted from the broadcast station. The event message can also be used for notifying that content data in the data broadcast data has been updated as in the above-described fifth to eighth embodiments, or that the data broadcast associated with the TV image being watched can be watched.

In the present embodiment, in the case where the broadcast station notifies the user of the presence of the data broadcast the broadcast station would like to provide to the user, the guide information is generated on the basis of the event message transmitted from the broadcast station. Also, the guide information includes a character string or a mark (symbol) indicating the presence of the data broadcast the broadcast station would like to provide, or simplified content of the data broadcast the broadcast station would like to provide. Note that the data broadcasts the broadcast station would like to provide include information on a sponsor of an on-air TV commercial, commercial product the sponsor would like to provide, data broadcast associated with content of a TV program, and the like. The guide information display control part 675 displays on the display part 2a the guide information generated in the guide information generating part 70.

The display selecting part 676 is configured to, upon switching from the display screen in the horizontally long display state on which the above guide information is displayed to that in the vertically long display state, select whether or not to display content data corresponding to the above guide information displayed in the horizontally long display state on the display screen in the vertically long display state.

In the present embodiment, when, upon rotation of a display casing 2 to change from the above display screen in the horizontally long display state to that in the vertically long display state, the user would like to display the content data corresponding to the above guide information, the user directly rotates the display casing 2. On the other hand, in the case where the user would not like to display the content data corresponding to the above guide information, the user rotates the display casing 2 while pressing a predetermined button in the operation part 4 of the operation casing 5. As described, the above display selecting part 676 is configured to, when the above display casing 2 is rotated to switch the display screen between the display and the nondisplay, select the display or nondisplay on the basis of whether or not the switching is performed while pressing the predetermined button in the operation part 4 of the above operation casing 5.

In the present embodiment, when the user rotates the display casing 2, the user can select whether or not to display the content data corresponding to the above guide information on the basis of a simple operation of whether or not the user rotates it while pressing the predetermined button in the operation part 4 of the operation casing 5, as the user desires.

FIG. 21 is a diagram illustrating an aspect upon creation of content data on the basis of received TS packets 31 in the ninth embodiment. In the case where the content data is transmitted in the data carousel system, each of modules of the content data is divided into a plurality of pieces of block data as DDBs. Then, these DDBs and DII including information on each of the modules are repeatedly transmitted as TS packets 31. Further, if necessary, an event message (EM) is transmitted along with the DDI and DDBs as illustrated in FIG. 21.

The DII, plurality of DDBs, and event message transmitted as the TS packets 31 are respectively assigned with different PIDs, and by synthesizing TS packets 31 having a common PID, the DII and respective DDBs are created as separate pieces of data. In the present embodiment, the DII, two DDBs, and event message are created as separate pieces of data on the basis of the PIDs (a to d) respectively assigned thereto. Note that each of the DDBs is the block data constituting each of the modules of the content data, and includes a character string, image data, and the like. Also, the DII includes: a module ID that is identification information assigned to each of the modules; and version information including date and time when the module was updated, and the like.

The event message includes: a message ID that is identification information assigned to the content data to which the broadcast station would like to guide; and a character string to be displayed on the display screen in the horizontally long display state. The character string to be displayed on the display screen in the horizontally long display state may be displayed as a text or/and a mark. Further, the event message is adapted to include information on an activating URL (Uniform Resource Locator) for page data to which the broadcast station would like to guide. The above-described guide information generating part 70 generates the guide information on the basis of the pieces of information in the event message.

The plurality of DDBs generated in the above manner are synthesized on the basis of the module ID included in the DII, and thereby each of the modules 32 is generated. Note that each of the modules 32 may be generated from a plurality of DDBs or one DDB. Content data including current screen data and page data, which includes the plurality of generated modules 32, is stored in the content data storage part 132.

FIG. 22 is a diagram illustrating an example of a display aspect of the display part 2a during receipt of a TV broadcast and data broadcast, in which (a) illustrates a display aspect in the horizontally long display state, (b) illustrates a display aspect for a case where the state of (a) has been switched to the vertically long display state, and (c) illustrates a state where selected page data is displayed. As illustrated in FIG. 22 (*a*), on the display screen of the display part 2a in the horizontally long display state, the picto display area 21 and the TV image display area 22 are formed. Also, as illustrated in FIGS. 22 (*b*) and (*c*), on the display screen of the display part 2a in the vertically long display state, the picto display area 23, the TV image display area 24, and the data broadcast display area 25 are formed.

The present embodiment is adapted such that in the case where the broadcast station would like to provide the data broadcast associated with the TV broadcast being watched, the predetermined guide information is generated, as the character string indicating that the data broadcast the broadcast station would like to provide is desirably watched, on the basis of the event message transmitted from the broadcast station, and the guide information is displayed in the picto display area 21 as illustrated in FIG. 22 (*a*). The picto display area 21 can display a single line of characters, and is adapted to provide the marquee display, which is described in the first embodiment, in a longer direction of the display screen.

When the display casing 2 is rotated from the state of FIG. 22 (*a*) to switch from the horizontally long display state to the vertically long display state, the picto display area 23, the TV image display area 24, and the data broadcast display area 25 are formed on the display screen as illustrated in FIG. 22 (*b*).

The present embodiment is adapted such that as the content data of the data broadcast, character strings associated with news, weather forecast, sponsor, and the like provided by the broadcast station can be transmitted, and in the data broadcast display area 25 illustrated in FIG. 22 (*b*), a current screen for selecting one from such various types of content data is displayed. The data broadcast display area 25 has a vertical length larger than that of the picto display area 23, and can display characters over a plurality of lines. On the current screen illustrated in FIG. 17 (*b*), character strings such as "News" and "Sponsor" included in the current screen data are displayed in the data broadcast display area 25 over a plurality of lines.

The user moves the cursor 26 to any of the character strings displayed on the current screen of FIG. 22 (*b*) to perform a decision operation, and can thereby display page data corresponding to the character string in the data broadcast display area 25 as illustrated in FIG. 22 (*c*). In the example of FIG. 22 (*c*), the decision operation is performed with the cursor 26 being placed on the character string "Sponsor" in FIG. 22 (*b*), and thereby a character string as page data associated with "Sponsor" is displayed in the data broadcast display area 25.

The present embodiment is adapted such that in the case where the display screen of the display part 2a is switched from the horizontally long display state to the vertically long display state while the guide information is provided in the picto display area 21 as the marquee display as illustrated in FIG. 22 (*a*), the cursor 26 is placed on the character string corresponding to the guide information displayed in the horizontally long display state upon the switching among the character strings displayed on the display screen as illustrated in FIG. 22 (*b*).

In the example illustrated in FIG. 22, while a car commercial is broadcasted in the TV broadcast, the event message indicating that the broadcast station would like to provide information on a new car in the commercial is transmitted from the broadcast station, and the guide information is displayed on the display screen in the horizontally long display state (FIG. 22 (*a*)). Then, by switching the state of FIG. 22 (*a*) where the display screen is in the horizontally long display state to the vertically long display state, the cursor 26 on the current screen is placed on the character string "Sponsor" corresponding to a sponsor of the commercial (FIG. 22 (*b*)). Subsequently, the decision operation is performed with the character string "Sponsor", and thereby in the page data associated with "Sponsor", page data associated with the information on the new car in the commercial is displayed.

Based on such a configuration, guide information is displayed in the picto display area 21 on the display screen in the horizontally long display state, and therefore a user can check with the small area the presence of the guide information from a broadcast station while watching a TV image on the display screen in the horizontally long display state. Also, in the case where the user having checked the guide information displayed in the picto display area 21 on the display screen in the horizontally long display state would like to check in detail content of a data broadcast the broadcast station would like to provide, the user can immediately check the content of the guide information by switching the display screen to the vertically long display state. At this time, the cursor 26 is automatically placed on a character string corresponding to the guide information displayed in the horizontally state among character strings included in content data displayed on the display screen in the vertically long display state, so that a portion of the data broadcast the broadcast station would like to provide is easily recognizable, and therefore the user can easily check the content of the guide information.

FIG. 23 is a flowchart illustrating an example of processing performed by the control part 6 during receipt of a TV broadcast and data broadcast in the horizontally long display state in the present embodiment. During the receipt of the TV broadcast in the horizontally long display state, a TV image is displayed in the TV image display area 22, and in the case where guide information is generated on the basis of an event message of received data broadcast data (Yes in Step S501), the guide information is provided in the picto display area 21 as the marquee display as illustrated in FIG. 23 (*a*) (Step S502).

If the display screen of the display part 2*a* is switched to the vertically long display state when the guide information is provided on the display screen in the horizontally long display state as the marquee display (Yes in Step S503), an arrangement direction of the TV image is rotated by 90 degrees (Step S504). Also, in the data broadcast display area 25 having appeared on the display screen by the switching, a current screen is displayed (Step S505).

Note that the present embodiment is configured such that in the case where the display casing 2 is rotated while pressing the predetermined button in the operation part 4 of the operation casing 5 upon switching operation for display in Step S503, the display is switched to an ordinary current screen for a TOP page that does not correspond to the guide information displayed on the display screen in the horizontally long display state, whereas in the case where the display casing 2 is directly rotated, the display is switched to the current screen corresponding to the above guide information.

Then, in the case where the display is switched to the current screen corresponding to the above guide information, the cursor 26 is automatically placed on a character string corresponding to the guide information displayed in the horizontally long display state upon the switching among character strings displayed on the current screen, whereas in the case where the display is switched to the ordinary current screen for the TOP page that does not correspond to the guide information displayed on the display screen in the horizontally long display state, the cursor 26 is automatically placed on a character string displayed in an uppermost place of the TOP page (Step S506).

By using the operation part 4 to perform the decision operation of the cursor having been automatically placed in Step S506 (yes in Step S507), a user can read page data that corresponds to the character string on which the cursor 26 is placed, and to the guide information, to display the page data in the data broadcast display area 25 (Step S508). Also, by operating the operation part 4 to move the cursor 26 to a character string different from the character string on which the cursor 26 have been automatically placed in Step S506, and performing the decision operation, the user can also read page data corresponding to the character string on which the cursor 26 is placed.

Tenth Embodiment

In the ninth embodiment, the configuration is described, in which in the case where the display screen is switched to the vertically long display state during the display of the guide information on the display screen in the horizontally long display state, the current screen is displayed on the display screen in the vertically long display state, and the cursor 26 is placed on the character string corresponding to the guide information displayed in the horizontally long display state upon the switching among the character strings displayed on the current screen. On the other hand, a tenth embodiment is adapted such that in the case where a display screen is switched to the vertically long display state during display of guide information on the display screen in the horizontally long display state, page data corresponding to the guide information displayed in the horizontally long display state upon the switching is displayed on the display screen in the vertically long display state.

FIG. 24 is a diagram illustrating an example of a display aspect of the display part 2*a* during receipt of a TV broadcast and data broadcast in the cellular phone 1 according to the tenth embodiment of the present invention, in which (a) illustrates a display aspect in the horizontally long display state, and (b) illustrates a display aspect for a case where the state of (a) has been switched to the vertically long display state. On the display screen of the display part 2*a* in the horizontally long display state, the picto display area 21 and the TV image display area 22 are formed, similarly to the ninth embodiment, and in the TV image display area 22, a TV image is displayed with a shorter direction of the display screen being made vertical. Also, in the case where guide information is generated on the basis of received data broadcast data, the guide information is provided in the picto display area 21 as the marquee display as illustrated in FIG. 24 (*a*).

Then, when the display casing 2 is rotated from the state of FIG. 24 (*a*) to switch from the horizontally long display state to the vertically long display state, the picto display area 23, the TV image display area 24, and the data broadcast display area 25 are formed on the display screen as illustrated in FIG. 24 (*b*). In this case, display aspects in the picto display area 23 and the TV image display area 24 are the same as those illustrated in FIG. 22 (*b*) in the ninth embodiment, and therefore description thereof is omitted.

The tenth embodiment is adapted such that in the case where the display screen of the display part 2*a* is switched from the horizontally long display state to the vertically long display state when the guide information is provided in the picto display area 21 as the marquee display as illustrated in FIG. 24 (*a*), page data corresponding to the guide information displayed in the horizontally long display state upon the switching, i.e., page data corresponding to content data associated with the TV broadcast, which the broadcast station would like to provide, is displayed in the data broadcast display area 25 on the display screen as illustrated in FIG. 24 (*b*).

More specifically, if an event message indicating that the broadcast station would like to provide information on a new car in a commercial is transmitted from the broadcast station when the car commercial is broadcasted in the TV broadcast, the guide information is displayed on the display screen in the horizontally long display state (FIG. 24 (*a*)). By switching the display screen from the horizontally long display state to the vertically long display state in this display state, page data associated with the information on the new car in the commercial (FIG. 24 (*b*)) in page data associated with "Sponsor", which corresponds to a lower level equal to a second or lower level in a hierarchy of current screen data, is adapted to be displayed.

Based on such a configuration, guide information associated with content data is displayed in the picto display area 21 on the display screen in the horizontally long display state, and therefore a user can check with the small area the presence of the content data a broadcast station would like to provide while watching a TV image on the display screen in the horizontally long display state. Also, in the case where the user having checked the guide information displayed in the picto display area 21 on the display screen in the horizontally long display state would like to check in detail content of a data broadcast the broadcast station would like to provide, the user can switch the display screen to the vertically long display state. At this time, by the switching operation for the display screen from the horizontally long display state to the vertically long display state, page data corresponding to the guide information displayed in the horizontally long display state is automatically displayed on the display screen among a plurality of pieces of page data that can be displayed with switching to the display screen in the vertically long display state, and therefore the user can easily check the content of the content data the broadcast station would like to provide.

FIG. 25 is a flowchart illustrating an example of processing performed by the control part 6 during receipt of a TV broadcast and data broadcast in the horizontally long display state in the tenth embodiment. During the receipt of the TV broadcast in the horizontally long display state, a TV image is displayed in the TV image display area 22, and in the case where guide information is generated on the basis of an event message of received data broadcast data (Yes in Step S601), the guide information is provided in the picto display area 21 as the marquee display as illustrated in FIG. 24 (*a*) (Step S602).

If the display screen of the display part 2*a* is switched to the vertically long display state when the guide information is provided on the display screen in the horizontally long display state as the marquee display (Yes in Step S603), an arrangement direction of the TV image is rotated by 90 degrees (Step S604), and page data corresponding to the guide information displayed in the horizontally long display state upon the switching is displayed in the data broadcast display area 25 having appeared on the display screen by the switching (Step S605).

Eleventh Embodiment

Note that in the example illustrated in FIG. 24 (*a*), the guide information is provided in the picto display area 21 with use of the predetermined character string as the marquee display; however, as illustrated in FIG. 26 (*a*), a dedicated mark [d] indicating the guide information may be displayed in the picto display area 21. Further, a dedicated mark and a character string can also be displayed. Also in the example illustrated in FIG. 26, (a) illustrates a display aspect in the horizontally long display state, and (b) illustrates a display aspect for a case where the state of (a) has been switched to the vertically long display state. On a display screen of the display part 2*a* in the horizontally long display state, the picto display area 21 and the TV image display area 22 are formed, similarly to the ninth embodiment, and in the TV image display area 22, a TV image is displayed with a shorter direction of the display screen being made vertical. Also, in the case where guide information is generated on the basis of received data broadcast data, the dedicated mark [d] indicating the guide information is displayed in the picto display area 21 as illustrated in FIG. 26 (*a*).

Twelfth Embodiment

As an example of a case where a broadcast station would like to provide a data broadcast corresponding to content of a TV broadcast being watched by a user, the tenth embodiment is adapted such that while the car commercial is broadcasted in the TV broadcast, the event message indicating that the broadcast station would like to provide the information on the new car in the commercial is transmitted from the broadcast station; the guide information is displayed on the display screen in the horizontally long display state; and by switching the display screen from the horizontally long display state to the vertically long display state at this time, the page data associated with the information on the new car in the commercial is displayed.

On the other hand, in a twelfth embodiment, as illustrated in FIG. 27, while a quiz program is broadcasted in a TV broadcast, an event message indicating that a broadcast station would like to provide in a data broadcast a hint about a question asked at the time is transmitted from the broadcast station, and then guide information indicating that the broadcast station would like to provide the hint about the question is displayed on a display screen in the horizontally long display state. By switching the display screen on which the guide information is displayed from the horizontally long display state to the vertically long display state, page data on the hint about the question asked in the quiz program is displayed. Note that the displays of the above guide information and page data in the twelfth embodiment are controlled in the same manner as that in the tenth embodiment, and therefore description thereof is omitted.

Thirteenth Embodiment

Also, as another example of the case where a broadcast station would like to provide a data broadcast corresponding to content of a TV broadcast being watched by a user, a thirteenth embodiment is described on the basis of FIG. 28. In the thirteenth embodiment, when a program for introducing a restaurant is broadcasted in a TV broadcast, an event message indicating that a broadcast station would like to provide information on the restaurant broadcasted at the time, for example, a coupon is obtainable, in a data broadcast is transmitted from the broadcast station, and guide information on the restaurant is displayed on a display screen in the horizontally long display state. By switching the display screen on which the guide information is displayed from the horizontally long display state to the vertically long display state, page data on a home page of the restaurant broadcasted at the time is adapted to be displayed. At this time, the cursor 26 is placed on a character string corresponding to the coupon in the page data. The display of the guide information in the thirteenth embodiment is controlled in the same manner as that in the above-described tenth embodiment, and regarding control for placing the cursor 26 on the character string corresponding to the coupon in the above page data, the control same as that described in the sixth embodiment is performed, and therefore description thereof is omitted.

Also, as another piece of information the broadcast station would like to provide to a user, information linked with TV images can be displayed on the display screen as guide information, for example, while images of a player are broadcasted during a relay broadcast of a baseball game, guide information is displayed on the display screen so as to be able to obtain a profile of the player from a data broadcast.

Any of the above-described ninth to thirteenth embodiments is adapted such that in the case where guide information is displayed on the display screen in the horizontally long display state on the basis of an event message, a TV broadcast is received with the cellular phone, and even while a TV image is only displayed on the display screen, a browser is activated. Also, it is adapted such that by the activation of the browser, the event message is constantly received, and the browser is used to display the guide information on the basis of the event message.

On the other hand, the browser may not be constantly activated, and in such a case, processing software or module other than the browser may be used to receive the event message. At this time, upon switching of the display screen from the horizontally long display state to the vertically long display state, the browser is activated, and page data corresponding to an activating URL in the event message obtained with the software or the like is displayed on the display screen.

Note that in the above-described ninth embodiment, there is provided the display selecting part 676 for selecting whether or not the content data corresponding to the above guide information displayed in the horizontally long display state is displayed on the above display screen in the vertically long display state upon switching of the display screen in the horizontally long display state on which the above guide information is displayed to that in the vertically long display state. The display selecting part 676 is not limited to the application to the cellular phone in the ninth embodiment, but can also be applied to the cellular phone according to any of the above-described other embodiments in the case where guide information or update information can be displayed on the display screen.

Also, as another display selecting means, for example, in an auxiliary function setting menu of a cellular phone, a state where content data corresponding to update information or guide information is displayed (ON state) or where the content data corresponding to the update information or guide information is not displayed (OFF state) can also be set. At this time, when the OFF state is set in the auxiliary function setting menu, the content data can be hidden correspondingly to the update information or provision state upon switching of the screen.

Further, as still another display selecting means, for example, upon switching from the display screen in the horizontally long display state to that in the vertically long display screen, a screen for selecting whether or not to display content data corresponding to update information or guide information on the display screen in the vertically long display state can also be displayed before the content data is displayed.

In any of the above embodiments, the configuration is described, in which update information or guide information is provided in the picto display area 21 on the display screen in the horizontally long display state as the marquee display; however, without limitation to such a configuration, there may be provided a configuration in which the update information or the guide information is provided as the marquee display in an area other than the picto display area 21, for example, with being overlapped on a part of the TV image display area 22. Also, without limitation to the configuration in which the update information or the guide information is provided as the marquee display, there may be provided a configuration in which the update information or guide information is displayed on the display screen of the display part 2a without moving. Further, the update information or the guide information may be displayed not with a character string but with a dedicated mark as illustrated in FIG. 26 (*a*), or a character string and mark may be displayed.

Also, regarding switching of a display state, there may be provided, under the condition that a display state of an image on the display screen is constantly brought to the horizontally long display state, a display state where a TV image is displayed on the full screen of the display screen, or where the display screen in the horizontally long display state is horizontally divided into two portions, and on any one of the right and left portions, a TV image is displayed, whereas on the other one, a data broadcast is displayed is provided.

[Configuration of Cellular Phone Applicable with Present Invention]

Also, in each of the above-described embodiments, the configuration is described, in which when the display casing 2 is rotated in the plane parallel to the display screen of the display part 2a, the switching between the vertically long display state and the horizontally long display state is made. However, without limitation to such a configuration, the present invention can be applied if there is provide a configuration in which when the display casing 2 is brought into a predetermined aspect, the switching between the vertically long display state and the horizontally long display state is made. For example, there may be provided a configuration in which direction detecting means such as a geomagnetic sensor for detecting geomagnetism is used to detect an arrangement direction of the display screen with respect to a user, and on the basis of a result of the detection, the switching between the vertically long display state and the horizontally long display state is made. As described above, regarding a method for switching between the display screen in the horizontally long display state and that in the vertically long display state, the switching may be made on the basis of the rotation of the casing or a sliding operation, or by operating operation buttons on the casing, and the switching method can be arbitrarily set.

The present invention can be applied to the cellular phone 1 in which the display casing 2 as illustrated in FIGS. 29 and 30 rotates around an axis parallel to a display screen of the display part 2*a* with respect to the operation casing 5. In this case, for example, when the display casing 2 is rotated such that the display part 2*a* of the display casing 2 faces to an operation part 4 of the operation casing 5 when the display casing 2 and the operation casing 5 are brought into a folded state (state in FIG. 29), a TV image and data broadcast can be displayed with the display screen being in the vertically long display state, whereas when the display casing 2 is rotated such that the display part 2*a* of the display casing 2 faces outward when the display casing 2 and the operation casing 5 are brought into the folded state (state in FIG. 30), the TV image, and update information or guide information can be displayed with the display screen being in the horizontally long display state. Also, in the state of FIG. 29, the display screen may be brought into the horizontally long display state, whereas in the state of FIG. 30, it may be brought into the vertically long display state.

The present invention can also be applied to a cellular phone 1 in which the display casing 2 as illustrated in FIGS. 31 and 32 slides in a direction horizontal to a display screen with respect to the operation casing 5. In this case, for example, in the case where the display casing 2 and the operation casing 5 are aligned in position with each other (state in FIG. 31), a TV image, and update information or guide information can be displayed with the display screen being in the horizontally long display state, whereas in the case where the display casing 2 is slid in a longer direction with respect to the operation casing 5 (state in FIG. 32), the TV image and a data broadcast can be displayed with the display screen being in the vertically long display state. Also, in the state of FIG. 32, the display screen can be brought into the horizontally long display state, whereas in the state of FIG. 31, it can be brought into the vertically long display state.

The present invention can also be applied to the cellular phone 1 in which a display casing 2 as illustrated in FIGS. 33 and 34 is adapted to rotate in a plane parallel to a display screen with respect to an operation casing 5, and when a longer direction of the display casing 2 is made vertical to a longer direction of the operation casing 5, the whole of the display casing 2 and the operation casing 5 are brought into an L-shaped state. In this case, for example, in a state where the display casing 2 is positioned with respect to the operation casing 5 such that the whole of the casings are brought into an I-shaped state (state in FIG. 33), a TV image and data broadcast can be displayed with the display screen being in the vertically long display state, whereas in the state where the display casing 2 is rotated with respect to the operation casing 5 such that the whole of the casings are brought into the L-shaped state (state in FIG. 34), the TV image, and update information or the guide information can be displayed with the display screen being in the horizontally long display state. Also, in the state of FIG. 33, the display screen can be brought into the horizontally long display state, whereas in the state of FIG. 34, it can be brought into the vertically long display state.

The present invention can also be applied to the cellular phone 1 in which the display casing 2 as illustrated in FIGS. 35 and 36 slides in a direction parallel to a display screen with respect to the operation casing 5, and also rotates in a plane parallel to the display screen with respect to the operation casing 5. In this case, for example, in a state where the display casing 2 and the operation casing 5 are aligned in position with each other (state in FIG. 35 (*a*)), or the display casing 2 is slid in a longer direction with respect to the operation casing 5 (state in FIG. 35 (*b*)), a TV image and data broadcast can be displayed with the display screen being in the vertically long display state, whereas in a state where the display casing 2 is rotated in the plane parallel to the display screen with respect to the operation casing 5 such that a whole of the casings is formed in a T-shape (state in FIG. 36), the TV image, and the update information or the guide information can be displayed with the display screen being in the horizontally long display state. Also, in the state of FIG. 35, the display screen can be brought into the horizontally long display state, whereas in the state of FIG. 36, it can be brought into the vertically long display state.

The present invention can also be applied to the cellular phone 1 in which the display casing 2 as illustrated in FIG. 37 is only folded toward the operation casing 5 such that the display part 2*a* and the operation part 4 face to each other. In this case, a display state can be switched by operating buttons in the operation part 4 such that a TV image, and update information or guide information are displayed with a display screen being in the horizontally long display state, or the TV image and the data broadcast are displayed with the display screen being in the vertically long display state.

In each of the above embodiments, there is described the case where the present invention is applied to the cellular phone 1; however, the present invention is not limited to the application to the cellular phone 1, but can be applied to a various types of portable information terminal devices each having a display screen, such as a digital camera, and portable TV receiver.

Note that the cellular phone and the digital TV broadcast system of the present invention can have any of the following configurations in the case where the update information or the guide information is displayed on a display screen as described in the above fifth to thirteenth embodiments.

[Configuration Example in which Update Information is Displayed]

<First Aspect of the Present Invention Relating to Cellular Phone Displaying Update Information on Display Screen>

A cellular phone according to a first aspect of the present invention includes a display screen, wherein the display screen can be switched between a first display state and a second display state, and can be configured to include: digital TV broadcast receiving means adapted to receive a digital TV broadcast wave including TV broadcast data and data broadcast data; TV image generating means adapted to generate a TV image on a basis of the received TV broadcast data; content data creating means adapted to create content data including a character string on a basis of the received data broadcast data; update information generating means adapted to generate update information on the content data on the basis of the received data broadcast data; TV image display controlling means adapted to display the TV image on the display screen in the first display state and the second display state; content data display controlling means adapted to, in the first display state, display the content data on a part of the display screen; update information display controlling means adapted to, in the second display state, display the update information on a part of the display screen; and character string selecting means adapted to select, among the character strings included in the content data displayed on the display screen upon switching of the display screen from the second display state to the first display state during the display of the update information, a character string corresponding to the update information displayed in the second display state upon the switching.

According to such a configuration, the update information is displayed on the part of the display screen in the second display state, and therefore a user can check the update of the content data with a small display area while watching the TV image on the display screen in the second display state. Also, in the case where the user having checked the update information displayed on the part of the display screen in the second display state would like to check updated content of a data broadcast in detail, the user can easily display the updated content of the data broadcast on the display screen by switching the display screen to the first display state. At this time, among the character strings included in the content data displayed on the display screen in the first display screen by switching from the display screen in the second display state on which the update information is displayed to that in the first display state, the character string corresponding to the update information displayed in the second display state is automatically selected, so that an updated portion is easily recognizable, and therefore the user can easily check the updated content.

<Second Aspect of the Present Invention Relating to Cellular Phone Displaying Update Information on Display Screen>

A cellular phone according to a second aspect of the present invention can be, in addition to the configuration of the first aspect of the present invention, configured such that the content data creating means creates, on the basis of the received data broadcast data, the content data including a plurality of pieces of page data that can be displayed with switching to the part of the display screen in the first display state, each of the pieces of page data including a grouped character string; the content data display controlling means displays, upon switching of the display screen from the second display state to the first display state during the display of the update information, page data corresponding to the update information displayed in the second display state upon the switching on the display screen among the plurality of pieces of page data; and the character string selecting means selects, among the character strings included in the pieces of page data displayed in the first display state, the character string corresponding to the update information displayed in the second display state upon the switching.

According to such a configuration, among the plurality of pieces of page data that can be displayed on the display screen in the first display state by switching from the display screen in the second display state on which the update information is displayed to that in the first display state, the page data corresponding to the update information displayed in the second display state can be displayed on the display screen. At this time, by the character string selecting means, among the character strings included in the pieces of page data displayed on the display screen in the first display state, the character string corresponding to the update information displayed in the second display state can be automatically selected.

<Third Aspect of the Present Invention Relating to Cellular Phone Displaying Update Information on Display Screen>

A cellular phone according to a third aspect of the present invention includes a display screen, wherein the display screen can be switched between a first display state and a second display state, and can be configured to include: digital TV broadcast receiving means adapted to receive a digital TV broadcast wave including TV broadcast data and data broadcast data; TV image generating means adapted to generate a TV image on a basis of the received TV broadcast data; content data creating means adapted to create, on a basis of the received data broadcast data, content data including a plurality of pieces of page data that can be displayed with switching to a part of the display screen in the first display state, each of the pieces of page data including a grouped character string; update information generating means adapted to generate update information on the content data on the basis of the received data broadcast data; TV image display controlling means adapted to display the TV image on the display screen in the first display state and the second display state; and content data display controlling means adapted to, upon switching of the display screen from the second display state to the first display state during the display of the update information, display on a part of the display screen page data corresponding to the update information displayed in the second display state upon the switching among the plurality of pieces of page data.

According to such a configuration, the update information on the content data is displayed on the part of the display screen in the second display state, and therefore a user can check the update of the content data with the small display area while watching the TV image on the display screen in the second display state. Also, in the case where the user having checked the update information displayed on the part of the display screen in the second display state would like to check updated content of a data broadcast in detail, the user can easily display the updated content of the data broadcast on the display screen by switching the display screen to the first display state. At this time, by switching the display screen in the second display state on which the update information is displayed to that in the first display state, among the plurality of pieces of page data that can be displayed with switching to the display screen in the first display state, the page data corresponding to the update information displayed in the second display state is automatically displayed on the display screen in the first display state, and therefore the user can easily check the updated content.

<Fourth Aspect of the Present Invention Relating to Cellular Phone Displaying Update Information on Display Screen>

A cellular phone according to a fourth aspect of the present invention can be, in addition to the configurations of the above first to third aspects of the present invention, configured such that the display screen is rectangular, and can be switched between a vertically long display state as the first display state and a horizontally long display state as the second display state; and the TV image display controlling means displays the TV image with a longer direction of the display screen being made vertical in the vertically long display state, and in the horizontally long display state, with a shorter direction of the display screen being made vertical.

According to such a configuration, the update information on the content data is displayed on the part of the display screen in the horizontally long display state, and therefore the user can check the update of the content data with the small display area while watching the large TV image on the display screen in the horizontally long display state, and by switching the display screen from the horizontally long display state to the vertically long display state, easily check the updated content.

<Fifth Aspect of the Present Invention Relating to Cellular Phone Displaying Update Information on Display Screen>

A cellular phone according to a fifth aspect of the present invention can be, in addition to the configuration of the above fourth aspect of the present invention, configured such that the update information generating means extracts a character string including updated characters from the content data as the update information; and the update information display controlling means displays, in the horizontally long display state, the update information extracted from the content data on the display screen.

According to such a configuration, the character string including the updated characters can be extracted from the content data as the update information, and the extracted character string can be displayed on the part of the display screen in the horizontally long display state. Accordingly, by checking the character string in an updated portion, the user can check the update of the content data, and the updated content while watching the TV image on the display screen in the horizontally long display state. At this time, in the case where the updated content cannot be fully understood only with the displayed character string, the updated content can be checked in more detail by switching the display screen from the horizontally long display state to the vertically long display state.

<Sixth Aspect of the Present Invention Relating to Cellular Phone Displaying Update Information on Display Screen>

A cellular phone according to a sixth aspect of the present invention can be, in addition to the configuration of the above fifth aspect of the present invention, configured such that the content data includes a flag related to a character string included in the content data, the flag indicating whether or not to display the character string as the update information; and the update information display controlling means displays, in the horizontally long display state, the update information on the display screen on a basis of the flag.

According to such a configuration, among the character strings included in the content data, the character string corresponding the flag indicating that the character string is displayed as the update information can only be displayed on the part of the display screen in the horizontally long display state. Accordingly, by appropriately setting the flag, the character string with which the user easily checks the update of the content data, or the updated content can be displayed as the update information.

<Seventh Aspect of the Present Invention Relating to Cellular Phone Displaying Update Information on Display Screen>

A cellular phone according to a seventh aspect of the present invention can be, in addition to the configuration of the above fourth aspect of the present invention, configured such that the content data includes a dedicated character string to be displayed on the display screen as the update information; and the update information display controlling means displays the dedicated character string on the display screen in the horizontally long display state, and in the vertically long display state, the content data display controlling means does not display the dedicated character string on the display screen.

According to such a configuration, among the character strings included in the content data, the dedicated character string to be displayed on the display screen as the update information can only be displayed on the part of the display screen in the horizontally long display state. Accordingly, by appropriately setting the dedicated character string, the update of the content data, or the updated content can be displayed with the character string easily checked by the user.

<Eighth Aspect of the Present Invention Relating to Cellular Phone Displaying Update Information on Display Screen>

A cellular phone according to an eighth aspect of the present invention can be, in addition to the configurations of the above first to seventh aspects of the present invention, configured to include display selecting means adapted to, upon switching of the display screen in the second display state on which the update information is displayed to that in the first display state, select whether or not to display the content data corresponding to the update information displayed in the second display state on the display screen in the first display state.

According to such a configuration, in the case where the user would like to display the content data corresponding to the update information on the display screen in the first display state, the user can select to display the content data corresponding to the update information with the display selecting means. Also, in the case where the user would not like to display the content data corresponding to the update information on the display screen in the first display state, the user can select not to display the content data corresponding to the update information with the display selecting means. Accordingly, depending on the user's desire, the content data having the update information can be or cannot be displayed on the display screen in the first display state.

As the display selecting means, there is provide a configuration in which, for example, an auxiliary function setting menu of the cellular phone is used to enable the user to set with ON or OFF whether or not to display the content data having the update information, or upon switching from the display screen in the second display state to that in the first display state, a screen for selecting whether or not to display the content data having the update information on the display screen in the first display state is displayed before the content data is displayed.

<Ninth Aspect of the Present Invention Relating to Cellular Phone Displaying Update Information on Display Screen>

A digital TV broadcast system according to a ninth aspect of the present invention includes: a digital TV broadcast transmission device for transmitting a digital TV broadcast wave including TV broadcast data and data broadcast data; and a cellular phone receiving the digital TV broadcast wave, and can be configured such that the cellular phone includes: a rectangular display screen that can be switched between a vertically long display state and a horizontally long display state; digital TV broadcast receiving means adapted to receive the digital TV broadcast wave; TV image generating means adapted to generate a TV image on a basis of the received TV broadcast data; content data creating means adapted to create content data including a character string on a basis of the received data broadcast data; update information generating means adapted to generate update information on the content data on the basis of the received data broadcast data; TV image display controlling means adapted to display the TV image with a longer direction of the display screen being made vertical in the vertically long display state, and in the horizontally long display state, with a shorter direction of the display screen being made vertical; content data display controlling means adapted to, in the vertically long display state, display the content data on a part of the display screen; and update information display controlling means adapted to, in the horizontally long display state, display the update information on a part of the display screen, the digital TV broadcast transmission device transmits a flag related to a character string included in the content data, the flag indicating whether or not to display the character string as the update information, and the update information display controlling means displays, in the horizontally long display state, the update information on the display screen on a basis of the flag.

<Tenth Aspect of the Present Invention Relating to Cellular Phone Displaying Update Information on Display Screen>

A digital TV broadcast system according to a tenth aspect of the present invention includes: a digital TV broadcast transmission device for transmitting a digital TV broadcast wave including TV broadcast data and data broadcast data; and a cellular phone receiving the digital TV broadcast wave, and can be configured such that the cellular phone includes: a rectangular display screen that can be switched between a vertically long display state and a horizontally long display state; digital TV broadcast receiving means adapted to receive the digital TV broadcast wave; TV image generating means adapted to generate a TV image on a basis of the received TV broadcast data; content data creating means adapted to create content data including a character string on a basis of the received data broadcast data; update information generating means adapted to generate update information on the content data on the basis of the received data broadcast data; TV image display controlling means adapted to display the TV image with a longer direction of the display screen being made vertical in the vertically long display state, and in the horizontally long display state, with a shorter direction of the display screen being made vertical; update information display controlling means adapted to, in the horizontally long display state, display the update information on a part of the display screen; and content data display controlling means adapted to, in the vertically long display state, display the content data on a part of the display screen, the digital TV broadcast transmission device transmits a dedicated character string to be displayed on the display screen as the update information, and the update information display controlling means displays the dedicated character string on the display screen in the horizontally long display state, and in the vertically long display state, the content data display controlling means does not display the dedicated character string on the display screen.

[Configuration Example in which Guide Information is Displayed]

<First Aspect of the Present Invention Relating to Cellular Phone Displaying Guide Information on Display Screen>

A cellular phone according to the first aspect of the present invention includes a display screen, wherein the display screen can be switched between a first display state and a second display state, and can be configured to include: digital TV broadcast receiving means adapted to receive a digital TV broadcast wave including TV broadcast data and data broadcast data; TV image generating means adapted to generate a TV image on a basis of the received TV broadcast data; content data creating means adapted to create content data including a character string on a basis of the received data broadcast data; guide information generating means adapted to generate guide information on the content data on the basis of the received data broadcast data; TV image display controlling means adapted to display the TV image on the display screen in the first display state and the second display state; content data display controlling means adapted to, in the first display state, display the content data on a part of the display screen; guide information display controlling means adapted to, in the second display state, display the guide information on a part of the display screen; and character string selecting means adapted to select, among character strings included in the content data displayed on the display screen upon switching of the display screen from the second display state to the first display state during the display of the guide information, a character string corresponding to the guide information displayed in the second display state upon the switching.

According to such a configuration, the guide information is displayed on the part of the display screen in the second display state, and therefore a user can check the presence of the guide information with the small display area while watching the TV image on the display screen in the second display state. Also, in the case where the user having checked the guide information displayed on the part of the display screen in the second display state would like to check content of a data broadcast corresponding to the guide information in detail, the user can easily display the content of the data broadcast corresponding to the guide information on the display screen by switching the display screen to the first display state. At this time, among the character strings included in the content data displayed on the display screen in the first display state by switching from the display screen in the second display state on which the guide information is displayed to that in the first display state, the character string corresponding to the guide information displayed in the second display state is automatically selected, so that a portion of the data broadcast corresponding to the guide information is easily recognizable, and therefore the user can easily check the content of the data broadcast corresponding to the guide information. Note that as means adapted to obtain the guide information, an event message having a message ID for guiding to predetermined content data is used, and a character string, a mark, or the like specified by the event message can be displayed on the display screen in the second display state as the guide information.

<Second Aspect of the Present Invention Relating to Cellular Phone Displaying Guide Information on Display Screen>

A cellular phone according to a second aspect of the present invention can be, in addition to the configuration of the above-described first aspect of the present invention, configured such that the content data creating means creates, on the basis of the received data broadcast data, the content data including a plurality of pieces of page data that can be displayed with switching to the part of the display screen in the first display state, each of the pieces of page data including a grouped character string; the content data display controlling means displays on the display screen, upon switching of the display screen from the second display state to the first display state during the display of the guide information, page data corresponding to the guide information displayed in the second display state upon the switching among the plurality of pieces of page data; and the character string selecting means selects, among the character strings included in the pieces of page data displayed in the first display state, a character string corresponding to the guide information displayed in the second display state upon the switching.

According to such a configuration, among the plurality of pieces of page data that can be displayed on the display screen in the first display state by switching from the display screen in the second display state on which the guide information is displayed to that in the first display state, the page data corresponding to the guide information displayed in the second display state can be displayed on the display screen. At this time, by the character string selecting means, among the character strings included in the pieces of page data displayed on the display screen in the first display state, the character string corresponding to the guide information displayed in the second display state can be automatically selected.

<Third Aspect of the Present Invention Relating to Cellular Phone Displaying Guide Information on Display Screen>

A cellular phone according to a third aspect of the present invention can be, in addition to the configuration of the above first or second aspect of the present invention, configured such that the guide information is a dedicated character string to be displayed on the display screen in the second display state; and the content data display controlling means does not display, in the first display state, the dedicated character string on the display screen.

According to such a configuration, among the character strings included in the content data, the dedicated character string can only be displayed on the part of the display screen in the second display state as the guide information. Accordingly, by appropriately setting the dedicated character string, the presence of a data broadcast associated with a TV broadcast, or content of the data broadcast associated with the TV broadcast can be displayed with the character string easily checked by the user. Also, by displaying the dedicated character string on the part of the display screen in the second display state as the guide information, the user can easily check the presence of the data broadcast associated with the TV broadcast, or the content of the data broadcast associated with the TV broadcast. At this time, in the case where the content of the data broadcast associated with the TV broadcast cannot be fully understood only with the displayed character string, the content of the data broadcast associated with the TV broadcast can be checked in detail by switching the display screen from the second display state to the first display state.

<Fourth Aspect of the Present Invention Relating to Cellular Phone Displaying Guide Information on Display Screen>

A cellular phone according to a fourth aspect of the present invention can be, in addition to the configuration of the above first or second aspect of the present invention, configured such that the guide information is a dedicated mark to be displayed on the display screen in the second display state; and the content data display controlling means does not display, in the first display state, the dedicated mark on the display screen.

According to such a configuration, among the character strings included in the content data, the dedicated mark can only be displayed on the part of the display screen in the second display state as the guide information. Accordingly, by displaying the dedicated mark on the part of the display screen in the second display state, the user can check the presence of the data broadcast associated with the TV broadcast. At this time, in the case where the content of the data broadcast associated with the TV broadcast cannot be fully understood only with the displayed character string, the content of the data broadcast associated with the TV broadcast can be checked in more detail by switching the display screen from the second display state to the first display state. Note that as the guide information to be displayed on the part of the display screen in the second display state, both of the dedicated mark and the dedicated character string can also be provided.

<Fifth Aspect of the Present Invention Relating to Cellular Phone Displaying Guide Information on Display Screen>

A cellular phone according to a fifth aspect of the present invention can be, in addition to the configurations of the above first to fourth aspects of the present invention, configured such that the display screen is rectangular, and can be switched between a vertically long display state as the first display state and a horizontally long display state as the second display state; and the TV image display controlling means displays the TV image with a longer direction of the display screen being made vertical in the vertically long display state, and in the horizontally long display state, with a shorter direction of the display screen being made vertical.

According to such a configuration, the guide information is displayed on the part of the display screen in the horizontally long display state, and therefore the user can check with the small display area the presence of the data broadcast associated with the TV broadcast while watching the large TV image on the display screen in the horizontally long display state, and by switching the display screen from the horizontally long display state to the vertically long display state, easily check the content of the data broadcast associated with the TV broadcast.

<Sixth Aspect of the Present Invention Relating to Cellular Phone Displaying Guide Information on Display Screen>

A cellular phone according to a sixth aspect of the present invention can be, in addition to the configurations of the above first to fifth aspects of the present invention, configured to include display selecting means adapted to, upon switching of the display screen in the second display state on which the guide information is displayed to that in the first display state, select whether or not to display the content data corresponding to the guide information displayed in the second display state on the display screen in the first display state.

According to such a configuration, in the case where the user would like to display the content data corresponding to the guide information on the display screen in the first display state, the user can select to display the content data corresponding to the guide information with the display selecting means. Also, in the case where the user would not like to display the content data corresponding to the guide information on the display screen in the first display state, the user can select not to display the content data corresponding to the guide information with the display selecting means. Accordingly, depending on the user's desire, the content data having the guide information can be or cannot be displayed on the display screen in the first display state.

As the display selecting means, there is provide a configuration in which, for example, an auxiliary function setting menu of the cellular phone is used to enable the user to set with ON or OFF whether or not to display the content data having the guide information, or upon switching from the display screen in the second display state to that in the first display state, a screen for selecting whether or not to display the content data having the guide information on the display screen in the first display state is displayed before the content data is displayed.

<Seventh Aspect of the Present Invention Relating to Cellular Phone Displaying Guide Information on Display Screen>

A digital TV broadcast system according to a seventh aspect of the present invention includes: a digital TV broadcast transmission device for transmitting a digital TV broadcast wave including TV broadcast data and data broadcast data; and a cellular phone receiving the digital TV broadcast wave, and can be configured such that the cellular phone includes: a rectangular display screen that can be switched between a vertically long display state and a horizontally long display state; digital TV broadcast receiving means adapted to receive the digital TV broadcast wave; TV image generating means adapted to generate a TV image on a basis of the received TV broadcast data; content data creating means adapted to create content data including a character string on a basis of the received data broadcast data; guide information generating means adapted to generate guide information on the content data on the basis of the received data broadcast data; TV image display controlling means adapted to display the TV image with a longer direction of the display screen being made vertical in the vertically long display state, and in the horizontally long display state, with a shorter direction of the display screen being made vertical; content data display controlling means adapted to, in the vertically long display state, display the content data on a part of the display screen; guide information display controlling means adapted to, in the horizontally long display state, display the guide information on a part of the display screen; and character string selecting means adapted to select, among character strings included in the content data displayed on the display screen upon switching of the display screen from the horizontally long display state to the vertically long display state during the display of the guide information, a character string corresponding to the guide information displayed in the horizontally long display state upon the switching, the digital TV broadcast transmission device transmits a dedicated character string or a dedicated mark as the guide information, the guide information display controlling means displays, in the horizontally long display state, the dedicated character string or the dedicated mark on the display screen as the guide information, and the content data display controlling means does not display, in the vertically long display state, the guide information on the display screen. Note that as the guide information transmitted by the digital TV broadcast transmission device, both of the dedicated mark and the dedicated character string can also be transmitted. Further, the guide information display controlling means can also display guide information having the dedicated mark and the dedicated character string on the part of the display screen in the second display state.

<Eighth Aspect of the Present Invention Relating to Cellular Phone Displaying Guide Information on Display Screen>

A cellular phone according to an eighth aspect of the present invention includes a display screen, wherein the display screen can be switched between a first display state and a second display state, and can be configured to include: digital TV broadcast receiving means adapted to receive a digital TV broadcast wave including TV broadcast data and data broadcast data; TV image generating means adapted to generate a TV image on a basis of the received TV broadcast data; content data creating means adapted to create, on a basis of the received data broadcast data, content data including a plurality of pieces of page data that can be displayed with switching to a part of the display screen in the first display state, each of the pieces of page data including a grouped character string; guide information generating means adapted to generate guide information on the content data on the basis of the received data broadcast data: TV image display controlling means adapted to display the TV image on the display screen in the first display state and the second display state; guide information display controlling means adapted to, in the second display state, display the guide information on a part of the display screen; and content data display controlling means adapted to, upon switching of the display screen from the second display state to the first display state during the display of the guide information, display page data corresponding to the guide information displayed in the second display state upon the switching on the part of the display screen among the plurality of pieces of page data.

According to such a configuration, the guide information is displayed on the part of the display screen in the second display state, and therefore the user can check with the small display area the presence of a data broadcast corresponding to the guide information while watching the TV image on the display screen in the second display state. Also, in the case where the user having checked the guide information displayed on the part of the display screen in the second display state would like to check content of the data broadcast corresponding to the guide information in detail, the user can easily display the content of the data broadcast corresponding to the guide information on the display screen by switching the display screen to the first display state. At this time, by switching from the display screen in the second display state on which the guide information is displayed to that in the first display state, among the plurality of pieces of page data that can be displayed with switching to the display screen in the first display state, the page data corresponding to the guide information displayed in the second display state is automatically displayed on the display screen in the first display state, and therefore the user can easily check the content of the data broadcast corresponding to the guide information. Note that as means adapted to obtain the guide information, an event message having an message ID for guiding to predetermined content data is used, and a character string, a mark, or the like specified by the event message can be displayed on the display screen in the second display state as the guide information.

<Ninth Aspect of the Present Invention Relating to Cellular Phone Displaying Guide Information on Display Screen>

A cellular phone according to a ninth aspect of the present invention can be, in addition to the configuration of the above eighth aspect of the present invention, configured such that the guide information is a dedicated character string to be displayed on the display screen in the second display state; and the content data display controlling means does not display, in the first display state, the dedicated character string on the display screen.

According to such a configuration, among the character strings included in the content data, the dedicated character string can only be displayed on the part of the display screen in the second display state as the guide information. Accordingly, by appropriately setting the dedicated character string, the presence of a data broadcast associated with a TV broadcast, or content of the data broadcast associated with the TV broadcast can be displayed with the character string easily checked by the user. Also, by displaying the dedicated character string on the part of the display screen in the second display state as the guide information, the user can easily check the presence of the data broadcast associated with the TV broadcast, or the content of the data broadcast associated with the TV broadcast. At this time, in the case where the content of the data broadcast associated with the TV broadcast cannot be fully understood only with the displayed character string, the content of the data broadcast associated with the TV broadcast can be checked in more detail by switching the display screen from the second display state to the first display state.

<Tenth Aspect of the Present Invention Relating to Cellular Phone Displaying Guide Information on Display Screen>

A cellular phone according to a tenth present invention can be, in addition to the configuration of the above eighth aspect of the present invention, configured such that the guide information is a dedicated mark to be displayed on the display screen in the second display state; and the content data display controlling means does not display, in the first display state, the dedicated mark on the display screen.

According to such a configuration, among the character strings included in the content data, the dedicated mark can only be displayed on the part of the display screen in the second display state as the guide information. Accordingly, by displaying the dedicated mark on the part of the display screen in the second display state, the user can check the presence of a data broadcast associated with a TV broadcast. At this time, in the case where content of the data broadcast associated with the TV broadcast cannot be fully understood only with the displayed character string, the content of the data broadcast associated with the TV broadcast can be checked in more detail by switching the display screen from the second display state to the first display state. Note that as the guide information to be displayed on the part of the display screen in the second display state, both of the dedicated mark and a dedicated character string can also be provided.

<Eleventh Aspect of the Present Invention Relating to Cellular Phone Displaying Guide Information on Display Screen>

A cellular phone according to an eleventh aspect of the present invention can be, in addition to the configurations of the above eighth to tenth aspects of the present invention, configured such that the display screen is rectangular, and can be switched between a vertically long display state as the first display state and a horizontally long display state as the second display state; and the TV image display controlling means displays the TV image with a longer direction of the display screen being made vertical in the vertically long display state, and in the horizontally long display state, with a shorter direction of the display screen being made vertical.

According to such a configuration, the guide information is displayed on the part of the display screen in the horizontally long display state, and therefore the user can check with the small display area the presence of the data broadcast associated with the TV broadcast while watching the large TV image on the display screen in the horizontally long display state, and by switching the display screen from the horizontally long display state to the vertically long display state, easily check the content of the data broadcast associated with the TV broadcast.

<Twelfth Aspect of the Present Invention Relating to Cellular Phone Displaying Guide Information on Display Screen>

A cellular phone according to a twelfth aspect of the present invention can be, in addition to the configurations of the above eighth to eleventh aspects of the present invention, configured to include display selecting means adapted to, upon switching from the display screen in the second display state on which the guide information is displayed to that in the first display state, select whether or not to display the content data corresponding to the guide information displayed in the second display state on the display screen in the first display state.

According to such a configuration, in the case where the user would like to display the content data corresponding to the guide information on the display screen in the first display state, the user can select to display the content data corresponding to the guide information with the display selecting means. Also, in the case where the user would not like to display the content data corresponding to the guide information on the display screen in the first display state, the user can select not to display the content data corresponding to the guide information with the display selecting means. Accordingly, depending on the user's desire, the content data having the guide information can be or cannot be displayed or hidden on the display screen in the first display state.

As the display selecting means, there is provide a configuration in which, for example, an auxiliary function setting menu of the cellular phone is used to enable the user to set with ON or OFF whether or not to display the content data having the guide information, or upon switching from the display screen in the second display state to that in the first display state, a screen for selecting whether or not to display the content data having the guide information on the display screen in the first display state is displayed before the content data is displayed.

<Thirteenth Aspect of the Present Invention Relating to Cellular Phone Displaying Guide Information on Display Screen>

A digital TV broadcast system according to a thirteenth aspect of the present invention includes: a digital TV broadcast transmission device for transmitting a digital TV broadcast wave including TV broadcast data and data broadcast data; and a cellular phone receiving the digital TV broadcast wave, and can be configured such that the cellular phone includes: a rectangular display screen that can be switched between a vertically long display state and a horizontally long display state; digital TV broadcast receiving means adapted to receive the digital TV broadcast wave; TV image generating means adapted to generate a TV image on a basis of the received TV broadcast data; content data creating means adapted to create content data including a character string on a basis of the received data broadcast data; guide information generating means adapted to generate guide information on the content data on the basis of the received data broadcast data; TV image display controlling means adapted to display the TV image with a longer direction of the display screen being made vertical in the vertically long display state, and in the horizontally long display state, with a shorter direction of the display screen being made vertical; guide information display controlling means adapted to, in the horizontally long display state, display the guide information on a part of the display screen; and content data display controlling means adapted to, upon switching of the display screen from the horizontally long display state to the vertically long display state during the display of the guide information, display on the part of the display screen page data corresponding to the guide information displayed in the horizontally long display state upon the switching among the plurality of pieces of page data, the digital TV broadcast transmission device transmits a dedicated character string or a dedicated mark as the guide information, the guide information display controlling means displays, in the horizontally long display state, the dedicated character string or the dedicated mark on the display screen as the guide information, and the content data display controlling means does not display, in the vertically long display state, the guide information on the display screen. Note that as the guide information transmitted by the digital TV broadcast transmission device, both of the dedicated mark and the dedicated character string can also be transmitted. Further, the guide information display controlling means can be configured to display guide information having the dedicated mark and the dedicated character string on the part of the display screen in the second display state.

This application claims priorities from the following Japanese patent applications, i.e., Japanese Patent Application No. 2006-335589 filed on Dec. 13, 2006, Japanese Patent Application No. 2006-346314 filed on Dec. 22, 2006, Japanese Patent Application No. 2007-223262 filed on Aug. 29, 2007, Japanese Patent Application No. 2007-223263 filed on Aug. 29, 2007, and Japanese Patent Application No. 2007-223264 filed on Aug. 29, 2007, under the Paris Convention, and the entire content of the patent applications is incorporated herein by reference.

BRIEF DESCRIPTION OF THE DRAWINGS

FIG. 1 is a perspective view illustrating an example of a cellular phone according to a first embodiment of the present invention, in which a state where casings are expanded is illustrated.

FIG. 2 is a perspective view illustrating a state where the display casing of the cellular phone in FIG. 1 is rotated, in which the state where the display casing is rotated clockwise from the state illustrated in FIG. 1 by approximately 45 degrees as viewed from the front is illustrated.

FIG. 3 is a perspective view illustrating a state where the display casing of the cellular phone in FIG. 1 is rotated, in which the state where the display casing is rotated clockwise from the state illustrated in FIG. 1 by 90 degrees as viewed from the front is illustrated.

FIG. 4 is a block diagram illustrating an example of an electrical configuration of a digital TV broadcast system applied with the cellular phone.

FIG. 5 is a functional block diagram illustrating a configuration example of a control part of the cellular phone according to the first embodiment of the present invention.

FIG. 6 is a diagram illustrating an aspect upon creation of content data on the basis of TS packets received in the cellular phone according to the first embodiment of the present invention.

FIG. 7 is a diagram illustrating an example of a display aspect of a display part during receipt of a TV broadcast and data broadcast in the cellular phone according to the first embodiment of the present invention.

FIG. 8 is a flowchart illustrating an example of processing performed by the control part during receipt of the TV broadcast and data broadcast in a horizontally long display state in the cellular phone according to the first embodiment of the present invention.

FIG. 9 is a diagram illustrating an example of a display aspect of a display part during receipt of a TV broadcast and data broadcast in a cellular phone according to a second embodiment of the present invention.

FIG. 10 is a flowchart illustrating an example of processing performed by a control part during receipt of the TV broadcast and the data broadcast in a horizontally long display state in the cellular phone according to the second embodiment of the present invention.

FIG. 11 is a diagram illustrating an aspect upon creation of content data on the basis of TS packets received in a cellular phone according to a third embodiment of the present invention.

FIG. 12 is a diagram illustrating an aspect upon creation of content data on the basis of TS packets received in a cellular phone according to a fourth embodiment of the present invention.

FIG. 13 is a functional block diagram illustrating a configuration example of a control part of a cellular phone according to a fifth embodiment of the present invention.

FIG. 14 is a diagram illustrating an example of a display aspect of a display part during receipt of a TV broadcast and data broadcast in the cellular phone according to the fifth embodiment of the present invention.

FIG. 15 is a flowchart illustrating an example of processing performed by the control part during receipt of the TV broadcast and the data broadcast in a horizontally long display state in the cellular phone according to the fifth embodiment of the present invention.

FIG. 16 is a diagram illustrating an example of a display aspect of a display part during receipt of a TV broadcast and data broadcast in a cellular phone according to a sixth embodiment of the present invention.

FIG. 17 is a diagram illustrating a variation of the cellular phone according to the sixth embodiment of the present invention, in which an example of a display aspect of a display part during receipt of the TV broadcast and the data broadcast is illustrated.

FIG. 18 is a flowchart illustrating an example of processing performed by a control part during receipt of the TV broadcast and the data broadcast in a horizontally long display state in the cellular phone according to the sixth embodiment of the present invention.

FIG. 19 is a diagram illustrating an example of a display aspect of a display part during receipt of a TV broadcast and data broadcast in a cellular phone according to a seventh embodiment of the present invention.

FIG. 20 is a functional block diagram illustrating a configuration example of a control part of a cellular phone according to a ninth embodiment of the present invention.

FIG. 21 is a diagram illustrating an aspect upon creation of content data on the basis of TS packets received in the cellular phone according to the ninth embodiment of the present invention.

FIG. 22 is a diagram illustrating an example of a display aspect of a display part during receipt of a TV broadcast and a data broadcast in the cellular phone according to the ninth embodiment of the present invention.

FIG. 23 is a flowchart illustrating an example of processing performed by a control part during receipt of the TV broadcast and the data broadcast in a horizontally long display state in the cellular phone according to the ninth embodiment of the present invention.

FIG. 24 is a diagram illustrating an example of a display aspect of a display part during receipt of a TV broadcast and data broadcast in a cellular phone according to a tenth embodiment of the present invention.

FIG. 25 is a flowchart illustrating an example of processing performed by a control part during receipt of the TV broadcast and the data broadcast in a horizontally long display state in the cellular phone according to the tenth embodiment of the present invention.

FIG. 26 is a diagram illustrating an example of a display aspect of a display part during receipt of a TV broadcast and data broadcast in a cellular phone according to an eleventh embodiment of the present invention.

FIG. 27 is a diagram illustrating an example of a display aspect of a display part during receipt of a TV broadcast and data broadcast in a cellular phone according to a twelfth embodiment of the present invention.

FIG. 28 is a diagram illustrating an example of a display aspect of a display part during receipt of a TV broadcast and data broadcast in a cellular phone according to a thirteenth embodiment of the present invention.

FIG. 29 is a plan view illustrating another example of the cellular phone applied to the present invention, in which a state where casings are expanded is illustrated.

FIG. 30 is a plan view illustrating a state where a display casing of the cellular phone in FIG. 29 is turned down after the display casing has been rotated by 180 degrees.

FIG. 31 is a perspective view illustrating another example of the cellular phone applied to the present invention, in which a state where a display casing and an operation casing are aligned with each other is illustrated.

FIG. 32 is a perspective view illustrating a state where the display casing of the cellular phone in FIG. 31 is slid in a longer direction with respect to the operation casing.

FIG. 33 is a plan view illustrating another example of the cellular phone applied to the present invention, in which a state where casings are expanded is illustrated.

FIG. 34 is a plan view illustrating a state where the display casing of the cellular phone in FIG. 33 is rotated by 90 degrees.

FIG. 35 is a plan view illustrating another example of the cellular phone applied to the present invention.

FIG. 36 is a plan view illustrating a state where the display casing of the cellular phone in the state of FIG. 35 (*b*) is rotated by 90 degrees with respect to the operation casing.

FIG. 37 is a plan view illustrating another example of the cellular phone applied to the present invention, in which a state where casings are expanded is illustrated.

DESCRIPTION OF REFERENCE NUMERALS

1 Cellular phone
2 Display casing
2*a* Display part
6 Control part
11 Digital TV broadcast receiving part
12 Rotation detecting sensor
13 Memory
64 TV image generating part
65 Content data creating part
67 Display control part
671 TV image display control part
672 Content data display control part
673 Cursor selecting part 674 Update information display control part
69 Update information generating part
21, 23 Picto display area
22, 24 TV image display area
25 Data broadcast display area
33 Marquee flag
34 Marquee dedicated character string

What is claimed is:

1. A portable information terminal device comprising a display screen, wherein said display screen can be switched between a first display state and a second display state, the portable information terminal device including:
    a digital TV broadcast receiving part adapted to receive a digital TV broadcast wave including TV broadcast data and data broadcast data;
    a TV image generating part adapted to generate a TV image on a basis of the received TV broadcast data;
    a content data creating part adapted to create content data including a character string on a basis of the received data broadcast data;
    a TV image display controlling part adapted to display the TV image on said display screen in said first display state and said second display state;
    a content data display controlling part adapted to, in said first display state, display the content data on a part of said display screen, and in said second display state, extract a plurality of character strings included in said content data to sequentially display the character strings on a part of said display screen as extracted character strings; and
    a character string selecting part adapted to, upon switching of said display screen from the second display state to the first display state during the display of said extracted character strings, identifiably display only a character string that is a part of the character strings included in the content data displayed on the display screen and corresponds to said extracted character string displayed in the second display state upon the switching.

2. The portable information terminal device according to claim 1, wherein
    said content data creating part creates, on the basis of the received data broadcast data, the content data including a plurality of pieces of page data that can be displayed with switching to the part of the said display screen in the first display state, each of the pieces of page data including a grouped character string; and
    said content data display controlling part extracts, in said second display state, the character strings respectively included in said plurality of pieces of page data to sequentially display the character strings on the part of said display screen as the extracted character strings, and upon switching of said display screen from the second display state to the first display state during the display of said extracted character strings, displays page data corresponding to said extracted character string displayed in the second display state upon the switching on said display screen among said plurality of pieces of page data.

3. A portable information terminal device comprising a display screen, wherein said display screen can be switched between a first display state and a second display state, the portable information terminal device including:
    a digital TV broadcast receiving part adapted to receive a digital TV broadcast wave including TV broadcast data and data broadcast data;
    a TV image generating part adapted to generate a TV image on a basis of the received TV broadcast data;
    a content data creating part adapted to create, on a basis of the received data broadcast data, content data including a plurality of pieces of page data that can be displayed with switching to a part of said display screen in the first display state, each of the pieces of page data including a grouped character string;
    a TV image display controlling part adapted to display the TV image on said display screen in said first display state and said second display state; and
    a content data display controlling part adapted to, in said second display state, extract the character strings respectively included in said plurality of pieces of page data to sequentially display the character strings on a part of said display screen as extracted character strings; and upon switching of said display screen from the second display state to the first display state during the display of said extracted character strings, display page data corresponding to said extracted character string displayed in the second display state upon the switching on said display screen among said plurality of pieces of page data.

4. The portable information terminal device according to claim 1, wherein
    said display screen is rectangular, and can be switched between a vertically long display state as said first display state and a horizontally long display state as said second display state; and
    said TV image display controlling part displays the TV image with a longer direction of said display screen being made vertical in said vertically long display state, and in said horizontally long display state, with a shorter direction of said display screen being made vertical.

5. The portable information terminal device according to claim 4, wherein
    said content data includes a flag related to a character string included in the content data, the flag indicating whether or not to extract the character string as said extracted character string; and
    said content data display controlling part displays, in said horizontally long display state, the character string extracted on a basis of said flag on said display screen as said extracted character string.

6. The portable information terminal device according to claim 4, wherein
    said content data includes a dedicated character string to be displayed on said display screen as said extracted character string; and
    said content data display controlling part displays said dedicated character string on said display screen in said horizontally long display state, and in said vertically long display state, does not display said dedicated character string on said display screen.

7. The portable information terminal device according to claim 2, wherein
    said display screen is rectangular, and can be switched between a vertically long display state as said first display state and a horizontally long display state as said second display state; and
    said TV image display controlling part displays the TV image with a longer direction of said display screen being made vertical in said vertically long display state, and in said horizontally long display state, with a shorter direction of said display screen being made vertical.

8. The portable information terminal device according to claim 3, wherein said display screen is rectangular, and can be switched between a vertically long display state as said first display state and a horizontally long display state as said second display state; and said TV image display controlling part displays the TV image with a longer direction of said display screen being made vertical in said vertically long display state, and in said horizontally long display state, with a shorter direction of said display screen being made vertical.

* * * * *